US007857594B2

(12) United States Patent
Kidikian et al.

(10) Patent No.: US 7,857,594 B2
(45) Date of Patent: Dec. 28, 2010

(54) TURBINE EXHAUST STRUT AIRFOIL PROFILE

(75) Inventors: John Kidikian, Chomedy (CA); Edward Vlasic, Beaconsfield (CA); Sami Girgis, Montreal (CA)

(73) Assignee: Pratt & Whitney Canada Corp., Longueil, Quebec (CA)

( * ) Notice: Subject to any disclaimer, the term of this patent is extended or adjusted under 35 U.S.C. 154(b) by 946 days.

(21) Appl. No.: 11/563,783

(22) Filed: Nov. 28, 2006

(65) Prior Publication Data

US 2008/0124219 A1 May 29, 2008

(51) Int. Cl.

| | |
|---|---|
| ***B63H 1/26*** | (2006.01) |
| ***B63H 7/02*** | (2006.01) |
| ***B64C 11/16*** | (2006.01) |
| ***B64C 27/46*** | (2006.01) |
| ***F01D 5/14*** | (2006.01) |
| ***F03B 7/00*** | (2006.01) |
| ***F03D 11/02*** | (2006.01) |
| ***F04D 29/38*** | (2006.01) |

(52) U.S. Cl. .................................. 416/223 A; 416/191

(58) Field of Classification Search ................. 416/223, 416/191, DIG. 2, DIG. 5; 415/1, 115
See application file for complete search history.

(56) References Cited

U.S. PATENT DOCUMENTS 5,711,650 A * 1/1998 Tibbott et al. ............... 415/115
6,398,489 B1 6/2002 Burdgick et al.
6,832,897 B2 12/2004 Urban
6,854,961 B2 2/2005 Zhang et al.
6,910,868 B2 6/2005 Hyde et al.
2005/0079061 A1 4/2005 Beddard

OTHER PUBLICATIONS

U.S. Appl. No. 11/366,018, filed Mar. 2, 2006, Girgis et al.
U.S. Appl. No. 11/366,025, filed Mar. 2, 2006, Girgis et al.
U.S. Appl. No. 11/366,020, filed Mar. 2, 2006, Girgis et al.
U.S. Appl. No. 11/366,015, filed Mar. 2, 2006, Girgis et al.
U.S. Appl. No. 11/366,026, filed Mar. 2, 2006, Girgis et al.
U.S. Appl. No. 11/514,987, filed Sep. 5, 2006, Marini et al.
U.S. Appl. No. 11/514,983, filed Sep. 5, 2006, Ravanis et al.
U.S. Appl. No. 11/514,990, filed Sep. 5, 2006, Tsifourdaris et al.
U.S. Appl. No. 11/514,989, filed Sep. 5, 2006, Girgis et al.

(Continued)

*Primary Examiner*—Michael Cuff
*Assistant Examiner*—Craig Kim
(74) *Attorney, Agent, or Firm*—Ogilvy Renault LLP

(57) ABSTRACT

A turbine exhaust thin strut includes an airfoil section having a profile substantially in accordance with at least an intermediate portion of the Cartesian coordinate values of X, Y and Z set forth in Table 2. The X and Y values are distances, which when smoothly connected by an appropriate continuing curve, define airfoil profile sections at each distance Z. The profile sections at each distance Z are joined smoothly to one another to form a complete airfoil shape.

13 Claims, 5 Drawing Sheets

OTHER PUBLICATIONS

U.S. Appl. No. 11/514,972, filed Sep. 5, 2006, Mah et al.
U.S. Appl. No. 11/470,416, filed Sep. 6, 2006, Trindade et al.
U.S. Appl. No. 11/516,598, filed Sep. 7, 2006, Papple et al.
U.S. Appl. No. 11/516,601, filed Sep. 7, 2006, Sleiman et al.
U.S. Appl. No. 11/516,599, filed Sep. 7, 2006, Sreekanth et al.
U.S. Appl. No. 11/562,604, filed Nov. 22, 2006, Mohan et al.
U.S. Appl. No. 11/562,556, filed Nov. 22, 2006, Mohan et al.
U.S. Appl. No. 11/562,577, filed Nov. 22, 2006, Findlay et al.
U.S. Appl. No. 11/562,502, filed Nov. 22, 2006, Tsifourdaris et al.
U.S. Appl. No. 11/562,516, filed Nov. 22, 2006, Mohan et al.

* cited by examiner

TURBINE EXHAUST STRUT AIRFOIL PROFILE

TECHNICAL FIELD

The invention relates generally to an exhaust strut and gaspath for a gas turbine engine and, more particularly, to airfoil profiles suited for thin and thick exhaust struts of an auxiliary power unit (APU).

BACKGROUND OF THE ART

A gas turbine engine typically includes an exhaust duct through which hot combustion gases are flowed during operation of the engine. The exhaust duct conventionally comprises an inner cylindrical member forming the inner wall of the gaspath and an outer cylindrical member forming the outer wall of the gaspath. A plurality of radially extending struts spans the gaspath between the inner and outer cylindrical members.

Hot combustion gases discharging from the turbine into the exhaust duct during operation of the engine have a residual velocity component in the tangential direction with respect to the inner annular gaspath. The tangential velocity component of the hot combustion gases is undesirable as it detracts from the momentum increase that produces a forward axial thrust in the gas turbine engine. Conversion of the tangential velocity to axial velocity increases the axial thrust produced in the mixer and is essential for optimum operation of the turbine engine.

The tangential velocity component of the flow is redirected axially by the struts of the exhaust duct. More specifically, each strut has an airfoil for axially straightening the flow, the airfoil profiles being configured so as to aerodynamically affect the turning of the flow of gases.

In an exhaust duct following a single stage low pressure (LP) turbine, and particularly where the duct has forced mixer component following it, the strut airfoil shape must remove a substantial amount of residual swirl in the flow leaving the single stage LP turbine, in order to ensure that the forced mixer component which follows can function correctly. The amount of swirl will vary from the inner to the outer annulus and from one engine operating condition to another. At altitude, the flow Reynolds Number will be such that the flow is subject to flow separation unless great care is taken in determining the airfoil profile shape. Thus, the flow regimes this type of airfoil is exposed to will vary substantially with engine operating conditions and will be subject to flow separation. Therefore, improvements in airfoil design are sought.

SUMMARY OF THE INVENTION

It is therefore an object of this invention to provide an improved airfoil shape for a strut of a turbine exhaust duct of a high power APU.

In one aspect, the present invention provides a strut extending across an exhaust duct of a gas turbine engine, comprising an airfoil having at least a portion defined by a nominal profile substantially in accordance with Cartesian coordinate values of X, Y, and Z of Sections 3 to 7 set forth in one of Table 2 and Table 3, wherein the point of origin of the orthogonally related axes X, Y and Z is located at an intersection of a centerline of the gas turbine engine and a stacking line of the strut in the exhaust duct, the Z values are radial distances measured along the stacking line, the X and Y are coordinate values defining the profile at each distance Z.

In another aspect, the present invention provides a strut extending across an exhaust duct of a gas turbine engine comprising an uncoated airfoil having at least one portion defined by a nominal profile substantially in accordance with Cartesian coordinate values of X, Y, and Z of Sections 3 to 7 set forth in one of Table 2 and Table 3, wherein the point of origin of the orthogonally related axes X, Y and Z is located at an intersection of a centerline of the gas turbine engine and a stacking line of the strut in the exhaust duct, the Z values are radial distances measured along the stacking line of the airfoil, the X and Y are coordinate values defining the profile at each distance Z, and wherein the X and Y values are scalable as a function of the same constant or number.

In another aspect, the present invention provides an exhaust duct for a gas turbine engine comprising a plurality of thin struts, each thin strut including an airfoil having at least one portion defined by a nominal profile substantially in accordance with Cartesian coordinate values of X, Y, and Z of Sections 3 to 7 set forth in Table 2, wherein the point of origin of the orthogonally related axes X, Y and Z is located at an intersection of a centerline of the gas turbine engine and a stacking line of the struts, the Z values are radial distances measured along the stacking line, the X and Y are coordinate values defining the profile at each distance Z.

In another aspect, the present invention provides an exhaust strut comprising at least one airfoil having a surface lying substantially on the points of Table 2, the airfoil extending between inner and outer end portions defined generally by Table 1, and wherein the values of Table 2 are subject to relevant tolerance.

This design profile advantageously removes a substantial amount of residual swirl in the flow leaving the LP turbine. The unique airfoil shape is optimized to minimize flow separation at low Reynolds number. According to another aspect, the thin and thick aerofoils are optimized and integrated for oil system access.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
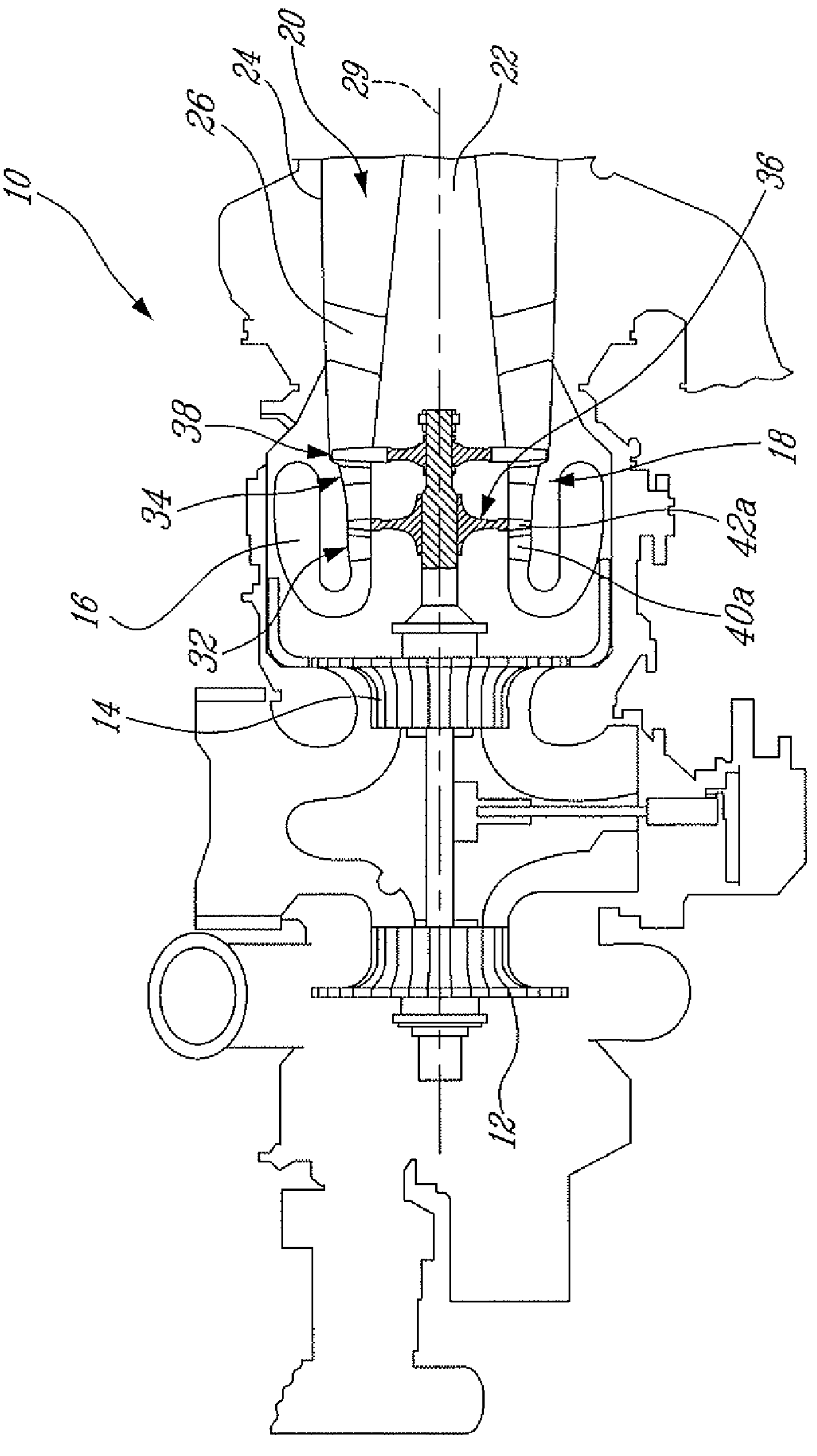
FIG. 1 is a schematic view of a gas turbine engine.

FIG. 1 illustrates a gas turbine engine 10 of a type preferably provided for use as a high power APU, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases to drive the fan, the compressor, and produce thrust.

The gas turbine engine 10 further includes a turbine exhaust duct 20 which is exemplified as including an annular core portion 22 and an annular outer portion 24 and a plurality of thin struts 26 circumferentially spaced apart, and radially extending between the inner and outer portions 22, 24. Specifically, the turbine exhaust duct 20 includes 5 thin struts 26*a* and 3 thick strut 26*b*.

Figure 2:
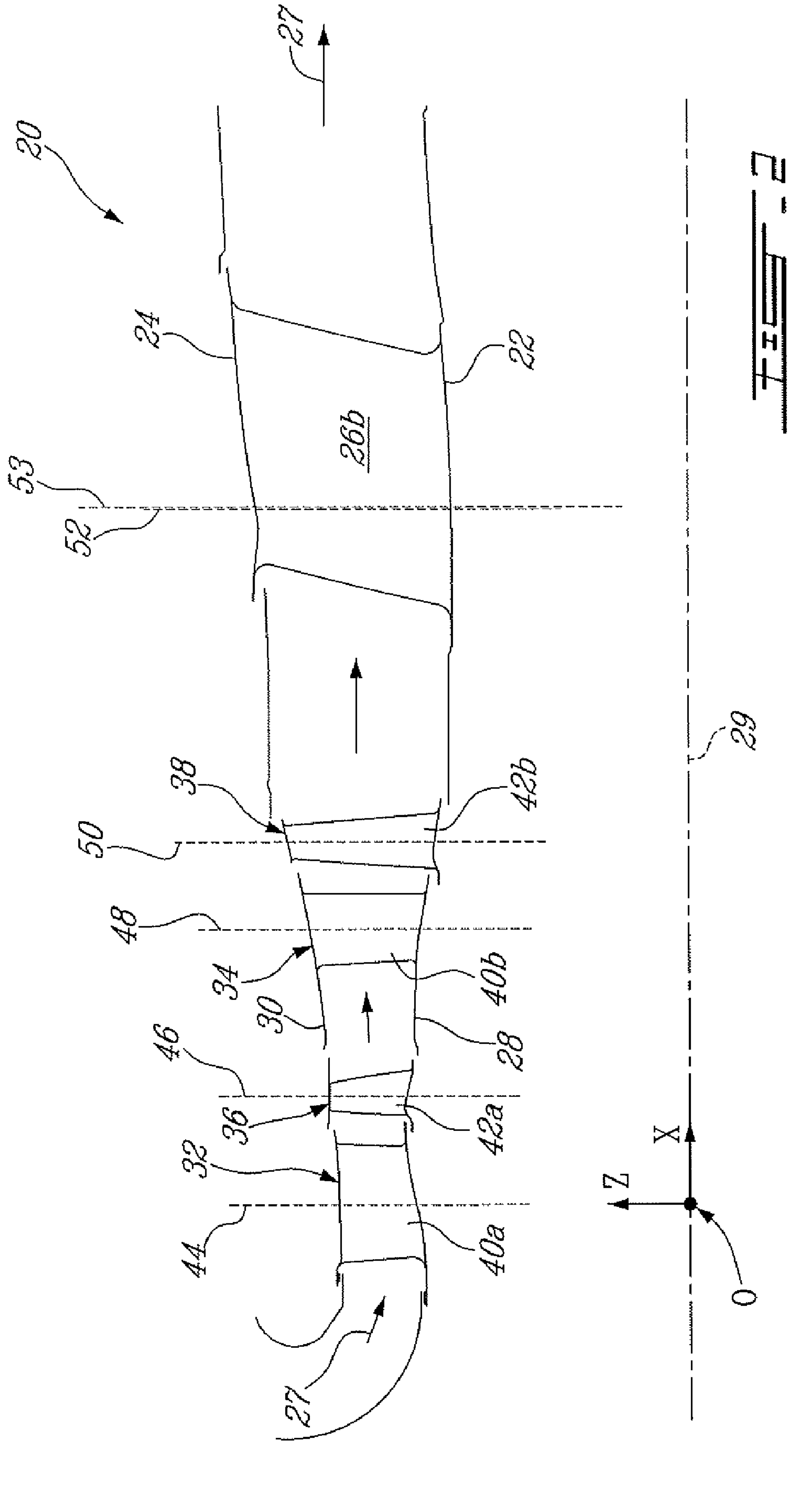
FIG. 2 is a schematic view of a gaspath of the gas turbine engine of FIG. 1, including an exhaust duct.

FIG. 2 illustrates a portion of an annular hot gaspath, indicated by arrows 27 and defined by annular inner and outer walls 28 and 30 respectively, for directing the stream of hot combustion gases axially in an annular flow. The profile of the inner and outer walls 28 and 30 of the annular gaspath, at "cold" (i.e. non-operating) conditions, is defined by the Cartesian coordinate values given in Table 1 below. More particularly, the inner and outer gaspath walls 28 and 30 are defined with respect to mutually orthogonal x and z axes, as shown in FIG. 2. The x axis corresponds to the engine turbine rotor centerline 29. The radial distance of the inner and outer walls 28 and 30 from the engine turbine rotor centerline and, thus, from the x-axis at specific axial locations is measured along the z axis. The z values provide the inner and outer radius of the gaspath at various axial locations therealong. The x and z coordinate values in Table 1 are distances given in inches from the point of origin O (see FIG. 2). It is understood that other units of dimensions may be used. The x and z values have a manufacturing tolerance of about ±0.030 inch along the exhaust duct 20.

The turbine section 18 has a high pressure turbine (HPT) stage located downstream of the combustor 16 and a low pressure turbine (LPT) stage located further downstream in the gaspath 27. The turbine exhaust duct 20 is shown downstream from the LPT stage.

Referring to FIG. 2, the HPT stage comprises a stator assembly 32 and a rotor assembly 36 having a plurality of circumferentially spaced vanes 40*a* and blades 42*a* respectively. Likewise, the LPT stage comprises a stator assembly 34 and a rotor assembly 38 having a plurality of circumferentially spaced vanes 40*b* and blades 42*b*. The vanes 40*a* and blades 42*a,b* are mounted in position along respective stacking lines 44-50, as identified in FIG. 2. The stacking lines 44-50 extend in the radial direction along the z axis at different axial locations. The stacking lines 44-50 define the axial location where the blades and vanes of each stage are mounted in the engine 10. More specifically, stacking line 44 located at x=0 corresponds to the HPT vane 40*a*. Stacking line 46 located at x=1.7950 corresponds to the HPT blade 42*a*. Stacking line 48 located at x=4.5460 corresponds to the LPT vane 40*b*. Stacking line 50 located at x=5.9910 corresponds to the LPT blade 42*b*. Furthermore, FIG. 2 also illustrates stacking lines 52 and 53 corresponding respectively to the thin and the thick turbine exhaust duct struts 26*a* and 26*b*. Stacking lines 52 and 53 are respectively located at x=11.5305 and x=11.5395.

TABLE 1

| Turbine Cold Gaspath Definition | | | | |
|---|---|---|---|---|
| | INNER GASPATH | | OUTER GASPATH | |
| PL | X | Z | X | Z |
| 1 | −1.200 | 4.376 | −1.200 | 5.760 |
| 2 | −0.800 | 4.394 | −0.800 | 5.785 |
| 3 | −0.400 | 4.439 | −0.400 | 5.796 |
| 4 | 0.000 | 4.524 | 0.000 | 5.806 |
| 5 | 0.400 | 4.608 | 0.400 | 5.816 |
| 6 | 0.800 | 4.671 | 0.800 | 5.840 |
| 7 | 1.200 | 4.706 | 1.200 | 5.893 |
| 8 | 1.600 | 4.713 | 1.600 | 5.984 |
| 9 | 2.000 | 4.634 | 2.000 | 5.984 |
| 10 | 2.325 | 4.593 | 2.325 | 5.984 |
| 11 | 2.800 | 4.566 | 2.800 | 6.041 |
| 12 | 3.200 | 4.554 | 3.200 | 6.089 |
| 13 | 3.600 | 4.540 | 3.600 | 6.140 |
| 14 | 4.000 | 4.524 | 4.000 | 6.199 |
| 15 | 4.400 | 4.485 | 4.400 | 6.268 |
| 16 | 4.546 | 4.464 | 4.546 | 6.296 |
| 17 | 4.800 | 4.419 | 4.800 | 6.347 |
| 18 | 5.200 | 4.347 | 5.200 | 6.428 |
| 19 | 5.750 | 4.242 | 5.750 | 6.606 |
| 20 | 5.991 | 4.223 | 5.991 | 6.663 |
| 21 | 6.350 | 4.164 | 6.350 | 6.749 |
| 22 | 6.800 | 3.975 | 6.800 | 6.944 |
| 23 | 7.200 | 3.975 | 7.200 | 6.970 |
| 24 | 7.600 | 3.975 | 7.600 | 6.970 |
| 25 | 8.000 | 3.975 | 8.000 | 6.970 |
| 26 | 8.400 | 3.975 | 8.400 | 6.970 |
| 27 | 8.800 | 3.975 | 8.800 | 6.970 |
| 28 | 9.200 | 3.933 | 9.200 | 6.989 |
| 29 | 9.600 | 3.925 | 9.600 | 7.008 |
| 30 | 10.000 | 3.925 | 10.000 | 7.028 |
| 31 | 10.400 | 3.925 | 10.400 | 7.208 |
| 32 | 10.800 | 3.925 | 10.800 | 7.166 |
| 33 | 11.200 | 3.928 | 11.200 | 7.133 |
| 34 | 11.539 | 3.933 | 11.539 | 7.181 |
| 35 | 12.000 | 3.946 | 12.000 | 7.254 |
| 36 | 12.400 | 3.962 | 12.400 | 7.317 |
| 37 | 12.800 | 3.982 | 12.800 | 7.376 |
| 38 | 13.200 | 4.006 | 13.200 | 7.427 |
| 39 | 13.600 | 4.035 | 13.600 | 7.472 |
| 40 | 14.000 | 4.069 | 14.000 | 7.510 |
| 41 | 14.400 | 4.107 | 14.400 | 7.541 |
| 42 | 14.800 | 4.083 | 14.800 | 7.569 |
| 43 | 15.200 | 4.149 | 15.200 | 7.618 |
| 44 | 16.000 | 4.250 | 16.000 | 7.690 |
| 45 | 16.400 | 4.281 | 16.400 | 7.711 |
| 46 | 16.800 | 4.309 | 16.800 | 7.732 |
| 47 | 17.200 | 4.334 | 17.200 | 7.753 |
| 48 | 17.600 | 4.355 | 17.600 | 7.774 |
| 49 | 18.000 | 4.374 | 18.000 | 7.795 |

The HPT includes 14 HP vanes and 65 HP blades, the LPT include 38 LP vanes and 59 LP blades, and there are 5 thin and 3 thick airfoils in the turbine exhaust case.

Figure 3:
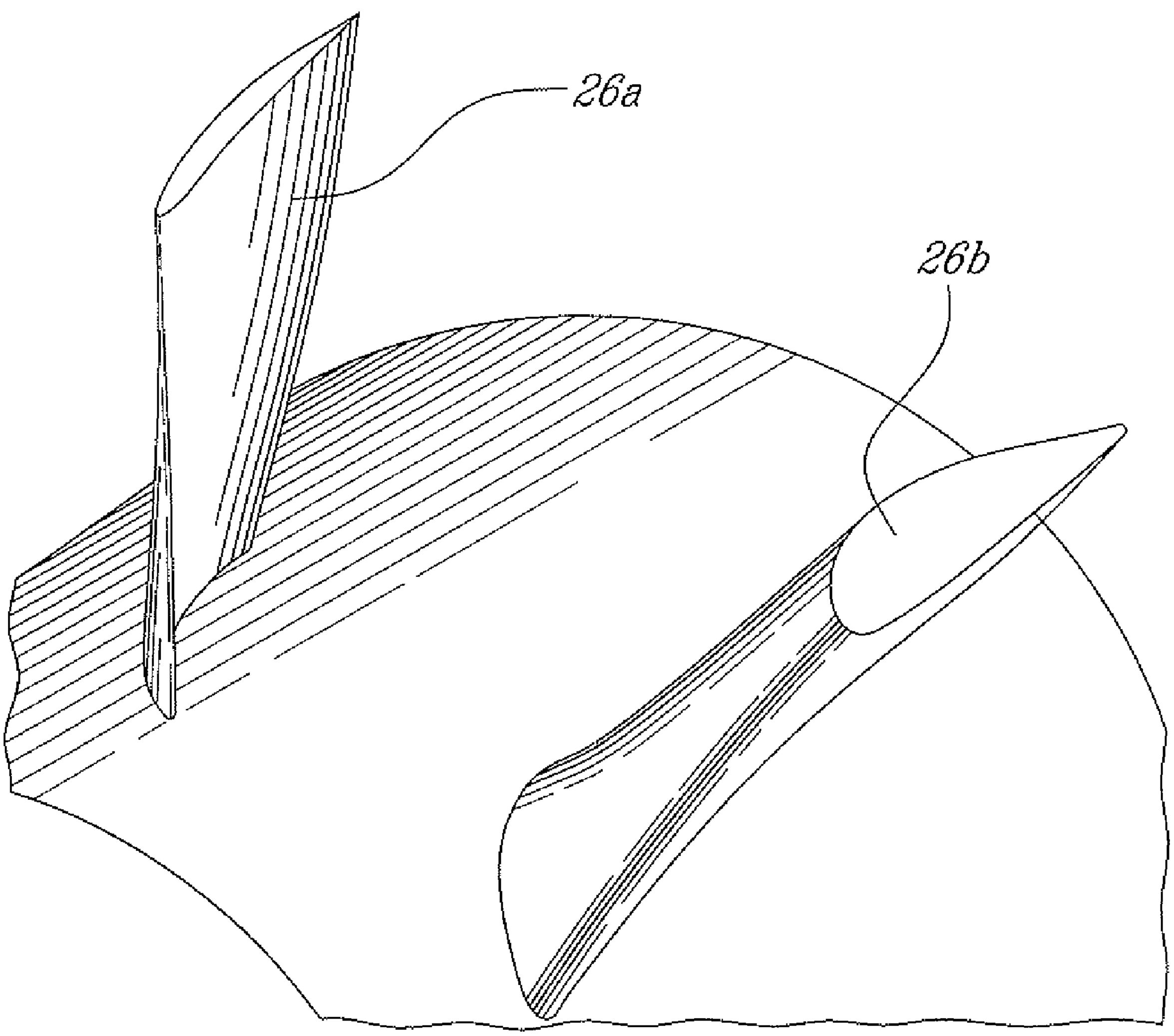
FIG. 3 is a schematic perspective view of a thin exhaust strut and a thick exhaust strut having an airfoil profile defined in accordance with an embodiment of the present invention.
Figure 4A:
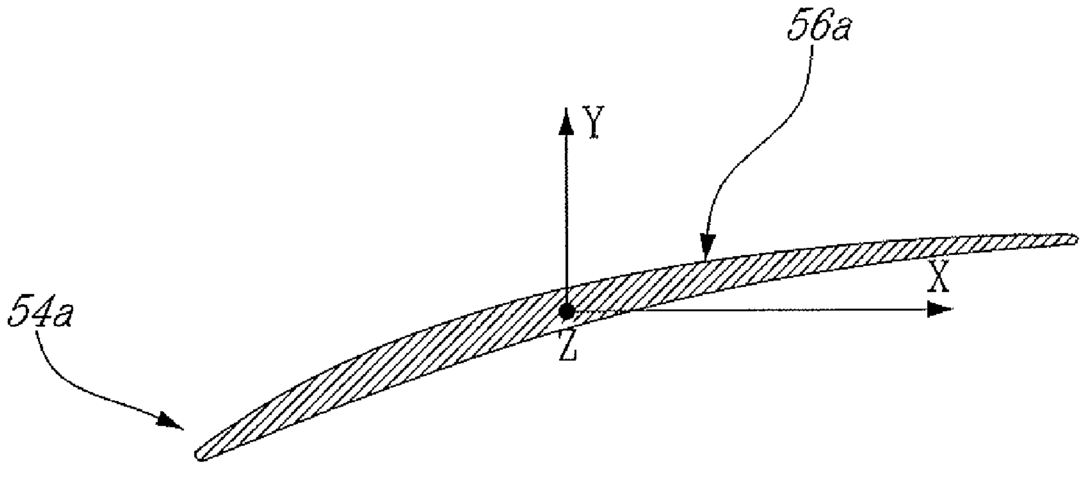
FIGS. 4*a* and 4*b* are respectively cross-sections of the thin exhaust strut and the thick exhaust strut shown in FIG. 3, showing representative profile sections of the airfoil portion of the struts.
Figure 4B:
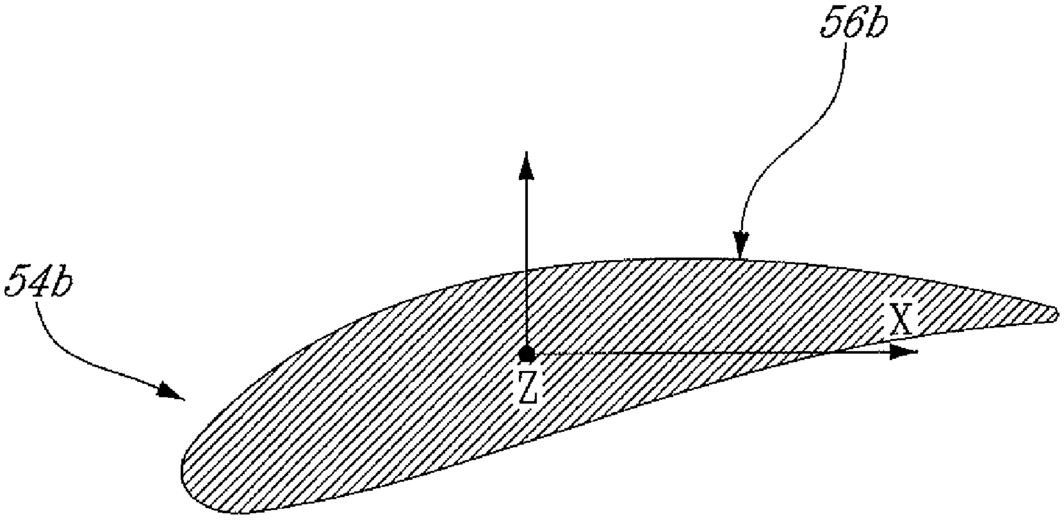

FIG. 3 shows an example of one of the thin struts 26*a* and of the thick strut 26*b* provided in the exhaust duct 20 of the engine 10. The struts 26*a* and 26*b* are fabricated from sheet metal and both have an airfoil portion 54*a*,54*b* defined by a profile. The airfoil portion 54*a*,54*b* has a profile section 56*a*, 56*b* as shown in FIG. 4*a* and FIG. 4*b* at any cross-section taken along its height. The airfoil portion 54*a*, 54*b* is defined between the inner and outer portions 22, 24.

The novel airfoil shape of each strut 26*a*, 26*b* is defined by a set of X-Y-Z points in space. This set of points represents a novel and unique solution to the target design criteria discussed above, and is well-adapted for use in a single-stage LPT design. The set of points are defined in a Cartesian coordinate system having mutually orthogonal X, Y and Z axes. The X axis extends axially along the turbine rotor centerline 29, i.e., the rotary axis. The positive X direction is axially towards the aft of the turbine engine 10. The Z axis extends along the strut stacking lines 52 and 53 of each respective strut 26*a,b* in a generally radial direction and intersects the X axis. The positive Z direction is radially outwardly toward the outer portion 24 of the turbine exhaust duct 20. The Y axis extends tangentially with the positive Y direction being in the direction of rotation of the rotor assembly 38. Therefore, the origin of the X, Y and Z axes for the thin and the thick struts is respectively defined at the point of intersection of all three orthogonally-related axes: that is the point (0,0,0) at the intersection of the center of rotation of the turbine engine 10 and the stacking line 52 and the staking line 53.

In a particular embodiment of the turbine exhaust duct 20, the set of points which define the airfoil profile of a portion of the thin strut 26*a* relative to the axis of rotation of the turbine engine 10 of the stacking line 52 thereof are set out in Table 2 below as X, Y and Z Cartesian coordinate values. Particularly, the strut airfoil profile is defined by profile sections 56*a* at various locations along its height, the locations represented by Z values. It should be understood that the Z values do not represent an actual radial height along the airfoil 54*a* but are defined with respect to the engine centerline. For example, if the thin struts 26*a* are mounted about the inner portion 22 of the turbine exhaust duct 20 at an angle with respect to the radial direction, then the Z values are not a true representation of the height of the airfoils 54*a* of the thin struts 26*a*. Furthermore, it is to be appreciated that, with respect to Table 2, Z values are not actually radial heights, per se, from the centerline but rather a height from a plane through the centerline—i.e. the sections in Table 2 are planar. The coordinate values are set forth in inches in Table 2 although other units of dimensions may be used when the values are appropriately converted.

Thus, at each Z distance, the X and Y coordinate values of the desired profile section 56*a* are defined at selected locations in a Z direction normal to the X, Y plane. The X and Y coordinates are given in distance dimensions, e.g., units of inches, and are joined smoothly, using appropriate curve-fitting techniques, at each Z location to form a continuous airfoil cross-section. The strut airfoil profiles of the various surface locations between the distances Z are determined by smoothly connecting the adjacent profile sections 56*a* to one another to form the airfoil profile.

The coordinate values listed in Table 2 below represent the desired airfoil profiles in a "cold" (i.e. non-operating) condition. However, the manufactured airfoil surface profile will be slightly different as a result of manufacturing tolerances. The coordinate values listed in Table 2 below are for an uncoated airfoil. According to an embodiment of the present invention, the struts remain uncoated. Likewise, the set of points which define the airfoil profile of a portion of the thick strut 26*b* relative to the axis of rotation of the turbine engine 10 of the stacking line 53 thereof are set out in Table 3 below as X, Y and Z Cartesian coordinate values.

The Table 2 and 3 values are generated and shown to three decimal places for determining the profile of the thin and thick strut airfoils. However, as mentioned above, there are manufacturing tolerance issues to be addressed and, accordingly, the values for the profile given in Table 2 and 3 are for a theoretical airfoil, to which a ±0.010" manufacturing tolerance is additive to the X and Y values given in Table 2 below. The strut airfoil design functions well within this range. The cold or room temperature profile is given by the X, Y and Z coordinates for manufacturing purposes. It is understood that the airfoil may deform, within acceptable limits, once entering service.

The coordinate values given in Table 2 and 3 below provide the preferred nominal airfoil profile of a portion of the thin strut 26*a* and thick strut 26*b*, respectively.

TABLE 2

| | X | Y | Z |
|---|---|---|---|
| SECTION 1 | −1.823 | −0.767 | 3.750 |
| | −1.814 | −0.760 | 3.750 |
| | −1.806 | −0.754 | 3.750 |
| | −1.798 | −0.747 | 3.750 |
| | −1.790 | −0.740 | 3.750 |
| | −1.781 | −0.734 | 3.750 |
| | −1.773 | −0.727 | 3.750 |
| | −1.765 | −0.721 | 3.750 |
| | −1.756 | −0.714 | 3.750 |
| | −1.748 | −0.707 | 3.750 |
| | −1.740 | −0.701 | 3.750 |
| | −1.698 | −0.669 | 3.750 |
| | −1.655 | −0.637 | 3.750 |
| | −1.612 | −0.606 | 3.750 |
| | −1.569 | −0.575 | 3.750 |
| | −1.526 | −0.544 | 3.750 |
| | −1.482 | −0.514 | 3.750 |
| | −1.438 | −0.485 | 3.750 |
| | −1.394 | −0.456 | 3.750 |
| | −1.349 | −0.428 | 3.750 |
| | −1.304 | −0.399 | 3.750 |
| | −1.259 | −0.372 | 3.750 |
| | −1.213 | −0.345 | 3.750 |
| | −1.167 | −0.318 | 3.750 |
| | −1.121 | −0.292 | 3.750 |
| | −1.075 | −0.266 | 3.750 |
| | −1.028 | −0.241 | 3.750 |
| | −0.982 | −0.216 | 3.750 |
| | −0.935 | −0.191 | 3.750 |
| | −0.887 | −0.167 | 3.750 |
| | −0.840 | −0.143 | 3.750 |
| | −0.792 | −0.120 | 3.750 |
| | −0.744 | −0.098 | 3.750 |
| | −0.696 | −0.075 | 3.750 |
| | −0.648 | −0.053 | 3.750 |
| | −0.599 | −0.032 | 3.750 |
| | −0.551 | −0.011 | 3.750 |
| | −0.502 | 0.009 | 3.750 |
| | −0.453 | 0.029 | 3.750 |
| | −0.403 | 0.049 | 3.750 |
| | −0.354 | 0.068 | 3.750 |
| | −0.304 | 0.087 | 3.750 |
| | −0.255 | 0.105 | 3.750 |
| | −0.205 | 0.123 | 3.750 |
| | −0.155 | 0.141 | 3.750 |
| | −0.105 | 0.158 | 3.750 |
| | −0.054 | 0.175 | 3.750 |
| | −0.004 | 0.191 | 3.750 |
| | 0.047 | 0.207 | 3.750 |
| | 0.098 | 0.222 | 3.750 |
| | 0.148 | 0.237 | 3.750 |
| | 0.199 | 0.252 | 3.750 |
| | 0.250 | 0.266 | 3.750 |
| | 0.302 | 0.280 | 3.750 |
| | 0.353 | 0.293 | 3.750 |
| | 0.404 | 0.306 | 3.750 |
| | 0.456 | 0.319 | 3.750 |
| | 0.508 | 0.331 | 3.750 |
| | 0.559 | 0.342 | 3.750 |
| | 0.611 | 0.354 | 3.750 |
| | 0.663 | 0.365 | 3.750 |
| | 0.715 | 0.375 | 3.750 |
| | 0.767 | 0.386 | 3.750 |
| | 0.819 | 0.395 | 3.750 |
| | 0.871 | 0.405 | 3.750 |
| | 0.923 | 0.414 | 3.750 |
| | 0.976 | 0.423 | 3.750 |
| | 1.028 | 0.431 | 3.750 |
| | 1.080 | 0.439 | 3.750 |
| | 1.133 | 0.447 | 3.750 |
| | 1.185 | 0.454 | 3.750 |
| | 1.238 | 0.461 | 3.750 |
| | 1.291 | 0.467 | 3.750 |

TABLE 2-continued

| X | Y | Z |
|---|---|---|
| 1.343 | 0.473 | 3.750 |
| 1.396 | 0.479 | 3.750 |
| 1.449 | 0.485 | 3.750 |
| 1.502 | 0.490 | 3.750 |
| 1.554 | 0.494 | 3.750 |
| 1.607 | 0.498 | 3.750 |
| 1.660 | 0.502 | 3.750 |
| 1.713 | 0.506 | 3.750 |
| 1.766 | 0.509 | 3.750 |
| 1.819 | 0.511 | 3.750 |
| 1.872 | 0.513 | 3.750 |
| 1.925 | 0.515 | 3.750 |
| 1.978 | 0.516 | 3.750 |
| 2.031 | 0.516 | 3.750 |
| 2.084 | 0.516 | 3.750 |
| 2.137 | 0.516 | 3.750 |
| 2.190 | 0.515 | 3.750 |
| 2.201 | 0.514 | 3.750 |
| 2.211 | 0.514 | 3.750 |
| 2.222 | 0.514 | 3.750 |
| 2.232 | 0.513 | 3.750 |
| 2.243 | 0.513 | 3.750 |
| 2.254 | 0.513 | 3.750 |
| 2.264 | 0.512 | 3.750 |
| 2.275 | 0.512 | 3.750 |
| 2.285 | 0.511 | 3.750 |
| 2.296 | 0.511 | 3.750 |
| 2.299 | 0.510 | 3.750 |
| 2.302 | 0.509 | 3.750 |
| 2.305 | 0.508 | 3.750 |
| 2.307 | 0.506 | 3.750 |
| 2.310 | 0.504 | 3.750 |
| 2.311 | 0.501 | 3.750 |
| 2.313 | 0.499 | 3.750 |
| 2.314 | 0.496 | 3.750 |
| 2.314 | 0.492 | 3.750 |
| 2.314 | 0.489 | 3.750 |
| 2.313 | 0.486 | 3.750 |
| 2.312 | 0.483 | 3.750 |
| 2.310 | 0.481 | 3.750 |
| 2.308 | 0.478 | 3.750 |
| 2.306 | 0.476 | 3.750 |
| 2.304 | 0.474 | 3.750 |
| 2.301 | 0.473 | 3.750 |
| 2.298 | 0.472 | 3.750 |
| 2.295 | 0.472 | 3.750 |
| 2.284 | 0.471 | 3.750 |
| 2.274 | 0.470 | 3.750 |
| 2.263 | 0.470 | 3.750 |
| 2.253 | 0.469 | 3.750 |
| 2.243 | 0.468 | 3.750 |
| 2.232 | 0.467 | 3.750 |
| 2.222 | 0.467 | 3.750 |
| 2.211 | 0.466 | 3.750 |
| 2.201 | 0.465 | 3.750 |
| 2.191 | 0.464 | 3.750 |
| 2.139 | 0.460 | 3.750 |
| 2.087 | 0.456 | 3.750 |
| 2.035 | 0.452 | 3.750 |
| 1.983 | 0.447 | 3.750 |
| 1.932 | 0.442 | 3.750 |
| 1.880 | 0.436 | 3.750 |
| 1.828 | 0.430 | 3.750 |
| 1.776 | 0.424 | 3.750 |
| 1.725 | 0.418 | 3.750 |
| 1.673 | 0.411 | 3.750 |
| 1.622 | 0.404 | 3.750 |
| 1.570 | 0.397 | 3.750 |
| 1.519 | 0.389 | 3.750 |
| 1.467 | 0.381 | 3.750 |
| 1.416 | 0.373 | 3.750 |
| 1.364 | 0.364 | 3.750 |
| 1.313 | 0.355 | 3.750 |
| 1.262 | 0.346 | 3.750 |
| 1.211 | 0.336 | 3.750 |
| 1.160 | 0.326 | 3.750 |
| 1.109 | 0.316 | 3.750 |

TABLE 2-continued

| X | Y | Z |
|---|---|---|
| 1.058 | 0.305 | 3.750 |
| 1.007 | 0.294 | 3.750 |
| 0.956 | 0.282 | 3.750 |
| 0.906 | 0.270 | 3.750 |
| 0.855 | 0.258 | 3.750 |
| 0.805 | 0.245 | 3.750 |
| 0.754 | 0.232 | 3.750 |
| 0.704 | 0.219 | 3.750 |
| 0.654 | 0.205 | 3.750 |
| 0.604 | 0.191 | 3.750 |
| 0.554 | 0.177 | 3.750 |
| 0.504 | 0.162 | 3.750 |
| 0.454 | 0.147 | 3.750 |
| 0.404 | 0.132 | 3.750 |
| 0.355 | 0.116 | 3.750 |
| 0.305 | 0.100 | 3.750 |
| 0.256 | 0.084 | 3.750 |
| 0.206 | 0.067 | 3.750 |
| 0.157 | 0.050 | 3.750 |
| 0.108 | 0.033 | 3.750 |
| 0.059 | 0.015 | 3.750 |
| 0.010 | −0.003 | 3.750 |
| −0.038 | −0.021 | 3.750 |
| −0.087 | −0.039 | 3.750 |
| −0.136 | −0.058 | 3.750 |
| −0.184 | −0.077 | 3.750 |
| −0.233 | −0.096 | 3.750 |
| −0.281 | −0.115 | 3.750 |
| −0.329 | −0.135 | 3.750 |
| −0.377 | −0.155 | 3.750 |
| −0.425 | −0.175 | 3.750 |
| −0.473 | −0.195 | 3.750 |
| −0.521 | −0.216 | 3.750 |
| −0.569 | −0.236 | 3.750 |
| −0.616 | −0.257 | 3.750 |
| −0.664 | −0.278 | 3.750 |
| −0.711 | −0.300 | 3.750 |
| −0.759 | −0.321 | 3.750 |
| −0.806 | −0.342 | 3.750 |
| −0.854 | −0.364 | 3.750 |
| −0.901 | −0.386 | 3.750 |
| −0.948 | −0.407 | 3.750 |
| −0.995 | −0.429 | 3.750 |
| −1.043 | −0.451 | 3.750 |
| −1.090 | −0.473 | 3.750 |
| −1.137 | −0.495 | 3.750 |
| −1.184 | −0.518 | 3.750 |
| −1.231 | −0.540 | 3.750 |
| −1.278 | −0.562 | 3.750 |
| −1.325 | −0.584 | 3.750 |
| −1.372 | −0.606 | 3.750 |
| −1.420 | −0.628 | 3.750 |
| −1.467 | −0.650 | 3.750 |
| −1.514 | −0.672 | 3.750 |
| −1.561 | −0.694 | 3.750 |
| −1.609 | −0.715 | 3.750 |
| −1.656 | −0.737 | 3.750 |
| −1.703 | −0.758 | 3.750 |
| −1.713 | −0.762 | 3.750 |
| −1.722 | −0.767 | 3.750 |
| −1.732 | −0.771 | 3.750 |
| −1.741 | −0.775 | 3.750 |
| −1.751 | −0.779 | 3.750 |
| −1.760 | −0.783 | 3.750 |
| −1.770 | −0.788 | 3.750 |
| −1.779 | −0.792 | 3.750 |
| −1.789 | −0.796 | 3.750 |
| −1.798 | −0.800 | 3.750 |
| −1.801 | −0.801 | 3.750 |
| −1.804 | −0.802 | 3.750 |
| −1.807 | −0.802 | 3.750 |
| −1.811 | −0.802 | 3.750 |
| −1.814 | −0.801 | 3.750 |
| −1.816 | −0.800 | 3.750 |
| −1.819 | −0.798 | 3.750 |
| −1.822 | −0.797 | 3.750 |
| −1.824 | −0.795 | 3.750 |

TABLE 2-continued

| | X | Y | Z |
|---|---|---|---|
| | −1.826 | −0.792 | 3.750 |
| | −1.827 | −0.789 | 3.750 |
| | −1.828 | −0.787 | 3.750 |
| | −1.829 | −0.784 | 3.750 |
| | −1.829 | −0.780 | 3.750 |
| | −1.829 | −0.777 | 3.750 |
| | −1.828 | −0.774 | 3.750 |
| | −1.827 | −0.772 | 3.750 |
| | −1.825 | −0.769 | 3.750 |
| SECTION 2 | −1.661 | −0.676 | 4.250 |
| | −1.653 | −0.670 | 4.250 |
| | −1.645 | −0.663 | 4.250 |
| | −1.636 | −0.657 | 4.250 |
| | −1.628 | −0.650 | 4.250 |
| | −1.620 | −0.644 | 4.250 |
| | −1.612 | −0.637 | 4.250 |
| | −1.603 | −0.631 | 4.250 |
| | −1.595 | −0.624 | 4.250 |
| | −1.587 | −0.618 | 4.250 |
| | −1.578 | −0.612 | 4.250 |
| | −1.536 | −0.581 | 4.250 |
| | −1.494 | −0.550 | 4.250 |
| | −1.451 | −0.520 | 4.250 |
| | −1.407 | −0.491 | 4.250 |
| | −1.363 | −0.462 | 4.250 |
| | −1.319 | −0.434 | 4.250 |
| | −1.275 | −0.406 | 4.250 |
| | −1.230 | −0.379 | 4.250 |
| | −1.185 | −0.353 | 4.250 |
| | −1.139 | −0.327 | 4.250 |
| | −1.093 | −0.301 | 4.250 |
| | −1.047 | −0.276 | 4.250 |
| | −1.001 | −0.252 | 4.250 |
| | −0.954 | −0.228 | 4.250 |
| | −0.907 | −0.205 | 4.250 |
| | −0.860 | −0.182 | 4.250 |
| | −0.813 | −0.160 | 4.250 |
| | −0.765 | −0.138 | 4.250 |
| | −0.717 | −0.117 | 4.250 |
| | −0.669 | −0.096 | 4.250 |
| | −0.621 | −0.076 | 4.250 |
| | −0.572 | −0.056 | 4.250 |
| | −0.524 | −0.036 | 4.250 |
| | −0.475 | −0.017 | 4.250 |
| | −0.426 | 0.001 | 4.250 |
| | −0.376 | 0.019 | 4.250 |
| | −0.327 | 0.037 | 4.250 |
| | −0.278 | 0.054 | 4.250 |
| | −0.228 | 0.070 | 4.250 |
| | −0.178 | 0.087 | 4.250 |
| | −0.128 | 0.102 | 4.250 |
| | −0.078 | 0.118 | 4.250 |
| | −0.028 | 0.133 | 4.250 |
| | 0.022 | 0.147 | 4.250 |
| | 0.073 | 0.162 | 4.250 |
| | 0.123 | 0.175 | 4.250 |
| | 0.174 | 0.189 | 4.250 |
| | 0.225 | 0.202 | 4.250 |
| | 0.276 | 0.215 | 4.250 |
| | 0.327 | 0.227 | 4.250 |
| | 0.378 | 0.239 | 4.250 |
| | 0.429 | 0.250 | 4.250 |
| | 0.480 | 0.261 | 4.250 |
| | 0.531 | 0.272 | 4.250 |
| | 0.583 | 0.283 | 4.250 |
| | 0.634 | 0.293 | 4.250 |
| | 0.686 | 0.302 | 4.250 |
| | 0.737 | 0.312 | 4.250 |
| | 0.789 | 0.321 | 4.250 |
| | 0.840 | 0.329 | 4.250 |
| | 0.892 | 0.338 | 4.250 |
| | 0.944 | 0.346 | 4.250 |
| | 0.996 | 0.354 | 4.250 |
| | 1.047 | 0.361 | 4.250 |
| | 1.099 | 0.369 | 4.250 |
| | 1.151 | 0.376 | 4.250 |
| | 1.203 | 0.382 | 4.250 |

TABLE 2-continued

| X | Y | Z |
|---|---|---|
| 1.255 | 0.389 | 4.250 |
| 1.307 | 0.395 | 4.250 |
| 1.359 | 0.401 | 4.250 |
| 1.411 | 0.406 | 4.250 |
| 1.464 | 0.411 | 4.250 |
| 1.516 | 0.417 | 4.250 |
| 1.568 | 0.421 | 4.250 |
| 1.620 | 0.426 | 4.250 |
| 1.672 | 0.430 | 4.250 |
| 1.725 | 0.434 | 4.250 |
| 1.777 | 0.437 | 4.250 |
| 1.829 | 0.441 | 4.250 |
| 1.882 | 0.444 | 4.250 |
| 1.934 | 0.446 | 4.250 |
| 1.986 | 0.448 | 4.250 |
| 2.039 | 0.450 | 4.250 |
| 2.091 | 0.452 | 4.250 |
| 2.143 | 0.453 | 4.250 |
| 2.196 | 0.453 | 4.250 |
| 2.248 | 0.453 | 4.250 |
| 2.301 | 0.453 | 4.250 |
| 2.353 | 0.452 | 4.250 |
| 2.363 | 0.452 | 4.250 |
| 2.374 | 0.452 | 4.250 |
| 2.384 | 0.451 | 4.250 |
| 2.395 | 0.451 | 4.250 |
| 2.405 | 0.450 | 4.250 |
| 2.416 | 0.450 | 4.250 |
| 2.426 | 0.450 | 4.250 |
| 2.437 | 0.449 | 4.250 |
| 2.447 | 0.449 | 4.250 |
| 2.458 | 0.448 | 4.250 |
| 2.461 | 0.448 | 4.250 |
| 2.464 | 0.447 | 4.250 |
| 2.467 | 0.446 | 4.250 |
| 2.469 | 0.444 | 4.250 |
| 2.471 | 0.441 | 4.250 |
| 2.473 | 0.439 | 4.250 |
| 2.474 | 0.436 | 4.250 |
| 2.475 | 0.433 | 4.250 |
| 2.476 | 0.430 | 4.250 |
| 2.476 | 0.427 | 4.250 |
| 2.475 | 0.424 | 4.250 |
| 2.474 | 0.421 | 4.250 |
| 2.472 | 0.418 | 4.250 |
| 2.470 | 0.416 | 4.250 |
| 2.468 | 0.413 | 4.250 |
| 2.465 | 0.412 | 4.250 |
| 2.463 | 0.410 | 4.250 |
| 2.459 | 0.409 | 4.250 |
| 2.456 | 0.409 | 4.250 |
| 2.446 | 0.408 | 4.250 |
| 2.436 | 0.408 | 4.250 |
| 2.426 | 0.407 | 4.250 |
| 2.415 | 0.406 | 4.250 |
| 2.405 | 0.406 | 4.250 |
| 2.395 | 0.405 | 4.250 |
| 2.384 | 0.404 | 4.250 |
| 2.374 | 0.404 | 4.250 |
| 2.364 | 0.403 | 4.250 |
| 2.354 | 0.402 | 4.250 |
| 2.302 | 0.399 | 4.250 |
| 2.251 | 0.395 | 4.250 |
| 2.200 | 0.391 | 4.250 |
| 2.149 | 0.387 | 4.250 |
| 2.097 | 0.382 | 4.250 |
| 2.046 | 0.377 | 4.250 |
| 1.995 | 0.372 | 4.250 |
| 1.944 | 0.367 | 4.250 |
| 1.892 | 0.362 | 4.250 |
| 1.841 | 0.356 | 4.250 |
| 1.790 | 0.350 | 4.250 |
| 1.739 | 0.344 | 4.250 |
| 1.688 | 0.337 | 4.250 |
| 1.637 | 0.330 | 4.250 |
| 1.586 | 0.323 | 4.250 |
| 1.535 | 0.316 | 4.250 |

TABLE 2-continued

| | X | Y | Z |
|---|---|---|---|
| | 1.484 | 0.308 | 4.250 |
| | 1.434 | 0.300 | 4.250 |
| | 1.383 | 0.292 | 4.250 |
| | 1.332 | 0.283 | 4.250 |
| | 1.281 | 0.274 | 4.250 |
| | 1.231 | 0.265 | 4.250 |
| | 1.180 | 0.256 | 4.250 |
| | 1.130 | 0.246 | 4.250 |
| | 1.079 | 0.236 | 4.250 |
| | 1.029 | 0.225 | 4.250 |
| | 0.979 | 0.215 | 4.250 |
| | 0.928 | 0.204 | 4.250 |
| | 0.878 | 0.192 | 4.250 |
| | 0.828 | 0.181 | 4.250 |
| | 0.778 | 0.169 | 4.250 |
| | 0.728 | 0.156 | 4.250 |
| | 0.678 | 0.144 | 4.250 |
| | 0.628 | 0.131 | 4.250 |
| | 0.579 | 0.118 | 4.250 |
| | 0.529 | 0.104 | 4.250 |
| | 0.479 | 0.091 | 4.250 |
| | 0.430 | 0.077 | 4.250 |
| | 0.380 | 0.062 | 4.250 |
| | 0.331 | 0.048 | 4.250 |
| | 0.282 | 0.033 | 4.250 |
| | 0.233 | 0.018 | 4.250 |
| | 0.184 | 0.002 | 4.250 |
| | 0.135 | −0.013 | 4.250 |
| | 0.086 | −0.029 | 4.250 |
| | 0.037 | −0.045 | 4.250 |
| | −0.012 | −0.062 | 4.250 |
| | −0.061 | −0.078 | 4.250 |
| | −0.109 | −0.095 | 4.250 |
| | −0.158 | −0.112 | 4.250 |
| | −0.206 | −0.130 | 4.250 |
| | −0.255 | −0.147 | 4.250 |
| | −0.303 | −0.165 | 4.250 |
| | −0.351 | −0.183 | 4.250 |
| | −0.399 | −0.201 | 4.250 |
| | −0.447 | −0.220 | 4.250 |
| | −0.495 | −0.238 | 4.250 |
| | −0.543 | −0.257 | 4.250 |
| | −0.591 | −0.276 | 4.250 |
| | −0.639 | −0.295 | 4.250 |
| | −0.686 | −0.314 | 4.250 |
| | −0.734 | −0.334 | 4.250 |
| | −0.782 | −0.353 | 4.250 |
| | −0.829 | −0.373 | 4.250 |
| | −0.877 | −0.393 | 4.250 |
| | −0.924 | −0.413 | 4.250 |
| | −0.972 | −0.433 | 4.250 |
| | −1.019 | −0.453 | 4.250 |
| | −1.066 | −0.473 | 4.250 |
| | −1.114 | −0.493 | 4.250 |
| | −1.161 | −0.514 | 4.250 |
| | −1.208 | −0.534 | 4.250 |
| | −1.255 | −0.554 | 4.250 |
| | −1.302 | −0.575 | 4.250 |
| | −1.350 | −0.595 | 4.250 |
| | −1.397 | −0.616 | 4.250 |
| | −1.444 | −0.636 | 4.250 |
| | −1.491 | −0.657 | 4.250 |
| | −1.539 | −0.677 | 4.250 |
| | −1.548 | −0.681 | 4.250 |
| | −1.557 | −0.685 | 4.250 |
| | −1.567 | −0.689 | 4.250 |
| | −1.576 | −0.693 | 4.250 |
| | −1.586 | −0.697 | 4.250 |
| | −1.595 | −0.701 | 4.250 |
| | −1.605 | −0.705 | 4.250 |
| | −1.614 | −0.709 | 4.250 |
| | −1.624 | −0.714 | 4.250 |
| | −1.633 | −0.718 | 4.250 |
| | −1.637 | −0.719 | 4.250 |
| | −1.640 | −0.720 | 4.250 |
| | −1.644 | −0.720 | 4.250 |
| | −1.648 | −0.719 | 4.250 |

TABLE 2-continued

| | X | Y | Z |
|---|---|---|---|
| | −1.651 | −0.718 | 4.250 |
| | −1.655 | −0.717 | 4.250 |
| | −1.658 | −0.715 | 4.250 |
| | −1.661 | −0.713 | 4.250 |
| | −1.664 | −0.710 | 4.250 |
| | −1.666 | −0.707 | 4.250 |
| | −1.668 | −0.703 | 4.250 |
| | −1.669 | −0.700 | 4.250 |
| | −1.669 | −0.696 | 4.250 |
| | −1.669 | −0.692 | 4.250 |
| | −1.669 | −0.689 | 4.250 |
| | −1.668 | −0.685 | 4.250 |
| | −1.666 | −0.682 | 4.250 |
| | −1.664 | −0.679 | 4.250 |
| SECTION 3 | −1.506 | −0.586 | 4.750 |
| | −1.498 | −0.580 | 4.750 |
| | −1.490 | −0.573 | 4.750 |
| | −1.481 | −0.567 | 4.750 |
| | −1.473 | −0.561 | 4.750 |
| | −1.465 | −0.555 | 4.750 |
| | −1.456 | −0.549 | 4.750 |
| | −1.448 | −0.543 | 4.750 |
| | −1.440 | −0.536 | 4.750 |
| | −1.431 | −0.530 | 4.750 |
| | −1.423 | −0.524 | 4.750 |
| | −1.380 | −0.495 | 4.750 |
| | −1.337 | −0.466 | 4.750 |
| | −1.294 | −0.437 | 4.750 |
| | −1.250 | −0.410 | 4.750 |
| | −1.206 | −0.383 | 4.750 |
| | −1.161 | −0.357 | 4.750 |
| | −1.116 | −0.331 | 4.750 |
| | −1.071 | −0.306 | 4.750 |
| | −1.025 | −0.282 | 4.750 |
| | −0.979 | −0.258 | 4.750 |
| | −0.933 | −0.235 | 4.750 |
| | −0.886 | −0.212 | 4.750 |
| | −0.839 | −0.190 | 4.750 |
| | −0.792 | −0.169 | 4.750 |
| | −0.745 | −0.148 | 4.750 |
| | −0.697 | −0.128 | 4.750 |
| | −0.649 | −0.108 | 4.750 |
| | −0.601 | −0.089 | 4.750 |
| | −0.553 | −0.070 | 4.750 |
| | −0.504 | −0.052 | 4.750 |
| | −0.456 | −0.034 | 4.750 |
| | −0.407 | −0.017 | 4.750 |
| | −0.358 | −0.001 | 4.750 |
| | −0.308 | 0.015 | 4.750 |
| | −0.259 | 0.031 | 4.750 |
| | −0.210 | 0.046 | 4.750 |
| | −0.160 | 0.061 | 4.750 |
| | −0.110 | 0.075 | 4.750 |
| | −0.060 | 0.089 | 4.750 |
| | −0.010 | 0.102 | 4.750 |
| | 0.040 | 0.116 | 4.750 |
| | 0.090 | 0.128 | 4.750 |
| | 0.141 | 0.140 | 4.750 |
| | 0.191 | 0.152 | 4.750 |
| | 0.241 | 0.164 | 4.750 |
| | 0.292 | 0.175 | 4.750 |
| | 0.343 | 0.186 | 4.750 |
| | 0.393 | 0.196 | 4.750 |
| | 0.444 | 0.206 | 4.750 |
| | 0.495 | 0.216 | 4.750 |
| | 0.546 | 0.225 | 4.750 |
| | 0.597 | 0.234 | 4.750 |
| | 0.648 | 0.243 | 4.750 |
| | 0.699 | 0.251 | 4.750 |
| | 0.750 | 0.259 | 4.750 |
| | 0.802 | 0.267 | 4.750 |
| | 0.853 | 0.275 | 4.750 |
| | 0.904 | 0.282 | 4.750 |
| | 0.955 | 0.289 | 4.750 |
| | 1.007 | 0.295 | 4.750 |
| | 1.058 | 0.302 | 4.750 |
| | 1.110 | 0.308 | 4.750 |

TABLE 2-continued

| X | Y | Z |
|---|---|---|
| 1.161 | 0.314 | 4.750 |
| 1.213 | 0.320 | 4.750 |
| 1.264 | 0.325 | 4.750 |
| 1.316 | 0.330 | 4.750 |
| 1.367 | 0.336 | 4.750 |
| 1.419 | 0.341 | 4.750 |
| 1.470 | 0.345 | 4.750 |
| 1.522 | 0.350 | 4.750 |
| 1.573 | 0.354 | 4.750 |
| 1.625 | 0.358 | 4.750 |
| 1.677 | 0.362 | 4.750 |
| 1.728 | 0.366 | 4.750 |
| 1.780 | 0.370 | 4.750 |
| 1.832 | 0.373 | 4.750 |
| 1.883 | 0.376 | 4.750 |
| 1.935 | 0.379 | 4.750 |
| 1.987 | 0.382 | 4.750 |
| 2.039 | 0.384 | 4.750 |
| 2.090 | 0.387 | 4.750 |
| 2.142 | 0.389 | 4.750 |
| 2.194 | 0.390 | 4.750 |
| 2.246 | 0.392 | 4.750 |
| 2.297 | 0.392 | 4.750 |
| 2.349 | 0.393 | 4.750 |
| 2.401 | 0.393 | 4.750 |
| 2.453 | 0.393 | 4.750 |
| 2.505 | 0.392 | 4.750 |
| 2.515 | 0.392 | 4.750 |
| 2.525 | 0.391 | 4.750 |
| 2.536 | 0.391 | 4.750 |
| 2.546 | 0.391 | 4.750 |
| 2.556 | 0.390 | 4.750 |
| 2.567 | 0.390 | 4.750 |
| 2.577 | 0.390 | 4.750 |
| 2.587 | 0.389 | 4.750 |
| 2.598 | 0.389 | 4.750 |
| 2.608 | 0.388 | 4.750 |
| 2.611 | 0.388 | 4.750 |
| 2.614 | 0.387 | 4.750 |
| 2.617 | 0.386 | 4.750 |
| 2.620 | 0.384 | 4.750 |
| 2.622 | 0.382 | 4.750 |
| 2.624 | 0.379 | 4.750 |
| 2.625 | 0.376 | 4.750 |
| 2.626 | 0.373 | 4.750 |
| 2.626 | 0.370 | 4.750 |
| 2.626 | 0.367 | 4.750 |
| 2.626 | 0.364 | 4.750 |
| 2.625 | 0.361 | 4.750 |
| 2.623 | 0.358 | 4.750 |
| 2.621 | 0.356 | 4.750 |
| 2.619 | 0.353 | 4.750 |
| 2.616 | 0.352 | 4.750 |
| 2.613 | 0.350 | 4.750 |
| 2.610 | 0.349 | 4.750 |
| 2.607 | 0.349 | 4.750 |
| 2.597 | 0.348 | 4.750 |
| 2.587 | 0.348 | 4.750 |
| 2.577 | 0.347 | 4.750 |
| 2.566 | 0.347 | 4.750 |
| 2.556 | 0.346 | 4.750 |
| 2.546 | 0.345 | 4.750 |
| 2.536 | 0.345 | 4.750 |
| 2.526 | 0.344 | 4.750 |
| 2.516 | 0.343 | 4.750 |
| 2.506 | 0.343 | 4.750 |
| 2.455 | 0.339 | 4.750 |
| 2.404 | 0.336 | 4.750 |
| 2.353 | 0.332 | 4.750 |
| 2.302 | 0.329 | 4.750 |
| 2.252 | 0.325 | 4.750 |
| 2.201 | 0.321 | 4.750 |
| 2.150 | 0.316 | 4.750 |
| 2.100 | 0.312 | 4.750 |
| 2.049 | 0.307 | 4.750 |
| 1.998 | 0.302 | 4.750 |
| 1.948 | 0.297 | 4.750 |

TABLE 2-continued

| X | Y | Z |
|---|---|---|
| 1.897 | 0.292 | 4.750 |
| 1.846 | 0.286 | 4.750 |
| 1.796 | 0.280 | 4.750 |
| 1.745 | 0.274 | 4.750 |
| 1.695 | 0.268 | 4.750 |
| 1.644 | 0.262 | 4.750 |
| 1.594 | 0.255 | 4.750 |
| 1.544 | 0.248 | 4.750 |
| 1.493 | 0.241 | 4.750 |
| 1.443 | 0.234 | 4.750 |
| 1.392 | 0.226 | 4.750 |
| 1.342 | 0.218 | 4.750 |
| 1.292 | 0.210 | 4.750 |
| 1.242 | 0.201 | 4.750 |
| 1.192 | 0.193 | 4.750 |
| 1.142 | 0.184 | 4.750 |
| 1.092 | 0.174 | 4.750 |
| 1.042 | 0.165 | 4.750 |
| 0.992 | 0.155 | 4.750 |
| 0.942 | 0.145 | 4.750 |
| 0.892 | 0.135 | 4.750 |
| 0.842 | 0.124 | 4.750 |
| 0.792 | 0.114 | 4.750 |
| 0.743 | 0.103 | 4.750 |
| 0.693 | 0.091 | 4.750 |
| 0.644 | 0.080 | 4.750 |
| 0.594 | 0.068 | 4.750 |
| 0.545 | 0.056 | 4.750 |
| 0.495 | 0.043 | 4.750 |
| 0.446 | 0.031 | 4.750 |
| 0.397 | 0.018 | 4.750 |
| 0.347 | 0.005 | 4.750 |
| 0.298 | −0.008 | 4.750 |
| 0.249 | −0.022 | 4.750 |
| 0.200 | −0.036 | 4.750 |
| 0.151 | −0.050 | 4.750 |
| 0.103 | −0.064 | 4.750 |
| 0.054 | −0.079 | 4.750 |
| 0.005 | −0.093 | 4.750 |
| −0.044 | −0.108 | 4.750 |
| −0.092 | −0.124 | 4.750 |
| −0.141 | −0.139 | 4.750 |
| −0.189 | −0.155 | 4.750 |
| −0.237 | −0.170 | 4.750 |
| −0.286 | −0.186 | 4.750 |
| −0.334 | −0.203 | 4.750 |
| −0.382 | −0.219 | 4.750 |
| −0.430 | −0.236 | 4.750 |
| −0.478 | −0.252 | 4.750 |
| −0.526 | −0.269 | 4.750 |
| −0.574 | −0.286 | 4.750 |
| −0.622 | −0.304 | 4.750 |
| −0.670 | −0.321 | 4.750 |
| −0.718 | −0.339 | 4.750 |
| −0.765 | −0.356 | 4.750 |
| −0.813 | −0.374 | 4.750 |
| −0.861 | −0.392 | 4.750 |
| −0.908 | −0.410 | 4.750 |
| −0.956 | −0.428 | 4.750 |
| −1.003 | −0.447 | 4.750 |
| −1.051 | −0.465 | 4.750 |
| −1.098 | −0.484 | 4.750 |
| −1.145 | −0.502 | 4.750 |
| −1.193 | −0.521 | 4.750 |
| −1.240 | −0.540 | 4.750 |
| −1.287 | −0.559 | 4.750 |
| −1.334 | −0.578 | 4.750 |
| −1.382 | −0.597 | 4.750 |
| −1.391 | −0.600 | 4.750 |
| −1.401 | −0.604 | 4.750 |
| −1.410 | −0.608 | 4.750 |
| −1.419 | −0.612 | 4.750 |
| −1.429 | −0.616 | 4.750 |
| −1.438 | −0.620 | 4.750 |
| −1.448 | −0.623 | 4.750 |
| −1.457 | −0.627 | 4.750 |
| −1.467 | −0.631 | 4.750 |

TABLE 2-continued

| | X | Y | Z |
|---|---|---|---|
| | −1.476 | −0.635 | 4.750 |
| | −1.480 | −0.636 | 4.750 |
| | −1.484 | −0.637 | 4.750 |
| | −1.489 | −0.637 | 4.750 |
| | −1.493 | −0.636 | 4.750 |
| | −1.497 | −0.635 | 4.750 |
| | −1.501 | −0.633 | 4.750 |
| | −1.505 | −0.631 | 4.750 |
| | −1.508 | −0.628 | 4.750 |
| | −1.511 | −0.625 | 4.750 |
| | −1.513 | −0.621 | 4.750 |
| | −1.515 | −0.617 | 4.750 |
| | −1.516 | −0.613 | 4.750 |
| | −1.516 | −0.609 | 4.750 |
| | −1.516 | −0.604 | 4.750 |
| | −1.515 | −0.600 | 4.750 |
| | −1.514 | −0.596 | 4.750 |
| | −1.512 | −0.592 | 4.750 |
| | −1.509 | −0.589 | 4.750 |
| SECTION 4 | −1.359 | −0.497 | 5.250 |
| | −1.351 | −0.491 | 5.250 |
| | −1.342 | −0.485 | 5.250 |
| | −1.334 | −0.479 | 5.250 |
| | −1.326 | −0.474 | 5.250 |
| | −1.317 | −0.468 | 5.250 |
| | −1.309 | −0.462 | 5.250 |
| | −1.300 | −0.456 | 5.250 |
| | −1.292 | −0.451 | 5.250 |
| | −1.283 | −0.445 | 5.250 |
| | −1.275 | −0.439 | 5.250 |
| | −1.232 | −0.412 | 5.250 |
| | −1.188 | −0.385 | 5.250 |
| | −1.144 | −0.359 | 5.250 |
| | −1.100 | −0.333 | 5.250 |
| | −1.055 | −0.308 | 5.250 |
| | −1.010 | −0.284 | 5.250 |
| | −0.964 | −0.261 | 5.250 |
| | −0.918 | −0.238 | 5.250 |
| | −0.872 | −0.216 | 5.250 |
| | −0.826 | −0.195 | 5.250 |
| | −0.779 | −0.174 | 5.250 |
| | −0.732 | −0.154 | 5.250 |
| | −0.685 | −0.134 | 5.250 |
| | −0.637 | −0.115 | 5.250 |
| | −0.589 | −0.097 | 5.250 |
| | −0.541 | −0.079 | 5.250 |
| | −0.493 | −0.062 | 5.250 |
| | −0.445 | −0.046 | 5.250 |
| | −0.396 | −0.029 | 5.250 |
| | −0.347 | −0.014 | 5.250 |
| | −0.298 | 0.001 | 5.250 |
| | −0.249 | 0.016 | 5.250 |
| | −0.200 | 0.030 | 5.250 |
| | −0.151 | 0.043 | 5.250 |
| | −0.101 | 0.056 | 5.250 |
| | −0.052 | 0.069 | 5.250 |
| | −0.002 | 0.081 | 5.250 |
| | 0.048 | 0.092 | 5.250 |
| | 0.098 | 0.104 | 5.250 |
| | 0.148 | 0.115 | 5.250 |
| | 0.198 | 0.125 | 5.250 |
| | 0.248 | 0.135 | 5.250 |
| | 0.298 | 0.145 | 5.250 |
| | 0.349 | 0.154 | 5.250 |
| | 0.399 | 0.163 | 5.250 |
| | 0.449 | 0.172 | 5.250 |
| | 0.500 | 0.181 | 5.250 |
| | 0.550 | 0.189 | 5.250 |
| | 0.601 | 0.196 | 5.250 |
| | 0.652 | 0.204 | 5.250 |
| | 0.702 | 0.211 | 5.250 |
| | 0.753 | 0.218 | 5.250 |
| | 0.804 | 0.224 | 5.250 |
| | 0.855 | 0.230 | 5.250 |
| | 0.905 | 0.236 | 5.250 |
| | 0.956 | 0.242 | 5.250 |
| | 1.007 | 0.248 | 5.250 |

TABLE 2-continued

| X | Y | Z |
|---|---|---|
| 1.058 | 0.253 | 5.250 |
| 1.109 | 0.258 | 5.250 |
| 1.160 | 0.263 | 5.250 |
| 1.211 | 0.267 | 5.250 |
| 1.262 | 0.272 | 5.250 |
| 1.313 | 0.276 | 5.250 |
| 1.364 | 0.280 | 5.250 |
| 1.415 | 0.284 | 5.250 |
| 1.466 | 0.288 | 5.250 |
| 1.517 | 0.292 | 5.250 |
| 1.568 | 0.295 | 5.250 |
| 1.619 | 0.299 | 5.250 |
| 1.670 | 0.302 | 5.250 |
| 1.721 | 0.305 | 5.250 |
| 1.772 | 0.309 | 5.250 |
| 1.823 | 0.312 | 5.250 |
| 1.874 | 0.314 | 5.250 |
| 1.925 | 0.317 | 5.250 |
| 1.977 | 0.320 | 5.250 |
| 2.028 | 0.322 | 5.250 |
| 2.079 | 0.325 | 5.250 |
| 2.130 | 0.327 | 5.250 |
| 2.181 | 0.329 | 5.250 |
| 2.232 | 0.331 | 5.250 |
| 2.283 | 0.332 | 5.250 |
| 2.334 | 0.334 | 5.250 |
| 2.386 | 0.335 | 5.250 |
| 2.437 | 0.335 | 5.250 |
| 2.488 | 0.336 | 5.250 |
| 2.539 | 0.336 | 5.250 |
| 2.590 | 0.336 | 5.250 |
| 2.641 | 0.335 | 5.250 |
| 2.652 | 0.335 | 5.250 |
| 2.662 | 0.334 | 5.250 |
| 2.672 | 0.334 | 5.250 |
| 2.682 | 0.334 | 5.250 |
| 2.693 | 0.334 | 5.250 |
| 2.703 | 0.333 | 5.250 |
| 2.713 | 0.333 | 5.250 |
| 2.723 | 0.333 | 5.250 |
| 2.734 | 0.332 | 5.250 |
| 2.744 | 0.332 | 5.250 |
| 2.747 | 0.331 | 5.250 |
| 2.750 | 0.330 | 5.250 |
| 2.753 | 0.329 | 5.250 |
| 2.755 | 0.327 | 5.250 |
| 2.758 | 0.325 | 5.250 |
| 2.759 | 0.322 | 5.250 |
| 2.761 | 0.320 | 5.250 |
| 2.762 | 0.317 | 5.250 |
| 2.762 | 0.313 | 5.250 |
| 2.762 | 0.310 | 5.250 |
| 2.761 | 0.307 | 5.250 |
| 2.760 | 0.304 | 5.250 |
| 2.759 | 0.301 | 5.250 |
| 2.757 | 0.299 | 5.250 |
| 2.755 | 0.297 | 5.250 |
| 2.752 | 0.295 | 5.250 |
| 2.749 | 0.293 | 5.250 |
| 2.746 | 0.293 | 5.250 |
| 2.743 | 0.292 | 5.250 |
| 2.733 | 0.292 | 5.250 |
| 2.723 | 0.291 | 5.250 |
| 2.713 | 0.290 | 5.250 |
| 2.703 | 0.290 | 5.250 |
| 2.693 | 0.289 | 5.250 |
| 2.683 | 0.289 | 5.250 |
| 2.673 | 0.288 | 5.250 |
| 2.663 | 0.288 | 5.250 |
| 2.653 | 0.287 | 5.250 |
| 2.643 | 0.286 | 5.250 |
| 2.592 | 0.283 | 5.250 |
| 2.542 | 0.280 | 5.250 |
| 2.492 | 0.277 | 5.250 |
| 2.442 | 0.274 | 5.250 |
| 2.391 | 0.270 | 5.250 |
| 2.341 | 0.267 | 5.250 |

TABLE 2-continued

| | X | Y | Z |
|---|---|---|---|
| | 2.291 | 0.263 | 5.250 |
| | 2.241 | 0.259 | 5.250 |
| | 2.191 | 0.255 | 5.250 |
| | 2.141 | 0.251 | 5.250 |
| | 2.090 | 0.246 | 5.250 |
| | 2.040 | 0.242 | 5.250 |
| | 1.990 | 0.237 | 5.250 |
| | 1.940 | 0.232 | 5.250 |
| | 1.890 | 0.227 | 5.250 |
| | 1.840 | 0.222 | 5.250 |
| | 1.790 | 0.217 | 5.250 |
| | 1.740 | 0.211 | 5.250 |
| | 1.690 | 0.206 | 5.250 |
| | 1.640 | 0.200 | 5.250 |
| | 1.590 | 0.193 | 5.250 |
| | 1.540 | 0.187 | 5.250 |
| | 1.490 | 0.181 | 5.250 |
| | 1.440 | 0.174 | 5.250 |
| | 1.390 | 0.167 | 5.250 |
| | 1.341 | 0.160 | 5.250 |
| | 1.291 | 0.152 | 5.250 |
| | 1.241 | 0.145 | 5.250 |
| | 1.191 | 0.137 | 5.250 |
| | 1.142 | 0.129 | 5.250 |
| | 1.092 | 0.120 | 5.250 |
| | 1.042 | 0.112 | 5.250 |
| | 0.993 | 0.103 | 5.250 |
| | 0.943 | 0.094 | 5.250 |
| | 0.894 | 0.085 | 5.250 |
| | 0.844 | 0.076 | 5.250 |
| | 0.795 | 0.066 | 5.250 |
| | 0.746 | 0.056 | 5.250 |
| | 0.696 | 0.046 | 5.250 |
| | 0.647 | 0.036 | 5.250 |
| | 0.598 | 0.025 | 5.250 |
| | 0.549 | 0.014 | 5.250 |
| | 0.500 | 0.003 | 5.250 |
| | 0.451 | −0.008 | 5.250 |
| | 0.402 | −0.019 | 5.250 |
| | 0.353 | −0.031 | 5.250 |
| | 0.304 | −0.043 | 5.250 |
| | 0.255 | −0.055 | 5.250 |
| | 0.206 | −0.067 | 5.250 |
| | 0.157 | −0.079 | 5.250 |
| | 0.108 | −0.092 | 5.250 |
| | 0.060 | −0.105 | 5.250 |
| | 0.011 | −0.118 | 5.250 |
| | −0.037 | −0.131 | 5.250 |
| | −0.086 | −0.145 | 5.250 |
| | −0.134 | −0.159 | 5.250 |
| | −0.183 | −0.172 | 5.250 |
| | −0.231 | −0.187 | 5.250 |
| | −0.279 | −0.201 | 5.250 |
| | −0.327 | −0.215 | 5.250 |
| | −0.376 | −0.230 | 5.250 |
| | −0.424 | −0.245 | 5.250 |
| | −0.472 | −0.260 | 5.250 |
| | −0.520 | −0.275 | 5.250 |
| | −0.568 | −0.290 | 5.250 |
| | −0.616 | −0.305 | 5.250 |
| | −0.663 | −0.321 | 5.250 |
| | −0.711 | −0.337 | 5.250 |
| | −0.759 | −0.352 | 5.250 |
| | −0.807 | −0.368 | 5.250 |
| | −0.854 | −0.385 | 5.250 |
| | −0.902 | −0.401 | 5.250 |
| | −0.950 | −0.417 | 5.250 |
| | −0.997 | −0.434 | 5.250 |
| | −1.045 | −0.450 | 5.250 |
| | −1.092 | −0.467 | 5.250 |
| | −1.140 | −0.484 | 5.250 |
| | −1.187 | −0.501 | 5.250 |
| | −1.234 | −0.518 | 5.250 |
| | −1.244 | −0.521 | 5.250 |
| | −1.253 | −0.524 | 5.250 |
| | −1.263 | −0.528 | 5.250 |
| | −1.272 | −0.531 | 5.250 |

TABLE 2-continued

| | X | Y | Z |
|---|---|---|---|
| | −1.282 | −0.535 | 5.250 |
| | −1.291 | −0.538 | 5.250 |
| | −1.301 | −0.541 | 5.250 |
| | −1.310 | −0.545 | 5.250 |
| | −1.320 | −0.548 | 5.250 |
| | −1.329 | −0.552 | 5.250 |
| | −1.334 | −0.553 | 5.250 |
| | −1.338 | −0.554 | 5.250 |
| | −1.343 | −0.553 | 5.250 |
| | −1.348 | −0.552 | 5.250 |
| | −1.352 | −0.551 | 5.250 |
| | −1.356 | −0.549 | 5.250 |
| | −1.360 | −0.546 | 5.250 |
| | −1.364 | −0.543 | 5.250 |
| | −1.366 | −0.539 | 5.250 |
| | −1.369 | −0.535 | 5.250 |
| | −1.370 | −0.531 | 5.250 |
| | −1.371 | −0.526 | 5.250 |
| | −1.372 | −0.521 | 5.250 |
| | −1.371 | −0.517 | 5.250 |
| | −1.370 | −0.512 | 5.250 |
| | −1.368 | −0.508 | 5.250 |
| | −1.366 | −0.504 | 5.250 |
| | −1.363 | −0.500 | 5.250 |
| SECTION 5 | −1.223 | −0.409 | 5.750 |
| | −1.215 | −0.404 | 5.750 |
| | −1.206 | −0.399 | 5.750 |
| | −1.197 | −0.394 | 5.750 |
| | −1.189 | −0.388 | 5.750 |
| | −1.180 | −0.383 | 5.750 |
| | −1.171 | −0.378 | 5.750 |
| | −1.163 | −0.373 | 5.750 |
| | −1.154 | −0.368 | 5.750 |
| | −1.145 | −0.363 | 5.750 |
| | −1.137 | −0.358 | 5.750 |
| | −1.093 | −0.333 | 5.750 |
| | −1.048 | −0.309 | 5.750 |
| | −1.004 | −0.285 | 5.750 |
| | −0.959 | −0.263 | 5.750 |
| | −0.913 | −0.241 | 5.750 |
| | −0.867 | −0.219 | 5.750 |
| | −0.821 | −0.198 | 5.750 |
| | −0.775 | −0.178 | 5.750 |
| | −0.728 | −0.159 | 5.750 |
| | −0.682 | −0.140 | 5.750 |
| | −0.634 | −0.122 | 5.750 |
| | −0.587 | −0.105 | 5.750 |
| | −0.540 | −0.088 | 5.750 |
| | −0.492 | −0.071 | 5.750 |
| | −0.444 | −0.055 | 5.750 |
| | −0.396 | −0.040 | 5.750 |
| | −0.348 | −0.025 | 5.750 |
| | −0.299 | −0.011 | 5.750 |
| | −0.250 | 0.002 | 5.750 |
| | −0.202 | 0.015 | 5.750 |
| | −0.153 | 0.028 | 5.750 |
| | −0.104 | 0.040 | 5.750 |
| | −0.055 | 0.052 | 5.750 |
| | −0.006 | 0.063 | 5.750 |
| | 0.044 | 0.074 | 5.750 |
| | 0.093 | 0.084 | 5.750 |
| | 0.143 | 0.094 | 5.750 |
| | 0.192 | 0.103 | 5.750 |
| | 0.242 | 0.112 | 5.750 |
| | 0.292 | 0.121 | 5.750 |
| | 0.341 | 0.129 | 5.750 |
| | 0.391 | 0.137 | 5.750 |
| | 0.441 | 0.145 | 5.750 |
| | 0.491 | 0.152 | 5.750 |
| | 0.541 | 0.159 | 5.750 |
| | 0.591 | 0.166 | 5.750 |
| | 0.641 | 0.172 | 5.750 |
| | 0.691 | 0.179 | 5.750 |
| | 0.741 | 0.184 | 5.750 |
| | 0.792 | 0.190 | 5.750 |
| | 0.842 | 0.195 | 5.750 |
| | 0.892 | 0.200 | 5.750 |

TABLE 2-continued

| X | Y | Z |
|---|---|---|
| 0.942 | 0.205 | 5.750 |
| 0.992 | 0.210 | 5.750 |
| 1.043 | 0.214 | 5.750 |
| 1.093 | 0.218 | 5.750 |
| 1.143 | 0.222 | 5.750 |
| 1.194 | 0.226 | 5.750 |
| 1.244 | 0.229 | 5.750 |
| 1.294 | 0.232 | 5.750 |
| 1.345 | 0.236 | 5.750 |
| 1.395 | 0.239 | 5.750 |
| 1.446 | 0.242 | 5.750 |
| 1.496 | 0.244 | 5.750 |
| 1.546 | 0.247 | 5.750 |
| 1.597 | 0.250 | 5.750 |
| 1.647 | 0.252 | 5.750 |
| 1.698 | 0.255 | 5.750 |
| 1.748 | 0.257 | 5.750 |
| 1.798 | 0.259 | 5.750 |
| 1.849 | 0.262 | 5.750 |
| 1.899 | 0.264 | 5.750 |
| 1.950 | 0.266 | 5.750 |
| 2.000 | 0.268 | 5.750 |
| 2.051 | 0.270 | 5.750 |
| 2.101 | 0.272 | 5.750 |
| 2.151 | 0.274 | 5.750 |
| 2.202 | 0.275 | 5.750 |
| 2.252 | 0.277 | 5.750 |
| 2.303 | 0.278 | 5.750 |
| 2.353 | 0.280 | 5.750 |
| 2.404 | 0.281 | 5.750 |
| 2.454 | 0.282 | 5.750 |
| 2.505 | 0.283 | 5.750 |
| 2.555 | 0.283 | 5.750 |
| 2.606 | 0.284 | 5.750 |
| 2.656 | 0.284 | 5.750 |
| 2.706 | 0.283 | 5.750 |
| 2.757 | 0.283 | 5.750 |
| 2.767 | 0.282 | 5.750 |
| 2.777 | 0.282 | 5.750 |
| 2.787 | 0.282 | 5.750 |
| 2.797 | 0.282 | 5.750 |
| 2.807 | 0.282 | 5.750 |
| 2.818 | 0.281 | 5.750 |
| 2.828 | 0.281 | 5.750 |
| 2.838 | 0.281 | 5.750 |
| 2.848 | 0.280 | 5.750 |
| 2.858 | 0.280 | 5.750 |
| 2.861 | 0.280 | 5.750 |
| 2.864 | 0.279 | 5.750 |
| 2.867 | 0.277 | 5.750 |
| 2.870 | 0.275 | 5.750 |
| 2.872 | 0.273 | 5.750 |
| 2.874 | 0.271 | 5.750 |
| 2.875 | 0.268 | 5.750 |
| 2.876 | 0.265 | 5.750 |
| 2.876 | 0.262 | 5.750 |
| 2.876 | 0.258 | 5.750 |
| 2.876 | 0.255 | 5.750 |
| 2.875 | 0.252 | 5.750 |
| 2.873 | 0.249 | 5.750 |
| 2.871 | 0.247 | 5.750 |
| 2.869 | 0.245 | 5.750 |
| 2.867 | 0.243 | 5.750 |
| 2.864 | 0.242 | 5.750 |
| 2.861 | 0.241 | 5.750 |
| 2.858 | 0.240 | 5.750 |
| 2.848 | 0.240 | 5.750 |
| 2.838 | 0.239 | 5.750 |
| 2.828 | 0.239 | 5.750 |
| 2.818 | 0.238 | 5.750 |
| 2.808 | 0.237 | 5.750 |
| 2.798 | 0.237 | 5.750 |
| 2.788 | 0.236 | 5.750 |
| 2.778 | 0.236 | 5.750 |
| 2.768 | 0.235 | 5.750 |
| 2.758 | 0.235 | 5.750 |
| 2.709 | 0.232 | 5.750 |

TABLE 2-continued

| X | Y | Z |
|---|---|---|
| 2.659 | 0.229 | 5.750 |
| 2.609 | 0.226 | 5.750 |
| 2.560 | 0.223 | 5.750 |
| 2.510 | 0.220 | 5.750 |
| 2.460 | 0.217 | 5.750 |
| 2.411 | 0.213 | 5.750 |
| 2.361 | 0.210 | 5.750 |
| 2.312 | 0.206 | 5.750 |
| 2.262 | 0.203 | 5.750 |
| 2.212 | 0.199 | 5.750 |
| 2.163 | 0.195 | 5.750 |
| 2.113 | 0.191 | 5.750 |
| 2.064 | 0.187 | 5.750 |
| 2.014 | 0.183 | 5.750 |
| 1.965 | 0.178 | 5.750 |
| 1.915 | 0.174 | 5.750 |
| 1.866 | 0.169 | 5.750 |
| 1.816 | 0.164 | 5.750 |
| 1.767 | 0.159 | 5.750 |
| 1.717 | 0.154 | 5.750 |
| 1.668 | 0.149 | 5.750 |
| 1.618 | 0.143 | 5.750 |
| 1.569 | 0.138 | 5.750 |
| 1.520 | 0.132 | 5.750 |
| 1.470 | 0.126 | 5.750 |
| 1.421 | 0.120 | 5.750 |
| 1.371 | 0.114 | 5.750 |
| 1.322 | 0.107 | 5.750 |
| 1.273 | 0.100 | 5.750 |
| 1.224 | 0.093 | 5.750 |
| 1.174 | 0.086 | 5.750 |
| 1.125 | 0.079 | 5.750 |
| 1.076 | 0.072 | 5.750 |
| 1.027 | 0.064 | 5.750 |
| 0.978 | 0.056 | 5.750 |
| 0.929 | 0.048 | 5.750 |
| 0.880 | 0.040 | 5.750 |
| 0.831 | 0.032 | 5.750 |
| 0.782 | 0.023 | 5.750 |
| 0.733 | 0.014 | 5.750 |
| 0.684 | 0.005 | 5.750 |
| 0.635 | −0.004 | 5.750 |
| 0.586 | −0.013 | 5.750 |
| 0.537 | −0.023 | 5.750 |
| 0.489 | −0.032 | 5.750 |
| 0.440 | −0.042 | 5.750 |
| 0.391 | −0.052 | 5.750 |
| 0.342 | −0.063 | 5.750 |
| 0.294 | −0.073 | 5.750 |
| 0.245 | −0.084 | 5.750 |
| 0.197 | −0.094 | 5.750 |
| 0.148 | −0.105 | 5.750 |
| 0.100 | −0.117 | 5.750 |
| 0.051 | −0.128 | 5.750 |
| 0.003 | −0.139 | 5.750 |
| −0.045 | −0.151 | 5.750 |
| −0.094 | −0.163 | 5.750 |
| −0.142 | −0.175 | 5.750 |
| −0.190 | −0.187 | 5.750 |
| −0.238 | −0.199 | 5.750 |
| −0.286 | −0.212 | 5.750 |
| −0.335 | −0.224 | 5.750 |
| −0.383 | −0.237 | 5.750 |
| −0.431 | −0.250 | 5.750 |
| −0.479 | −0.263 | 5.750 |
| −0.527 | −0.276 | 5.750 |
| −0.575 | −0.289 | 5.750 |
| −0.623 | −0.302 | 5.750 |
| −0.670 | −0.316 | 5.750 |
| −0.718 | −0.329 | 5.750 |
| −0.766 | −0.343 | 5.750 |
| −0.814 | −0.357 | 5.750 |
| −0.862 | −0.370 | 5.750 |
| −0.909 | −0.384 | 5.750 |
| −0.957 | −0.398 | 5.750 |
| −1.005 | −0.412 | 5.750 |
| −1.053 | −0.426 | 5.750 |

TABLE 2-continued

| | X | Y | Z |
|---|---|---|---|
| | −1.100 | −0.440 | 5.750 |
| | −1.110 | −0.443 | 5.750 |
| | −1.119 | −0.446 | 5.750 |
| | −1.129 | −0.449 | 5.750 |
| | −1.138 | −0.451 | 5.750 |
| | −1.148 | −0.454 | 5.750 |
| | −1.158 | −0.457 | 5.750 |
| | −1.167 | −0.460 | 5.750 |
| | −1.177 | −0.463 | 5.750 |
| | −1.186 | −0.465 | 5.750 |
| | −1.196 | −0.468 | 5.750 |
| | −1.200 | −0.469 | 5.750 |
| | −1.205 | −0.470 | 5.750 |
| | −1.210 | −0.469 | 5.750 |
| | −1.215 | −0.468 | 5.750 |
| | −1.220 | −0.466 | 5.750 |
| | −1.224 | −0.463 | 5.750 |
| | −1.227 | −0.460 | 5.750 |
| | −1.231 | −0.457 | 5.750 |
| | −1.234 | −0.453 | 5.750 |
| | −1.236 | −0.448 | 5.750 |
| | −1.237 | −0.444 | 5.750 |
| | −1.238 | −0.439 | 5.750 |
| | −1.238 | −0.434 | 5.750 |
| | −1.237 | −0.429 | 5.750 |
| | −1.236 | −0.424 | 5.750 |
| | −1.233 | −0.420 | 5.750 |
| | −1.231 | −0.416 | 5.750 |
| | −1.227 | −0.412 | 5.750 |
| SECTION 6 | −1.098 | −0.323 | 6.250 |
| | −1.089 | −0.319 | 6.250 |
| | −1.081 | −0.314 | 6.250 |
| | −1.072 | −0.310 | 6.250 |
| | −1.063 | −0.306 | 6.250 |
| | −1.054 | −0.301 | 6.250 |
| | −1.045 | −0.297 | 6.250 |
| | −1.036 | −0.292 | 6.250 |
| | −1.027 | −0.288 | 6.250 |
| | −1.018 | −0.284 | 6.250 |
| | −1.009 | −0.280 | 6.250 |
| | −0.964 | −0.259 | 6.250 |
| | −0.919 | −0.238 | 6.250 |
| | −0.873 | −0.218 | 6.250 |
| | −0.828 | −0.199 | 6.250 |
| | −0.782 | −0.180 | 6.250 |
| | −0.735 | −0.162 | 6.250 |
| | −0.689 | −0.145 | 6.250 |
| | −0.642 | −0.128 | 6.250 |
| | −0.595 | −0.112 | 6.250 |
| | −0.548 | −0.096 | 6.250 |
| | −0.501 | −0.080 | 6.250 |
| | −0.454 | −0.066 | 6.250 |
| | −0.406 | −0.051 | 6.250 |
| | −0.358 | −0.038 | 6.250 |
| | −0.310 | −0.024 | 6.250 |
| | −0.262 | −0.012 | 6.250 |
| | −0.214 | 0.001 | 6.250 |
| | −0.166 | 0.013 | 6.250 |
| | −0.118 | 0.024 | 6.250 |
| | −0.069 | 0.035 | 6.250 |
| | −0.021 | 0.045 | 6.250 |
| | 0.028 | 0.055 | 6.250 |
| | 0.077 | 0.065 | 6.250 |
| | 0.125 | 0.074 | 6.250 |
| | 0.174 | 0.083 | 6.250 |
| | 0.223 | 0.091 | 6.250 |
| | 0.272 | 0.099 | 6.250 |
| | 0.321 | 0.107 | 6.250 |
| | 0.370 | 0.114 | 6.250 |
| | 0.420 | 0.121 | 6.250 |
| | 0.469 | 0.127 | 6.250 |
| | 0.518 | 0.134 | 6.250 |
| | 0.567 | 0.140 | 6.250 |
| | 0.617 | 0.145 | 6.250 |
| | 0.666 | 0.151 | 6.250 |
| | 0.715 | 0.156 | 6.250 |
| | 0.765 | 0.161 | 6.250 |

TABLE 2-continued

| X | Y | Z |
|---|---|---|
| 0.814 | 0.166 | 6.250 |
| 0.864 | 0.170 | 6.250 |
| 0.913 | 0.174 | 6.250 |
| 0.963 | 0.178 | 6.250 |
| 1.012 | 0.182 | 6.250 |
| 1.062 | 0.185 | 6.250 |
| 1.111 | 0.188 | 6.250 |
| 1.161 | 0.191 | 6.250 |
| 1.211 | 0.194 | 6.250 |
| 1.260 | 0.197 | 6.250 |
| 1.310 | 0.200 | 6.250 |
| 1.359 | 0.202 | 6.250 |
| 1.409 | 0.204 | 6.250 |
| 1.459 | 0.206 | 6.250 |
| 1.508 | 0.208 | 6.250 |
| 1.558 | 0.210 | 6.250 |
| 1.607 | 0.212 | 6.250 |
| 1.657 | 0.214 | 6.250 |
| 1.707 | 0.216 | 6.250 |
| 1.756 | 0.217 | 6.250 |
| 1.806 | 0.219 | 6.250 |
| 1.856 | 0.220 | 6.250 |
| 1.905 | 0.222 | 6.250 |
| 1.955 | 0.223 | 6.250 |
| 2.004 | 0.224 | 6.250 |
| 2.054 | 0.226 | 6.250 |
| 2.104 | 0.227 | 6.250 |
| 2.153 | 0.228 | 6.250 |
| 2.203 | 0.229 | 6.250 |
| 2.253 | 0.231 | 6.250 |
| 2.302 | 0.232 | 6.250 |
| 2.352 | 0.233 | 6.250 |
| 2.402 | 0.234 | 6.250 |
| 2.451 | 0.234 | 6.250 |
| 2.501 | 0.235 | 6.250 |
| 2.551 | 0.236 | 6.250 |
| 2.600 | 0.236 | 6.250 |
| 2.650 | 0.237 | 6.250 |
| 2.700 | 0.237 | 6.250 |
| 2.749 | 0.237 | 6.250 |
| 2.799 | 0.236 | 6.250 |
| 2.849 | 0.236 | 6.250 |
| 2.858 | 0.236 | 6.250 |
| 2.868 | 0.235 | 6.250 |
| 2.878 | 0.235 | 6.250 |
| 2.888 | 0.235 | 6.250 |
| 2.898 | 0.235 | 6.250 |
| 2.908 | 0.234 | 6.250 |
| 2.918 | 0.234 | 6.250 |
| 2.928 | 0.234 | 6.250 |
| 2.938 | 0.234 | 6.250 |
| 2.948 | 0.233 | 6.250 |
| 2.951 | 0.233 | 6.250 |
| 2.954 | 0.232 | 6.250 |
| 2.957 | 0.231 | 6.250 |
| 2.960 | 0.229 | 6.250 |
| 2.962 | 0.227 | 6.250 |
| 2.964 | 0.224 | 6.250 |
| 2.965 | 0.221 | 6.250 |
| 2.966 | 0.218 | 6.250 |
| 2.967 | 0.215 | 6.250 |
| 2.967 | 0.212 | 6.250 |
| 2.966 | 0.209 | 6.250 |
| 2.965 | 0.206 | 6.250 |
| 2.964 | 0.203 | 6.250 |
| 2.962 | 0.200 | 6.250 |
| 2.959 | 0.198 | 6.250 |
| 2.957 | 0.196 | 6.250 |
| 2.954 | 0.195 | 6.250 |
| 2.951 | 0.194 | 6.250 |
| 2.948 | 0.194 | 6.250 |
| 2.938 | 0.193 | 6.250 |
| 2.928 | 0.193 | 6.250 |
| 2.918 | 0.192 | 6.250 |
| 2.909 | 0.191 | 6.250 |
| 2.899 | 0.191 | 6.250 |
| 2.889 | 0.190 | 6.250 |

TABLE 2-continued

| | X | Y | Z |
|---|---|---|---|
| | 2.879 | 0.190 | 6.250 |
| | 2.869 | 0.189 | 6.250 |
| | 2.860 | 0.189 | 6.250 |
| | 2.850 | 0.188 | 6.250 |
| | 2.801 | 0.185 | 6.250 |
| | 2.752 | 0.183 | 6.250 |
| | 2.703 | 0.180 | 6.250 |
| | 2.654 | 0.177 | 6.250 |
| | 2.605 | 0.174 | 6.250 |
| | 2.556 | 0.171 | 6.250 |
| | 2.507 | 0.168 | 6.250 |
| | 2.458 | 0.165 | 6.250 |
| | 2.409 | 0.162 | 6.250 |
| | 2.360 | 0.158 | 6.250 |
| | 2.311 | 0.155 | 6.250 |
| | 2.262 | 0.151 | 6.250 |
| | 2.213 | 0.148 | 6.250 |
| | 2.164 | 0.144 | 6.250 |
| | 2.116 | 0.141 | 6.250 |
| | 2.067 | 0.137 | 6.250 |
| | 2.018 | 0.133 | 6.250 |
| | 1.969 | 0.129 | 6.250 |
| | 1.920 | 0.124 | 6.250 |
| | 1.871 | 0.120 | 6.250 |
| | 1.822 | 0.116 | 6.250 |
| | 1.773 | 0.111 | 6.250 |
| | 1.725 | 0.107 | 6.250 |
| | 1.676 | 0.102 | 6.250 |
| | 1.627 | 0.097 | 6.250 |
| | 1.578 | 0.092 | 6.250 |
| | 1.529 | 0.086 | 6.250 |
| | 1.481 | 0.081 | 6.250 |
| | 1.432 | 0.076 | 6.250 |
| | 1.383 | 0.070 | 6.250 |
| | 1.334 | 0.064 | 6.250 |
| | 1.286 | 0.058 | 6.250 |
| | 1.237 | 0.052 | 6.250 |
| | 1.188 | 0.046 | 6.250 |
| | 1.140 | 0.039 | 6.250 |
| | 1.091 | 0.033 | 6.250 |
| | 1.043 | 0.026 | 6.250 |
| | 0.994 | 0.019 | 6.250 |
| | 0.945 | 0.012 | 6.250 |
| | 0.897 | 0.005 | 6.250 |
| | 0.848 | −0.002 | 6.250 |
| | 0.800 | −0.010 | 6.250 |
| | 0.751 | −0.018 | 6.250 |
| | 0.703 | −0.025 | 6.250 |
| | 0.655 | −0.033 | 6.250 |
| | 0.606 | −0.041 | 6.250 |
| | 0.558 | −0.050 | 6.250 |
| | 0.510 | −0.058 | 6.250 |
| | 0.461 | −0.067 | 6.250 |
| | 0.413 | −0.075 | 6.250 |
| | 0.365 | −0.084 | 6.250 |
| | 0.316 | −0.093 | 6.250 |
| | 0.268 | −0.102 | 6.250 |
| | 0.220 | −0.111 | 6.250 |
| | 0.172 | −0.121 | 6.250 |
| | 0.124 | −0.130 | 6.250 |
| | 0.076 | −0.140 | 6.250 |
| | 0.028 | −0.149 | 6.250 |
| | −0.021 | −0.159 | 6.250 |
| | −0.069 | −0.169 | 6.250 |
| | −0.117 | −0.179 | 6.250 |
| | −0.165 | −0.189 | 6.250 |
| | −0.213 | −0.199 | 6.250 |
| | −0.261 | −0.209 | 6.250 |
| | −0.309 | −0.219 | 6.250 |
| | −0.357 | −0.230 | 6.250 |
| | −0.405 | −0.240 | 6.250 |
| | −0.453 | −0.250 | 6.250 |
| | −0.500 | −0.261 | 6.250 |
| | −0.548 | −0.271 | 6.250 |
| | −0.596 | −0.282 | 6.250 |
| | −0.644 | −0.292 | 6.250 |
| | −0.692 | −0.303 | 6.250 |

TABLE 2-continued

| | X | Y | Z |
|---|---|---|---|
| | −0.740 | −0.313 | 6.250 |
| | −0.788 | −0.323 | 6.250 |
| | −0.836 | −0.334 | 6.250 |
| | −0.884 | −0.344 | 6.250 |
| | −0.932 | −0.354 | 6.250 |
| | −0.980 | −0.364 | 6.250 |
| | −0.990 | −0.367 | 6.250 |
| | −0.999 | −0.369 | 6.250 |
| | −1.009 | −0.371 | 6.250 |
| | −1.018 | −0.373 | 6.250 |
| | −1.028 | −0.375 | 6.250 |
| | −1.038 | −0.377 | 6.250 |
| | −1.047 | −0.379 | 6.250 |
| | −1.057 | −0.381 | 6.250 |
| | −1.066 | −0.383 | 6.250 |
| | −1.076 | −0.385 | 6.250 |
| | −1.081 | −0.385 | 6.250 |
| | −1.086 | −0.385 | 6.250 |
| | −1.091 | −0.384 | 6.250 |
| | −1.095 | −0.382 | 6.250 |
| | −1.100 | −0.380 | 6.250 |
| | −1.104 | −0.377 | 6.250 |
| | −1.107 | −0.374 | 6.250 |
| | −1.110 | −0.370 | 6.250 |
| | −1.112 | −0.366 | 6.250 |
| | −1.114 | −0.361 | 6.250 |
| | −1.115 | −0.356 | 6.250 |
| | −1.115 | −0.351 | 6.250 |
| | −1.115 | −0.346 | 6.250 |
| | −1.114 | −0.342 | 6.250 |
| | −1.112 | −0.337 | 6.250 |
| | −1.109 | −0.333 | 6.250 |
| | −1.106 | −0.329 | 6.250 |
| | −1.103 | −0.326 | 6.250 |
| SECTION 7 | −0.981 | −0.238 | 6.750 |
| | −0.972 | −0.235 | 6.750 |
| | −0.963 | −0.231 | 6.750 |
| | −0.953 | −0.228 | 6.750 |
| | −0.944 | −0.224 | 6.750 |
| | −0.935 | −0.221 | 6.750 |
| | −0.926 | −0.218 | 6.750 |
| | −0.917 | −0.214 | 6.750 |
| | −0.908 | −0.211 | 6.750 |
| | −0.899 | −0.208 | 6.750 |
| | −0.889 | −0.204 | 6.750 |
| | −0.844 | −0.188 | 6.750 |
| | −0.797 | −0.172 | 6.750 |
| | −0.751 | −0.156 | 6.750 |
| | −0.705 | −0.141 | 6.750 |
| | −0.658 | −0.126 | 6.750 |
| | −0.612 | −0.112 | 6.750 |
| | −0.565 | −0.098 | 6.750 |
| | −0.518 | −0.085 | 6.750 |
| | −0.471 | −0.071 | 6.750 |
| | −0.424 | −0.059 | 6.750 |
| | −0.377 | −0.046 | 6.750 |
| | −0.330 | −0.035 | 6.750 |
| | −0.282 | −0.023 | 6.750 |
| | −0.235 | −0.012 | 6.750 |
| | −0.187 | −0.001 | 6.750 |
| | −0.140 | 0.009 | 6.750 |
| | −0.092 | 0.019 | 6.750 |
| | −0.044 | 0.028 | 6.750 |
| | 0.004 | 0.038 | 6.750 |
| | 0.052 | 0.046 | 6.750 |
| | 0.100 | 0.055 | 6.750 |
| | 0.148 | 0.063 | 6.750 |
| | 0.196 | 0.071 | 6.750 |
| | 0.244 | 0.078 | 6.750 |
| | 0.292 | 0.085 | 6.750 |
| | 0.341 | 0.092 | 6.750 |
| | 0.389 | 0.098 | 6.750 |
| | 0.437 | 0.104 | 6.750 |
| | 0.486 | 0.110 | 6.750 |
| | 0.534 | 0.115 | 6.750 |
| | 0.583 | 0.121 | 6.750 |
| | 0.631 | 0.126 | 6.750 |

TABLE 2-continued

| X | Y | Z |
|---|---|---|
| 0.680 | 0.130 | 6.750 |
| 0.728 | 0.135 | 6.750 |
| 0.777 | 0.139 | 6.750 |
| 0.825 | 0.143 | 6.750 |
| 0.874 | 0.147 | 6.750 |
| 0.922 | 0.150 | 6.750 |
| 0.971 | 0.153 | 6.750 |
| 1.020 | 0.156 | 6.750 |
| 1.068 | 0.159 | 6.750 |
| 1.117 | 0.162 | 6.750 |
| 1.166 | 0.165 | 6.750 |
| 1.215 | 0.167 | 6.750 |
| 1.263 | 0.169 | 6.750 |
| 1.312 | 0.171 | 6.750 |
| 1.361 | 0.173 | 6.750 |
| 1.409 | 0.175 | 6.750 |
| 1.458 | 0.176 | 6.750 |
| 1.507 | 0.178 | 6.750 |
| 1.556 | 0.179 | 6.750 |
| 1.604 | 0.180 | 6.750 |
| 1.653 | 0.181 | 6.750 |
| 1.702 | 0.183 | 6.750 |
| 1.750 | 0.184 | 6.750 |
| 1.799 | 0.185 | 6.750 |
| 1.848 | 0.185 | 6.750 |
| 1.897 | 0.186 | 6.750 |
| 1.945 | 0.187 | 6.750 |
| 1.994 | 0.188 | 6.750 |
| 2.043 | 0.188 | 6.750 |
| 2.092 | 0.189 | 6.750 |
| 2.140 | 0.190 | 6.750 |
| 2.189 | 0.190 | 6.750 |
| 2.238 | 0.191 | 6.750 |
| 2.287 | 0.192 | 6.750 |
| 2.335 | 0.192 | 6.750 |
| 2.384 | 0.192 | 6.750 |
| 2.433 | 0.193 | 6.750 |
| 2.482 | 0.193 | 6.750 |
| 2.530 | 0.194 | 6.750 |
| 2.579 | 0.194 | 6.750 |
| 2.628 | 0.194 | 6.750 |
| 2.677 | 0.194 | 6.750 |
| 2.725 | 0.194 | 6.750 |
| 2.774 | 0.194 | 6.750 |
| 2.823 | 0.194 | 6.750 |
| 2.872 | 0.194 | 6.750 |
| 2.920 | 0.193 | 6.750 |
| 2.930 | 0.193 | 6.750 |
| 2.940 | 0.193 | 6.750 |
| 2.950 | 0.193 | 6.750 |
| 2.959 | 0.192 | 6.750 |
| 2.969 | 0.192 | 6.750 |
| 2.979 | 0.192 | 6.750 |
| 2.989 | 0.192 | 6.750 |
| 2.998 | 0.192 | 6.750 |
| 3.008 | 0.192 | 6.750 |
| 3.018 | 0.191 | 6.750 |
| 3.021 | 0.191 | 6.750 |
| 3.024 | 0.190 | 6.750 |
| 3.027 | 0.189 | 6.750 |
| 3.030 | 0.187 | 6.750 |
| 3.032 | 0.185 | 6.750 |
| 3.034 | 0.182 | 6.750 |
| 3.035 | 0.179 | 6.750 |
| 3.036 | 0.176 | 6.750 |
| 3.037 | 0.173 | 6.750 |
| 3.037 | 0.170 | 6.750 |
| 3.036 | 0.167 | 6.750 |
| 3.035 | 0.164 | 6.750 |
| 3.034 | 0.161 | 6.750 |
| 3.032 | 0.158 | 6.750 |
| 3.030 | 0.156 | 6.750 |
| 3.027 | 0.154 | 6.750 |
| 3.024 | 0.153 | 6.750 |
| 3.021 | 0.152 | 6.750 |
| 3.018 | 0.151 | 6.750 |
| 3.008 | 0.151 | 6.750 |

TABLE 2-continued

| X | Y | Z |
|---|---|---|
| 2.999 | 0.150 | 6.750 |
| 2.989 | 0.150 | 6.750 |
| 2.979 | 0.149 | 6.750 |
| 2.970 | 0.149 | 6.750 |
| 2.960 | 0.148 | 6.750 |
| 2.951 | 0.148 | 6.750 |
| 2.941 | 0.147 | 6.750 |
| 2.931 | 0.147 | 6.750 |
| 2.922 | 0.146 | 6.750 |
| 2.873 | 0.143 | 6.750 |
| 2.825 | 0.140 | 6.750 |
| 2.777 | 0.138 | 6.750 |
| 2.729 | 0.135 | 6.750 |
| 2.680 | 0.132 | 6.750 |
| 2.632 | 0.129 | 6.750 |
| 2.584 | 0.126 | 6.750 |
| 2.536 | 0.123 | 6.750 |
| 2.487 | 0.120 | 6.750 |
| 2.439 | 0.117 | 6.750 |
| 2.391 | 0.114 | 6.750 |
| 2.343 | 0.111 | 6.750 |
| 2.294 | 0.107 | 6.750 |
| 2.246 | 0.104 | 6.750 |
| 2.198 | 0.100 | 6.750 |
| 2.150 | 0.097 | 6.750 |
| 2.102 | 0.093 | 6.750 |
| 2.053 | 0.090 | 6.750 |
| 2.005 | 0.086 | 6.750 |
| 1.957 | 0.082 | 6.750 |
| 1.909 | 0.078 | 6.750 |
| 1.861 | 0.074 | 6.750 |
| 1.813 | 0.070 | 6.750 |
| 1.765 | 0.065 | 6.750 |
| 1.716 | 0.061 | 6.750 |
| 1.668 | 0.057 | 6.750 |
| 1.620 | 0.052 | 6.750 |
| 1.572 | 0.047 | 6.750 |
| 1.524 | 0.043 | 6.750 |
| 1.476 | 0.038 | 6.750 |
| 1.428 | 0.033 | 6.750 |
| 1.380 | 0.028 | 6.750 |
| 1.332 | 0.022 | 6.750 |
| 1.284 | 0.017 | 6.750 |
| 1.236 | 0.011 | 6.750 |
| 1.188 | 0.006 | 6.750 |
| 1.140 | 0.000 | 6.750 |
| 1.092 | −0.006 | 6.750 |
| 1.044 | −0.012 | 6.750 |
| 0.996 | −0.018 | 6.750 |
| 0.948 | −0.024 | 6.750 |
| 0.900 | −0.030 | 6.750 |
| 0.852 | −0.037 | 6.750 |
| 0.804 | −0.043 | 6.750 |
| 0.756 | −0.050 | 6.750 |
| 0.708 | −0.057 | 6.750 |
| 0.661 | −0.063 | 6.750 |
| 0.613 | −0.070 | 6.750 |
| 0.565 | −0.077 | 6.750 |
| 0.517 | −0.084 | 6.750 |
| 0.469 | −0.091 | 6.750 |
| 0.421 | −0.099 | 6.750 |
| 0.374 | −0.106 | 6.750 |
| 0.326 | −0.113 | 6.750 |
| 0.278 | −0.121 | 6.750 |
| 0.230 | −0.128 | 6.750 |
| 0.183 | −0.136 | 6.750 |
| 0.135 | −0.143 | 6.750 |
| 0.087 | −0.151 | 6.750 |
| 0.039 | −0.158 | 6.750 |
| −0.008 | −0.166 | 6.750 |
| −0.056 | −0.174 | 6.750 |
| −0.104 | −0.181 | 6.750 |
| −0.151 | −0.189 | 6.750 |
| −0.199 | −0.196 | 6.750 |
| −0.247 | −0.204 | 6.750 |
| −0.295 | −0.211 | 6.750 |
| −0.342 | −0.218 | 6.750 |

TABLE 2-continued

| | X | Y | Z |
|---|---|---|---|
| | −0.390 | −0.226 | 6.750 |
| | −0.438 | −0.233 | 6.750 |
| | −0.486 | −0.240 | 6.750 |
| | −0.534 | −0.247 | 6.750 |
| | −0.582 | −0.254 | 6.750 |
| | −0.629 | −0.260 | 6.750 |
| | −0.677 | −0.267 | 6.750 |
| | −0.725 | −0.273 | 6.750 |
| | −0.773 | −0.279 | 6.750 |
| | −0.821 | −0.285 | 6.750 |
| | −0.869 | −0.290 | 6.750 |
| | −0.879 | −0.291 | 6.750 |
| | −0.888 | −0.292 | 6.750 |
| | −0.898 | −0.293 | 6.750 |
| | −0.908 | −0.294 | 6.750 |
| | −0.917 | −0.296 | 6.750 |
| | −0.927 | −0.297 | 6.750 |
| | −0.936 | −0.298 | 6.750 |
| | −0.946 | −0.299 | 6.750 |
| | −0.956 | −0.300 | 6.750 |
| | −0.965 | −0.301 | 6.750 |
| | −0.970 | −0.301 | 6.750 |
| | −0.975 | −0.300 | 6.750 |
| | −0.980 | −0.299 | 6.750 |
| | −0.984 | −0.297 | 6.750 |
| | −0.988 | −0.294 | 6.750 |
| | −0.992 | −0.291 | 6.750 |
| | −0.995 | −0.287 | 6.750 |
| | −0.997 | −0.283 | 6.750 |
| | −0.999 | −0.278 | 6.750 |
| | −1.000 | −0.273 | 6.750 |
| | −1.001 | −0.269 | 6.750 |
| | −1.001 | −0.264 | 6.750 |
| | −1.000 | −0.259 | 6.750 |
| | −0.998 | −0.254 | 6.750 |
| | −0.996 | −0.250 | 6.750 |
| | −0.993 | −0.246 | 6.750 |
| | −0.989 | −0.243 | 6.750 |
| | −0.985 | −0.240 | 6.750 |
| SECTION 8 | −0.867 | −0.154 | 7.250 |
| | −0.858 | −0.151 | 7.250 |
| | −0.849 | −0.149 | 7.250 |
| | −0.839 | −0.147 | 7.250 |
| | −0.830 | −0.144 | 7.250 |
| | −0.821 | −0.142 | 7.250 |
| | −0.812 | −0.140 | 7.250 |
| | −0.802 | −0.137 | 7.250 |
| | −0.793 | −0.135 | 7.250 |
| | −0.784 | −0.133 | 7.250 |
| | −0.775 | −0.130 | 7.250 |
| | −0.728 | −0.119 | 7.250 |
| | −0.682 | −0.108 | 7.250 |
| | −0.635 | −0.097 | 7.250 |
| | −0.589 | −0.086 | 7.250 |
| | −0.542 | −0.076 | 7.250 |
| | −0.495 | −0.066 | 7.250 |
| | −0.449 | −0.055 | 7.250 |
| | −0.402 | −0.046 | 7.250 |
| | −0.355 | −0.036 | 7.250 |
| | −0.308 | −0.027 | 7.250 |
| | −0.261 | −0.017 | 7.250 |
| | −0.215 | −0.009 | 7.250 |
| | −0.168 | 0.000 | 7.250 |
| | −0.121 | 0.008 | 7.250 |
| | −0.073 | 0.016 | 7.250 |
| | −0.026 | 0.024 | 7.250 |
| | 0.021 | 0.032 | 7.250 |
| | 0.068 | 0.039 | 7.250 |
| | 0.115 | 0.046 | 7.250 |
| | 0.163 | 0.053 | 7.250 |
| | 0.210 | 0.059 | 7.250 |
| | 0.257 | 0.066 | 7.250 |
| | 0.305 | 0.071 | 7.250 |
| | 0.352 | 0.077 | 7.250 |
| | 0.400 | 0.083 | 7.250 |
| | 0.447 | 0.088 | 7.250 |
| | 0.495 | 0.093 | 7.250 |

TABLE 2-continued

| X | Y | Z |
|---|---|---|
| 0.542 | 0.098 | 7.250 |
| 0.590 | 0.102 | 7.250 |
| 0.637 | 0.106 | 7.250 |
| 0.685 | 0.110 | 7.250 |
| 0.732 | 0.114 | 7.250 |
| 0.780 | 0.118 | 7.250 |
| 0.828 | 0.121 | 7.250 |
| 0.875 | 0.124 | 7.250 |
| 0.923 | 0.127 | 7.250 |
| 0.971 | 0.130 | 7.250 |
| 1.018 | 0.133 | 7.250 |
| 1.066 | 0.135 | 7.250 |
| 1.114 | 0.138 | 7.250 |
| 1.161 | 0.140 | 7.250 |
| 1.209 | 0.142 | 7.250 |
| 1.257 | 0.143 | 7.250 |
| 1.305 | 0.145 | 7.250 |
| 1.352 | 0.147 | 7.250 |
| 1.400 | 0.148 | 7.250 |
| 1.448 | 0.149 | 7.250 |
| 1.496 | 0.150 | 7.250 |
| 1.543 | 0.151 | 7.250 |
| 1.591 | 0.152 | 7.250 |
| 1.639 | 0.153 | 7.250 |
| 1.687 | 0.154 | 7.250 |
| 1.734 | 0.155 | 7.250 |
| 1.782 | 0.155 | 7.250 |
| 1.830 | 0.156 | 7.250 |
| 1.878 | 0.156 | 7.250 |
| 1.926 | 0.156 | 7.250 |
| 1.973 | 0.157 | 7.250 |
| 2.021 | 0.157 | 7.250 |
| 2.069 | 0.157 | 7.250 |
| 2.117 | 0.157 | 7.250 |
| 2.164 | 0.157 | 7.250 |
| 2.212 | 0.157 | 7.250 |
| 2.260 | 0.157 | 7.250 |
| 2.308 | 0.157 | 7.250 |
| 2.355 | 0.157 | 7.250 |
| 2.403 | 0.157 | 7.250 |
| 2.451 | 0.157 | 7.250 |
| 2.499 | 0.157 | 7.250 |
| 2.546 | 0.157 | 7.250 |
| 2.594 | 0.156 | 7.250 |
| 2.642 | 0.156 | 7.250 |
| 2.690 | 0.156 | 7.250 |
| 2.738 | 0.156 | 7.250 |
| 2.785 | 0.155 | 7.250 |
| 2.833 | 0.155 | 7.250 |
| 2.881 | 0.155 | 7.250 |
| 2.929 | 0.154 | 7.250 |
| 2.976 | 0.154 | 7.250 |
| 2.986 | 0.154 | 7.250 |
| 2.995 | 0.154 | 7.250 |
| 3.005 | 0.154 | 7.250 |
| 3.015 | 0.153 | 7.250 |
| 3.024 | 0.153 | 7.250 |
| 3.034 | 0.153 | 7.250 |
| 3.043 | 0.153 | 7.250 |
| 3.053 | 0.153 | 7.250 |
| 3.062 | 0.153 | 7.250 |
| 3.072 | 0.153 | 7.250 |
| 3.075 | 0.153 | 7.250 |
| 3.078 | 0.152 | 7.250 |
| 3.081 | 0.150 | 7.250 |
| 3.084 | 0.149 | 7.250 |
| 3.086 | 0.146 | 7.250 |
| 3.088 | 0.144 | 7.250 |
| 3.090 | 0.141 | 7.250 |
| 3.091 | 0.138 | 7.250 |
| 3.091 | 0.135 | 7.250 |
| 3.091 | 0.132 | 7.250 |
| 3.091 | 0.128 | 7.250 |
| 3.090 | 0.125 | 7.250 |
| 3.088 | 0.123 | 7.250 |
| 3.086 | 0.120 | 7.250 |
| 3.084 | 0.118 | 7.250 |

TABLE 2-continued

| | X | Y | Z |
|---|---|---|---|
| | 3.081 | 0.116 | 7.250 |
| | 3.079 | 0.114 | 7.250 |
| | 3.076 | 0.113 | 7.250 |
| | 3.072 | 0.113 | 7.250 |
| | 3.063 | 0.112 | 7.250 |
| | 3.053 | 0.112 | 7.250 |
| | 3.044 | 0.111 | 7.250 |
| | 3.034 | 0.111 | 7.250 |
| | 3.025 | 0.110 | 7.250 |
| | 3.015 | 0.110 | 7.250 |
| | 3.006 | 0.109 | 7.250 |
| | 2.996 | 0.108 | 7.250 |
| | 2.987 | 0.108 | 7.250 |
| | 2.977 | 0.107 | 7.250 |
| | 2.930 | 0.104 | 7.250 |
| | 2.882 | 0.102 | 7.250 |
| | 2.835 | 0.099 | 7.250 |
| | 2.788 | 0.096 | 7.250 |
| | 2.740 | 0.093 | 7.250 |
| | 2.693 | 0.090 | 7.250 |
| | 2.645 | 0.087 | 7.250 |
| | 2.598 | 0.084 | 7.250 |
| | 2.550 | 0.081 | 7.250 |
| | 2.503 | 0.078 | 7.250 |
| | 2.455 | 0.075 | 7.250 |
| | 2.408 | 0.072 | 7.250 |
| | 2.360 | 0.068 | 7.250 |
| | 2.313 | 0.065 | 7.250 |
| | 2.266 | 0.062 | 7.250 |
| | 2.218 | 0.058 | 7.250 |
| | 2.171 | 0.055 | 7.250 |
| | 2.123 | 0.051 | 7.250 |
| | 2.076 | 0.048 | 7.250 |
| | 2.028 | 0.044 | 7.250 |
| | 1.981 | 0.041 | 7.250 |
| | 1.934 | 0.037 | 7.250 |
| | 1.886 | 0.033 | 7.250 |
| | 1.839 | 0.029 | 7.250 |
| | 1.791 | 0.025 | 7.250 |
| | 1.744 | 0.021 | 7.250 |
| | 1.697 | 0.017 | 7.250 |
| | 1.649 | 0.013 | 7.250 |
| | 1.602 | 0.008 | 7.250 |
| | 1.555 | 0.004 | 7.250 |
| | 1.507 | 0.000 | 7.250 |
| | 1.460 | −0.005 | 7.250 |
| | 1.413 | −0.010 | 7.250 |
| | 1.365 | −0.014 | 7.250 |
| | 1.318 | −0.019 | 7.250 |
| | 1.271 | −0.024 | 7.250 |
| | 1.223 | −0.029 | 7.250 |
| | 1.176 | −0.034 | 7.250 |
| | 1.129 | −0.039 | 7.250 |
| | 1.081 | −0.044 | 7.250 |
| | 1.034 | −0.049 | 7.250 |
| | 0.987 | −0.054 | 7.250 |
| | 0.940 | −0.060 | 7.250 |
| | 0.892 | −0.065 | 7.250 |
| | 0.845 | −0.070 | 7.250 |
| | 0.798 | −0.076 | 7.250 |
| | 0.751 | −0.081 | 7.250 |
| | 0.703 | −0.087 | 7.250 |
| | 0.656 | −0.092 | 7.250 |
| | 0.609 | −0.098 | 7.250 |
| | 0.562 | −0.104 | 7.250 |
| | 0.514 | −0.109 | 7.250 |
| | 0.467 | −0.115 | 7.250 |
| | 0.420 | −0.120 | 7.250 |
| | 0.373 | −0.126 | 7.250 |
| | 0.326 | −0.131 | 7.250 |
| | 0.278 | −0.137 | 7.250 |
| | 0.231 | −0.142 | 7.250 |
| | 0.184 | −0.148 | 7.250 |
| | 0.137 | −0.153 | 7.250 |
| | 0.089 | −0.158 | 7.250 |
| | 0.042 | −0.163 | 7.250 |
| | −0.005 | −0.168 | 7.250 |

TABLE 2-continued

| | X | Y | Z |
|---|---|---|---|
| | −0.053 | −0.173 | 7.250 |
| | −0.100 | −0.177 | 7.250 |
| | −0.147 | −0.182 | 7.250 |
| | −0.195 | −0.186 | 7.250 |
| | −0.242 | −0.190 | 7.250 |
| | −0.289 | −0.194 | 7.250 |
| | −0.337 | −0.198 | 7.250 |
| | −0.384 | −0.201 | 7.250 |
| | −0.432 | −0.204 | 7.250 |
| | −0.479 | −0.207 | 7.250 |
| | −0.527 | −0.210 | 7.250 |
| | −0.574 | −0.212 | 7.250 |
| | −0.622 | −0.214 | 7.250 |
| | −0.669 | −0.215 | 7.250 |
| | −0.717 | −0.216 | 7.250 |
| | −0.764 | −0.217 | 7.250 |
| | −0.774 | −0.217 | 7.250 |
| | −0.783 | −0.217 | 7.250 |
| | −0.793 | −0.217 | 7.250 |
| | −0.802 | −0.217 | 7.250 |
| | −0.812 | −0.217 | 7.250 |
| | −0.821 | −0.217 | 7.250 |
| | −0.831 | −0.217 | 7.250 |
| | −0.840 | −0.217 | 7.250 |
| | −0.850 | −0.217 | 7.250 |
| | −0.860 | −0.216 | 7.250 |
| | −0.864 | −0.216 | 7.250 |
| | −0.869 | −0.215 | 7.250 |
| | −0.873 | −0.213 | 7.250 |
| | −0.877 | −0.210 | 7.250 |
| | −0.881 | −0.207 | 7.250 |
| | −0.884 | −0.204 | 7.250 |
| | −0.887 | −0.199 | 7.250 |
| | −0.889 | −0.195 | 7.250 |
| | −0.890 | −0.191 | 7.250 |
| | −0.890 | −0.186 | 7.250 |
| | −0.890 | −0.181 | 7.250 |
| | −0.890 | −0.176 | 7.250 |
| | −0.888 | −0.172 | 7.250 |
| | −0.886 | −0.167 | 7.250 |
| | −0.883 | −0.164 | 7.250 |
| | −0.880 | −0.160 | 7.250 |
| | −0.876 | −0.157 | 7.250 |
| | −0.872 | −0.155 | 7.250 |
| SECTION 9 | −0.757 | −0.069 | 7.750 |
| | −0.748 | −0.068 | 7.750 |
| | −0.738 | −0.067 | 7.750 |
| | −0.729 | −0.066 | 7.750 |
| | −0.720 | −0.065 | 7.750 |
| | −0.711 | −0.064 | 7.750 |
| | −0.701 | −0.062 | 7.750 |
| | −0.692 | −0.061 | 7.750 |
| | −0.683 | −0.060 | 7.750 |
| | −0.674 | −0.059 | 7.750 |
| | −0.664 | −0.058 | 7.750 |
| | −0.618 | −0.052 | 7.750 |
| | −0.572 | −0.046 | 7.750 |
| | −0.525 | −0.040 | 7.750 |
| | −0.479 | −0.034 | 7.750 |
| | −0.433 | −0.028 | 7.750 |
| | −0.386 | −0.022 | 7.750 |
| | −0.340 | −0.016 | 7.750 |
| | −0.294 | −0.010 | 7.750 |
| | −0.247 | −0.004 | 7.750 |
| | −0.201 | 0.002 | 7.750 |
| | −0.155 | 0.008 | 7.750 |
| | −0.108 | 0.013 | 7.750 |
| | −0.062 | 0.019 | 7.750 |
| | −0.015 | 0.024 | 7.750 |
| | 0.031 | 0.030 | 7.750 |
| | 0.077 | 0.035 | 7.750 |
| | 0.124 | 0.040 | 7.750 |
| | 0.170 | 0.045 | 7.750 |
| | 0.217 | 0.050 | 7.750 |
| | 0.263 | 0.055 | 7.750 |
| | 0.310 | 0.059 | 7.750 |
| | 0.356 | 0.064 | 7.750 |

TABLE 2-continued

| X | Y | Z |
|---|---|---|
| 0.403 | 0.068 | 7.750 |
| 0.449 | 0.072 | 7.750 |
| 0.496 | 0.076 | 7.750 |
| 0.542 | 0.080 | 7.750 |
| 0.589 | 0.084 | 7.750 |
| 0.636 | 0.087 | 7.750 |
| 0.682 | 0.091 | 7.750 |
| 0.729 | 0.094 | 7.750 |
| 0.775 | 0.097 | 7.750 |
| 0.822 | 0.100 | 7.750 |
| 0.869 | 0.103 | 7.750 |
| 0.915 | 0.105 | 7.750 |
| 0.962 | 0.108 | 7.750 |
| 1.009 | 0.110 | 7.750 |
| 1.055 | 0.112 | 7.750 |
| 1.102 | 0.114 | 7.750 |
| 1.149 | 0.116 | 7.750 |
| 1.195 | 0.117 | 7.750 |
| 1.242 | 0.119 | 7.750 |
| 1.289 | 0.120 | 7.750 |
| 1.335 | 0.122 | 7.750 |
| 1.382 | 0.123 | 7.750 |
| 1.429 | 0.124 | 7.750 |
| 1.476 | 0.125 | 7.750 |
| 1.522 | 0.126 | 7.750 |
| 1.569 | 0.127 | 7.750 |
| 1.616 | 0.128 | 7.750 |
| 1.662 | 0.128 | 7.750 |
| 1.709 | 0.129 | 7.750 |
| 1.756 | 0.129 | 7.750 |
| 1.803 | 0.129 | 7.750 |
| 1.849 | 0.129 | 7.750 |
| 1.896 | 0.130 | 7.750 |
| 1.943 | 0.130 | 7.750 |
| 1.989 | 0.130 | 7.750 |
| 2.036 | 0.129 | 7.750 |
| 2.083 | 0.129 | 7.750 |
| 2.130 | 0.129 | 7.750 |
| 2.176 | 0.129 | 7.750 |
| 2.223 | 0.128 | 7.750 |
| 2.270 | 0.128 | 7.750 |
| 2.317 | 0.127 | 7.750 |
| 2.363 | 0.127 | 7.750 |
| 2.410 | 0.126 | 7.750 |
| 2.457 | 0.125 | 7.750 |
| 2.503 | 0.125 | 7.750 |
| 2.550 | 0.124 | 7.750 |
| 2.597 | 0.123 | 7.750 |
| 2.644 | 0.122 | 7.750 |
| 2.690 | 0.122 | 7.750 |
| 2.737 | 0.121 | 7.750 |
| 2.784 | 0.120 | 7.750 |
| 2.830 | 0.120 | 7.750 |
| 2.877 | 0.119 | 7.750 |
| 2.924 | 0.119 | 7.750 |
| 2.971 | 0.118 | 7.750 |
| 3.017 | 0.118 | 7.750 |
| 3.027 | 0.118 | 7.750 |
| 3.036 | 0.118 | 7.750 |
| 3.045 | 0.118 | 7.750 |
| 3.055 | 0.118 | 7.750 |
| 3.064 | 0.118 | 7.750 |
| 3.073 | 0.118 | 7.750 |
| 3.083 | 0.118 | 7.750 |
| 3.092 | 0.118 | 7.750 |
| 3.101 | 0.118 | 7.750 |
| 3.111 | 0.118 | 7.750 |
| 3.114 | 0.117 | 7.750 |
| 3.117 | 0.117 | 7.750 |
| 3.120 | 0.115 | 7.750 |
| 3.123 | 0.114 | 7.750 |
| 3.125 | 0.111 | 7.750 |
| 3.127 | 0.109 | 7.750 |
| 3.128 | 0.106 | 7.750 |
| 3.129 | 0.103 | 7.750 |
| 3.130 | 0.100 | 7.750 |
| 3.130 | 0.097 | 7.750 |

TABLE 2-continued

| X | Y | Z |
|---|---|---|
| 3.130 | 0.093 | 7.750 |
| 3.129 | 0.090 | 7.750 |
| 3.127 | 0.088 | 7.750 |
| 3.125 | 0.085 | 7.750 |
| 3.123 | 0.083 | 7.750 |
| 3.121 | 0.081 | 7.750 |
| 3.118 | 0.079 | 7.750 |
| 3.115 | 0.078 | 7.750 |
| 3.111 | 0.078 | 7.750 |
| 3.102 | 0.077 | 7.750 |
| 3.093 | 0.077 | 7.750 |
| 3.083 | 0.076 | 7.750 |
| 3.074 | 0.075 | 7.750 |
| 3.065 | 0.075 | 7.750 |
| 3.055 | 0.074 | 7.750 |
| 3.046 | 0.074 | 7.750 |
| 3.037 | 0.073 | 7.750 |
| 3.027 | 0.072 | 7.750 |
| 3.018 | 0.072 | 7.750 |
| 2.972 | 0.069 | 7.750 |
| 2.925 | 0.066 | 7.750 |
| 2.878 | 0.063 | 7.750 |
| 2.832 | 0.060 | 7.750 |
| 2.785 | 0.057 | 7.750 |
| 2.738 | 0.053 | 7.750 |
| 2.692 | 0.050 | 7.750 |
| 2.645 | 0.047 | 7.750 |
| 2.598 | 0.044 | 7.750 |
| 2.552 | 0.041 | 7.750 |
| 2.505 | 0.038 | 7.750 |
| 2.458 | 0.034 | 7.750 |
| 2.412 | 0.031 | 7.750 |
| 2.365 | 0.028 | 7.750 |
| 2.319 | 0.024 | 7.750 |
| 2.272 | 0.021 | 7.750 |
| 2.225 | 0.018 | 7.750 |
| 2.179 | 0.014 | 7.750 |
| 2.132 | 0.011 | 7.750 |
| 2.085 | 0.007 | 7.750 |
| 2.039 | 0.003 | 7.750 |
| 1.992 | 0.000 | 7.750 |
| 1.946 | −0.004 | 7.750 |
| 1.899 | −0.008 | 7.750 |
| 1.852 | −0.011 | 7.750 |
| 1.806 | −0.015 | 7.750 |
| 1.759 | −0.019 | 7.750 |
| 1.713 | −0.023 | 7.750 |
| 1.666 | −0.027 | 7.750 |
| 1.620 | −0.031 | 7.750 |
| 1.573 | −0.035 | 7.750 |
| 1.526 | −0.039 | 7.750 |
| 1.480 | −0.043 | 7.750 |
| 1.433 | −0.048 | 7.750 |
| 1.387 | −0.052 | 7.750 |
| 1.340 | −0.056 | 7.750 |
| 1.294 | −0.060 | 7.750 |
| 1.247 | −0.065 | 7.750 |
| 1.200 | −0.069 | 7.750 |
| 1.154 | −0.073 | 7.750 |
| 1.107 | −0.078 | 7.750 |
| 1.061 | −0.082 | 7.750 |
| 1.014 | −0.086 | 7.750 |
| 0.968 | −0.091 | 7.750 |
| 0.921 | −0.095 | 7.750 |
| 0.875 | −0.099 | 7.750 |
| 0.828 | −0.103 | 7.750 |
| 0.782 | −0.108 | 7.750 |
| 0.735 | −0.112 | 7.750 |
| 0.688 | −0.116 | 7.750 |
| 0.642 | −0.120 | 7.750 |
| 0.595 | −0.124 | 7.750 |
| 0.549 | −0.128 | 7.750 |
| 0.502 | −0.132 | 7.750 |
| 0.455 | −0.135 | 7.750 |
| 0.409 | −0.139 | 7.750 |
| 0.362 | −0.142 | 7.750 |
| 0.316 | −0.145 | 7.750 |

TABLE 2-continued

| | X | Y | Z |
|---|---|---|---|
| | 0.269 | −0.148 | 7.750 |
| | 0.222 | −0.151 | 7.750 |
| | 0.176 | −0.154 | 7.750 |
| | 0.129 | −0.156 | 7.750 |
| | 0.082 | −0.158 | 7.750 |
| | 0.036 | −0.160 | 7.750 |
| | −0.011 | −0.162 | 7.750 |
| | −0.058 | −0.163 | 7.750 |
| | −0.105 | −0.164 | 7.750 |
| | −0.151 | −0.165 | 7.750 |
| | −0.198 | −0.165 | 7.750 |
| | −0.245 | −0.165 | 7.750 |
| | −0.292 | −0.165 | 7.750 |
| | −0.338 | −0.164 | 7.750 |
| | −0.385 | −0.162 | 7.750 |
| | −0.432 | −0.160 | 7.750 |
| | −0.479 | −0.158 | 7.750 |
| | −0.525 | −0.155 | 7.750 |
| | −0.572 | −0.152 | 7.750 |
| | −0.618 | −0.148 | 7.750 |
| | −0.665 | −0.143 | 7.750 |
| | −0.674 | −0.142 | 7.750 |
| | −0.684 | −0.141 | 7.750 |
| | −0.693 | −0.140 | 7.750 |
| | −0.702 | −0.139 | 7.750 |
| | −0.711 | −0.138 | 7.750 |
| | −0.721 | −0.137 | 7.750 |
| | −0.730 | −0.136 | 7.750 |
| | −0.739 | −0.135 | 7.750 |
| | −0.749 | −0.133 | 7.750 |
| | −0.758 | −0.132 | 7.750 |
| | −0.762 | −0.131 | 7.750 |
| | −0.767 | −0.129 | 7.750 |
| | −0.771 | −0.127 | 7.750 |
| | −0.775 | −0.124 | 7.750 |
| | −0.778 | −0.120 | 7.750 |
| | −0.780 | −0.116 | 7.750 |
| | −0.782 | −0.112 | 7.750 |
| | −0.784 | −0.107 | 7.750 |
| | −0.784 | −0.103 | 7.750 |
| | −0.784 | −0.098 | 7.750 |
| | −0.784 | −0.093 | 7.750 |
| | −0.782 | −0.089 | 7.750 |
| | −0.780 | −0.084 | 7.750 |
| | −0.777 | −0.081 | 7.750 |
| | −0.774 | −0.077 | 7.750 |
| | −0.770 | −0.074 | 7.750 |
| | −0.766 | −0.072 | 7.750 |
| | −0.762 | −0.070 | 7.750 |

TABLE 3

| | X | Y | Z |
|---|---|---|---|
| SECTION 1 | −1.652 | −0.616 | 3.750 |
| | −1.646 | −0.607 | 3.750 |
| | −1.640 | −0.598 | 3.750 |
| | −1.634 | −0.589 | 3.750 |
| | −1.627 | −0.581 | 3.750 |
| | −1.621 | −0.572 | 3.750 |
| | −1.615 | −0.563 | 3.750 |
| | −1.608 | −0.555 | 3.750 |
| | −1.602 | −0.546 | 3.750 |
| | −1.596 | −0.537 | 3.750 |
| | −1.589 | −0.529 | 3.750 |
| | −1.556 | −0.486 | 3.750 |
| | −1.523 | −0.445 | 3.750 |
| | −1.488 | −0.404 | 3.750 |
| | −1.453 | −0.364 | 3.750 |
| | −1.416 | −0.324 | 3.750 |
| | −1.379 | −0.286 | 3.750 |
| | −1.341 | −0.248 | 3.750 |
| | −1.303 | −0.210 | 3.750 |
| | −1.263 | −0.174 | 3.750 |

TABLE 3-continued

| X | Y | Z |
|---|---|---|
| −1.223 | −0.138 | 3.750 |
| −1.183 | −0.104 | 3.750 |
| −1.141 | −0.070 | 3.750 |
| −1.099 | −0.036 | 3.750 |
| −1.057 | −0.004 | 3.750 |
| −1.013 | 0.028 | 3.750 |
| −0.970 | 0.059 | 3.750 |
| −0.925 | 0.089 | 3.750 |
| −0.880 | 0.118 | 3.750 |
| −0.835 | 0.147 | 3.750 |
| −0.789 | 0.175 | 3.750 |
| −0.743 | 0.202 | 3.750 |
| −0.696 | 0.228 | 3.750 |
| −0.649 | 0.253 | 3.750 |
| −0.601 | 0.278 | 3.750 |
| −0.553 | 0.302 | 3.750 |
| −0.505 | 0.325 | 3.750 |
| −0.456 | 0.347 | 3.750 |
| −0.407 | 0.368 | 3.750 |
| −0.358 | 0.389 | 3.750 |
| −0.308 | 0.409 | 3.750 |
| −0.258 | 0.428 | 3.750 |
| −0.208 | 0.447 | 3.750 |
| −0.157 | 0.464 | 3.750 |
| −0.106 | 0.481 | 3.750 |
| −0.055 | 0.498 | 3.750 |
| −0.004 | 0.513 | 3.750 |
| 0.048 | 0.528 | 3.750 |
| 0.099 | 0.542 | 3.750 |
| 0.151 | 0.555 | 3.750 |
| 0.203 | 0.568 | 3.750 |
| 0.256 | 0.580 | 3.750 |
| 0.308 | 0.592 | 3.750 |
| 0.361 | 0.602 | 3.750 |
| 0.413 | 0.612 | 3.750 |
| 0.466 | 0.622 | 3.750 |
| 0.519 | 0.630 | 3.750 |
| 0.572 | 0.638 | 3.750 |
| 0.625 | 0.646 | 3.750 |
| 0.678 | 0.653 | 3.750 |
| 0.731 | 0.659 | 3.750 |
| 0.785 | 0.664 | 3.750 |
| 0.838 | 0.669 | 3.750 |
| 0.891 | 0.673 | 3.750 |
| 0.945 | 0.677 | 3.750 |
| 0.998 | 0.680 | 3.750 |
| 1.052 | 0.682 | 3.750 |
| 1.106 | 0.684 | 3.750 |
| 1.159 | 0.685 | 3.750 |
| 1.213 | 0.685 | 3.750 |
| 1.266 | 0.685 | 3.750 |
| 1.320 | 0.684 | 3.750 |
| 1.374 | 0.682 | 3.750 |
| 1.427 | 0.680 | 3.750 |
| 1.481 | 0.677 | 3.750 |
| 1.534 | 0.674 | 3.750 |
| 1.588 | 0.670 | 3.750 |
| 1.641 | 0.665 | 3.750 |
| 1.694 | 0.660 | 3.750 |
| 1.748 | 0.654 | 3.750 |
| 1.801 | 0.647 | 3.750 |
| 1.854 | 0.640 | 3.750 |
| 1.907 | 0.632 | 3.750 |
| 1.960 | 0.623 | 3.750 |
| 2.012 | 0.614 | 3.750 |
| 2.065 | 0.604 | 3.750 |
| 2.118 | 0.593 | 3.750 |
| 2.170 | 0.582 | 3.750 |
| 2.222 | 0.570 | 3.750 |
| 2.274 | 0.557 | 3.750 |
| 2.285 | 0.554 | 3.750 |
| 2.295 | 0.552 | 3.750 |
| 2.305 | 0.549 | 3.750 |
| 2.316 | 0.546 | 3.750 |
| 2.326 | 0.543 | 3.750 |
| 2.337 | 0.541 | 3.750 |
| 2.347 | 0.538 | 3.750 |

TABLE 3-continued

| | X | Y | Z |
|---|---|---|---|
| | 2.357 | 0.535 | 3.750 |
| | 2.368 | 0.532 | 3.750 |
| | 2.378 | 0.529 | 3.750 |
| | 2.383 | 0.527 | 3.750 |
| | 2.387 | 0.525 | 3.750 |
| | 2.391 | 0.521 | 3.750 |
| | 2.395 | 0.517 | 3.750 |
| | 2.398 | 0.513 | 3.750 |
| | 2.400 | 0.508 | 3.750 |
| | 2.401 | 0.503 | 3.750 |
| | 2.402 | 0.498 | 3.750 |
| | 2.401 | 0.492 | 3.750 |
| | 2.400 | 0.487 | 3.750 |
| | 2.398 | 0.482 | 3.750 |
| | 2.396 | 0.478 | 3.750 |
| | 2.393 | 0.474 | 3.750 |
| | 2.389 | 0.470 | 3.750 |
| | 2.385 | 0.467 | 3.750 |
| | 2.380 | 0.464 | 3.750 |
| | 2.375 | 0.462 | 3.750 |
| | 2.370 | 0.461 | 3.750 |
| | 2.365 | 0.461 | 3.750 |
| | 2.355 | 0.461 | 3.750 |
| | 2.346 | 0.461 | 3.750 |
| | 2.336 | 0.461 | 3.750 |
| | 2.326 | 0.461 | 3.750 |
| | 2.317 | 0.461 | 3.750 |
| | 2.307 | 0.460 | 3.750 |
| | 2.297 | 0.460 | 3.750 |
| | 2.288 | 0.460 | 3.750 |
| | 2.278 | 0.460 | 3.750 |
| | 2.269 | 0.460 | 3.750 |
| | 2.220 | 0.458 | 3.750 |
| | 2.172 | 0.456 | 3.750 |
| | 2.124 | 0.453 | 3.750 |
| | 2.076 | 0.450 | 3.750 |
| | 2.028 | 0.446 | 3.750 |
| | 1.980 | 0.441 | 3.750 |
| | 1.933 | 0.435 | 3.750 |
| | 1.885 | 0.429 | 3.750 |
| | 1.837 | 0.422 | 3.750 |
| | 1.790 | 0.414 | 3.750 |
| | 1.742 | 0.406 | 3.750 |
| | 1.695 | 0.397 | 3.750 |
| | 1.648 | 0.388 | 3.750 |
| | 1.601 | 0.378 | 3.750 |
| | 1.554 | 0.367 | 3.750 |
| | 1.507 | 0.356 | 3.750 |
| | 1.461 | 0.344 | 3.750 |
| | 1.414 | 0.331 | 3.750 |
| | 1.368 | 0.318 | 3.750 |
| | 1.322 | 0.304 | 3.750 |
| | 1.276 | 0.290 | 3.750 |
| | 1.230 | 0.275 | 3.750 |
| | 1.184 | 0.259 | 3.750 |
| | 1.139 | 0.243 | 3.750 |
| | 1.094 | 0.227 | 3.750 |
| | 1.049 | 0.210 | 3.750 |
| | 1.004 | 0.193 | 3.750 |
| | 0.959 | 0.175 | 3.750 |
| | 0.915 | 0.157 | 3.750 |
| | 0.870 | 0.138 | 3.750 |
| | 0.826 | 0.119 | 3.750 |
| | 0.782 | 0.099 | 3.750 |
| | 0.738 | 0.080 | 3.750 |
| | 0.694 | 0.059 | 3.750 |
| | 0.651 | 0.039 | 3.750 |
| | 0.608 | 0.018 | 3.750 |
| | 0.564 | −0.003 | 3.750 |
| | 0.521 | −0.024 | 3.750 |
| | 0.478 | −0.046 | 3.750 |
| | 0.435 | −0.068 | 3.750 |
| | 0.393 | −0.090 | 3.750 |
| | 0.350 | −0.112 | 3.750 |
| | 0.307 | −0.135 | 3.750 |
| | 0.265 | −0.157 | 3.750 |
| | 0.222 | −0.180 | 3.750 |

TABLE 3-continued

| | X | Y | Z |
|---|---|---|---|
| | 0.180 | −0.203 | 3.750 |
| | 0.138 | −0.226 | 3.750 |
| | 0.095 | −0.249 | 3.750 |
| | 0.053 | −0.272 | 3.750 |
| | 0.011 | −0.295 | 3.750 |
| | −0.031 | −0.318 | 3.750 |
| | −0.073 | −0.341 | 3.750 |
| | −0.116 | −0.364 | 3.750 |
| | −0.158 | −0.387 | 3.750 |
| | −0.200 | −0.410 | 3.750 |
| | −0.243 | −0.433 | 3.750 |
| | −0.285 | −0.456 | 3.750 |
| | −0.328 | −0.478 | 3.750 |
| | −0.370 | −0.501 | 3.750 |
| | −0.413 | −0.523 | 3.750 |
| | −0.456 | −0.545 | 3.750 |
| | −0.499 | −0.567 | 3.750 |
| | −0.542 | −0.588 | 3.750 |
| | −0.585 | −0.609 | 3.750 |
| | −0.628 | −0.630 | 3.750 |
| | −0.672 | −0.650 | 3.750 |
| | −0.716 | −0.670 | 3.750 |
| | −0.760 | −0.690 | 3.750 |
| | −0.804 | −0.709 | 3.750 |
| | −0.849 | −0.727 | 3.750 |
| | −0.893 | −0.745 | 3.750 |
| | −0.938 | −0.763 | 3.750 |
| | −0.983 | −0.780 | 3.750 |
| | −1.028 | −0.796 | 3.750 |
| | −1.074 | −0.812 | 3.750 |
| | −1.120 | −0.826 | 3.750 |
| | −1.166 | −0.841 | 3.750 |
| | −1.212 | −0.854 | 3.750 |
| | −1.258 | −0.867 | 3.750 |
| | −1.267 | −0.870 | 3.750 |
| | −1.277 | −0.872 | 3.750 |
| | −1.286 | −0.874 | 3.750 |
| | −1.295 | −0.877 | 3.750 |
| | −1.305 | −0.879 | 3.750 |
| | −1.314 | −0.881 | 3.750 |
| | −1.323 | −0.884 | 3.750 |
| | −1.333 | −0.886 | 3.750 |
| | −1.342 | −0.888 | 3.750 |
| | −1.352 | −0.890 | 3.750 |
| | −1.380 | −0.896 | 3.750 |
| | −1.409 | −0.901 | 3.750 |
| | −1.439 | −0.903 | 3.750 |
| | −1.468 | −0.903 | 3.750 |
| | −1.497 | −0.901 | 3.750 |
| | −1.526 | −0.897 | 3.750 |
| | −1.555 | −0.890 | 3.750 |
| | −1.582 | −0.880 | 3.750 |
| | −1.609 | −0.867 | 3.750 |
| | −1.633 | −0.851 | 3.750 |
| | −1.655 | −0.831 | 3.750 |
| | −1.673 | −0.808 | 3.750 |
| | −1.685 | −0.782 | 3.750 |
| | −1.692 | −0.753 | 3.750 |
| | −1.693 | −0.724 | 3.750 |
| | −1.689 | −0.695 | 3.750 |
| | −1.680 | −0.667 | 3.750 |
| | −1.667 | −0.641 | 3.750 |
| SECTION 2 | −1.545 | −0.480 | 4.250 |
| | −1.539 | −0.472 | 4.250 |
| | −1.532 | −0.464 | 4.250 |
| | −1.526 | −0.455 | 4.250 |
| | −1.520 | −0.447 | 4.250 |
| | −1.513 | −0.439 | 4.250 |
| | −1.507 | −0.431 | 4.250 |
| | −1.500 | −0.422 | 4.250 |
| | −1.493 | −0.414 | 4.250 |
| | −1.487 | −0.406 | 4.250 |
| | −1.480 | −0.398 | 4.250 |
| | −1.446 | −0.358 | 4.250 |
| | −1.411 | −0.319 | 4.250 |
| | −1.375 | −0.281 | 4.250 |
| | −1.338 | −0.243 | 4.250 |

TABLE 3-continued

| X | Y | Z |
|---|---|---|
| −1.300 | −0.207 | 4.250 |
| −1.262 | −0.171 | 4.250 |
| −1.222 | −0.137 | 4.250 |
| −1.182 | −0.103 | 4.250 |
| −1.141 | −0.070 | 4.250 |
| −1.099 | −0.038 | 4.250 |
| −1.057 | −0.007 | 4.250 |
| −1.014 | 0.023 | 4.250 |
| −0.971 | 0.053 | 4.250 |
| −0.927 | 0.081 | 4.250 |
| −0.882 | 0.109 | 4.250 |
| −0.837 | 0.135 | 4.250 |
| −0.791 | 0.161 | 4.250 |
| −0.745 | 0.186 | 4.250 |
| −0.698 | 0.210 | 4.250 |
| −0.651 | 0.233 | 4.250 |
| −0.604 | 0.256 | 4.250 |
| −0.556 | 0.277 | 4.250 |
| −0.507 | 0.298 | 4.250 |
| −0.459 | 0.318 | 4.250 |
| −0.410 | 0.337 | 4.250 |
| −0.361 | 0.355 | 4.250 |
| −0.311 | 0.373 | 4.250 |
| −0.261 | 0.389 | 4.250 |
| −0.211 | 0.405 | 4.250 |
| −0.161 | 0.420 | 4.250 |
| −0.111 | 0.435 | 4.250 |
| −0.060 | 0.448 | 4.250 |
| −0.009 | 0.461 | 4.250 |
| 0.042 | 0.473 | 4.250 |
| 0.093 | 0.485 | 4.250 |
| 0.145 | 0.496 | 4.250 |
| 0.196 | 0.506 | 4.250 |
| 0.248 | 0.515 | 4.250 |
| 0.300 | 0.524 | 4.250 |
| 0.351 | 0.532 | 4.250 |
| 0.403 | 0.540 | 4.250 |
| 0.455 | 0.546 | 4.250 |
| 0.508 | 0.553 | 4.250 |
| 0.560 | 0.558 | 4.250 |
| 0.612 | 0.564 | 4.250 |
| 0.664 | 0.568 | 4.250 |
| 0.717 | 0.572 | 4.250 |
| 0.769 | 0.575 | 4.250 |
| 0.821 | 0.578 | 4.250 |
| 0.874 | 0.580 | 4.250 |
| 0.926 | 0.582 | 4.250 |
| 0.979 | 0.583 | 4.250 |
| 1.031 | 0.584 | 4.250 |
| 1.084 | 0.584 | 4.250 |
| 1.136 | 0.583 | 4.250 |
| 1.189 | 0.582 | 4.250 |
| 1.241 | 0.581 | 4.250 |
| 1.294 | 0.579 | 4.250 |
| 1.346 | 0.576 | 4.250 |
| 1.399 | 0.573 | 4.250 |
| 1.451 | 0.570 | 4.250 |
| 1.503 | 0.566 | 4.250 |
| 1.556 | 0.561 | 4.250 |
| 1.608 | 0.556 | 4.250 |
| 1.660 | 0.551 | 4.250 |
| 1.712 | 0.545 | 4.250 |
| 1.764 | 0.538 | 4.250 |
| 1.816 | 0.531 | 4.250 |
| 1.868 | 0.524 | 4.250 |
| 1.920 | 0.516 | 4.250 |
| 1.972 | 0.507 | 4.250 |
| 2.024 | 0.498 | 4.250 |
| 2.075 | 0.489 | 4.250 |
| 2.127 | 0.479 | 4.250 |
| 2.178 | 0.468 | 4.250 |
| 2.230 | 0.457 | 4.250 |
| 2.281 | 0.446 | 4.250 |
| 2.332 | 0.434 | 4.250 |
| 2.383 | 0.421 | 4.250 |
| 2.393 | 0.418 | 4.250 |
| 2.403 | 0.416 | 4.250 |

TABLE 3-continued

| X | Y | Z |
|---|---|---|
| 2.413 | 0.413 | 4.250 |
| 2.424 | 0.410 | 4.250 |
| 2.434 | 0.408 | 4.250 |
| 2.444 | 0.405 | 4.250 |
| 2.454 | 0.402 | 4.250 |
| 2.464 | 0.400 | 4.250 |
| 2.474 | 0.397 | 4.250 |
| 2.484 | 0.394 | 4.250 |
| 2.489 | 0.392 | 4.250 |
| 2.494 | 0.390 | 4.250 |
| 2.498 | 0.387 | 4.250 |
| 2.501 | 0.383 | 4.250 |
| 2.504 | 0.378 | 4.250 |
| 2.506 | 0.374 | 4.250 |
| 2.508 | 0.369 | 4.250 |
| 2.508 | 0.364 | 4.250 |
| 2.508 | 0.358 | 4.250 |
| 2.507 | 0.353 | 4.250 |
| 2.505 | 0.348 | 4.250 |
| 2.503 | 0.344 | 4.250 |
| 2.500 | 0.340 | 4.250 |
| 2.497 | 0.336 | 4.250 |
| 2.493 | 0.333 | 4.250 |
| 2.488 | 0.330 | 4.250 |
| 2.483 | 0.328 | 4.250 |
| 2.478 | 0.327 | 4.250 |
| 2.473 | 0.326 | 4.250 |
| 2.464 | 0.326 | 4.250 |
| 2.454 | 0.326 | 4.250 |
| 2.445 | 0.325 | 4.250 |
| 2.435 | 0.325 | 4.250 |
| 2.426 | 0.325 | 4.250 |
| 2.417 | 0.324 | 4.250 |
| 2.407 | 0.324 | 4.250 |
| 2.398 | 0.324 | 4.250 |
| 2.388 | 0.323 | 4.250 |
| 2.379 | 0.323 | 4.250 |
| 2.332 | 0.320 | 4.250 |
| 2.285 | 0.317 | 4.250 |
| 2.238 | 0.314 | 4.250 |
| 2.191 | 0.310 | 4.250 |
| 2.144 | 0.306 | 4.250 |
| 2.098 | 0.301 | 4.250 |
| 2.051 | 0.296 | 4.250 |
| 2.004 | 0.290 | 4.250 |
| 1.957 | 0.283 | 4.250 |
| 1.911 | 0.277 | 4.250 |
| 1.864 | 0.269 | 4.250 |
| 1.818 | 0.262 | 4.250 |
| 1.772 | 0.253 | 4.250 |
| 1.725 | 0.244 | 4.250 |
| 1.679 | 0.235 | 4.250 |
| 1.633 | 0.226 | 4.250 |
| 1.587 | 0.215 | 4.250 |
| 1.541 | 0.205 | 4.250 |
| 1.496 | 0.194 | 4.250 |
| 1.450 | 0.182 | 4.250 |
| 1.404 | 0.171 | 4.250 |
| 1.359 | 0.158 | 4.250 |
| 1.314 | 0.146 | 4.250 |
| 1.268 | 0.133 | 4.250 |
| 1.223 | 0.119 | 4.250 |
| 1.178 | 0.105 | 4.250 |
| 1.133 | 0.091 | 4.250 |
| 1.089 | 0.076 | 4.250 |
| 1.044 | 0.062 | 4.250 |
| 0.999 | 0.046 | 4.250 |
| 0.955 | 0.031 | 4.250 |
| 0.911 | 0.015 | 4.250 |
| 0.866 | −0.001 | 4.250 |
| 0.822 | −0.017 | 4.250 |
| 0.778 | −0.034 | 4.250 |
| 0.734 | −0.051 | 4.250 |
| 0.690 | −0.068 | 4.250 |
| 0.647 | −0.085 | 4.250 |
| 0.603 | −0.103 | 4.250 |
| 0.559 | −0.120 | 4.250 |

TABLE 3-continued

| | X | Y | Z |
|---|---|---|---|
| | 0.516 | −0.138 | 4.250 |
| | 0.472 | −0.156 | 4.250 |
| | 0.429 | −0.174 | 4.250 |
| | 0.385 | −0.192 | 4.250 |
| | 0.342 | −0.211 | 4.250 |
| | 0.299 | −0.229 | 4.250 |
| | 0.255 | −0.248 | 4.250 |
| | 0.212 | −0.266 | 4.250 |
| | 0.169 | −0.285 | 4.250 |
| | 0.126 | −0.303 | 4.250 |
| | 0.082 | −0.322 | 4.250 |
| | 0.039 | −0.340 | 4.250 |
| | −0.004 | −0.359 | 4.250 |
| | −0.048 | −0.377 | 4.250 |
| | −0.091 | −0.395 | 4.250 |
| | −0.134 | −0.413 | 4.250 |
| | −0.178 | −0.432 | 4.250 |
| | −0.221 | −0.449 | 4.250 |
| | −0.265 | −0.467 | 4.250 |
| | −0.309 | −0.485 | 4.250 |
| | −0.352 | −0.502 | 4.250 |
| | −0.396 | −0.519 | 4.250 |
| | −0.440 | −0.536 | 4.250 |
| | −0.484 | −0.553 | 4.250 |
| | −0.528 | −0.569 | 4.250 |
| | −0.572 | −0.585 | 4.250 |
| | −0.617 | −0.601 | 4.250 |
| | −0.661 | −0.616 | 4.250 |
| | −0.706 | −0.631 | 4.250 |
| | −0.751 | −0.645 | 4.250 |
| | −0.796 | −0.659 | 4.250 |
| | −0.841 | −0.673 | 4.250 |
| | −0.886 | −0.686 | 4.250 |
| | −0.931 | −0.699 | 4.250 |
| | −0.977 | −0.711 | 4.250 |
| | −1.022 | −0.723 | 4.250 |
| | −1.068 | −0.734 | 4.250 |
| | −1.114 | −0.745 | 4.250 |
| | −1.160 | −0.755 | 4.250 |
| | −1.169 | −0.756 | 4.250 |
| | −1.178 | −0.758 | 4.250 |
| | −1.188 | −0.760 | 4.250 |
| | −1.197 | −0.762 | 4.250 |
| | −1.206 | −0.764 | 4.250 |
| | −1.215 | −0.766 | 4.250 |
| | −1.225 | −0.768 | 4.250 |
| | −1.234 | −0.769 | 4.250 |
| | −1.243 | −0.771 | 4.250 |
| | −1.252 | −0.773 | 4.250 |
| | −1.281 | −0.777 | 4.250 |
| | −1.311 | −0.779 | 4.250 |
| | −1.340 | −0.780 | 4.250 |
| | −1.369 | −0.778 | 4.250 |
| | −1.398 | −0.775 | 4.250 |
| | −1.427 | −0.769 | 4.250 |
| | −1.455 | −0.760 | 4.250 |
| | −1.482 | −0.749 | 4.250 |
| | −1.508 | −0.735 | 4.250 |
| | −1.531 | −0.717 | 4.250 |
| | −1.552 | −0.697 | 4.250 |
| | −1.569 | −0.673 | 4.250 |
| | −1.581 | −0.646 | 4.250 |
| | −1.587 | −0.617 | 4.250 |
| | −1.588 | −0.588 | 4.250 |
| | −1.583 | −0.559 | 4.250 |
| | −1.574 | −0.531 | 4.250 |
| | −1.561 | −0.505 | 4.250 |
| SECTION 3 | −1.432 | −0.354 | 4.750 |
| | −1.426 | −0.346 | 4.750 |
| | −1.419 | −0.339 | 4.750 |
| | −1.413 | −0.331 | 4.750 |
| | −1.406 | −0.323 | 4.750 |
| | −1.399 | −0.315 | 4.750 |
| | −1.393 | −0.307 | 4.750 |
| | −1.386 | −0.299 | 4.750 |
| | −1.379 | −0.292 | 4.750 |
| | −1.372 | −0.284 | 4.750 |

TABLE 3-continued

| X | Y | Z |
|---|---|---|
| −1.365 | −0.276 | 4.750 |
| −1.330 | −0.239 | 4.750 |
| −1.293 | −0.202 | 4.750 |
| −1.256 | −0.166 | 4.750 |
| −1.218 | −0.132 | 4.750 |
| −1.178 | −0.098 | 4.750 |
| −1.138 | −0.065 | 4.750 |
| −1.098 | −0.034 | 4.750 |
| −1.056 | −0.003 | 4.750 |
| −1.014 | 0.026 | 4.750 |
| −0.971 | 0.055 | 4.750 |
| −0.927 | 0.082 | 4.750 |
| −0.883 | 0.109 | 4.750 |
| −0.838 | 0.134 | 4.750 |
| −0.792 | 0.159 | 4.750 |
| −0.746 | 0.183 | 4.750 |
| −0.700 | 0.205 | 4.750 |
| −0.653 | 0.227 | 4.750 |
| −0.606 | 0.248 | 4.750 |
| −0.558 | 0.268 | 4.750 |
| −0.510 | 0.287 | 4.750 |
| −0.462 | 0.305 | 4.750 |
| −0.413 | 0.322 | 4.750 |
| −0.364 | 0.338 | 4.750 |
| −0.315 | 0.353 | 4.750 |
| −0.265 | 0.368 | 4.750 |
| −0.216 | 0.382 | 4.750 |
| −0.166 | 0.395 | 4.750 |
| −0.115 | 0.407 | 4.750 |
| −0.065 | 0.418 | 4.750 |
| −0.015 | 0.429 | 4.750 |
| 0.036 | 0.439 | 4.750 |
| 0.087 | 0.448 | 4.750 |
| 0.138 | 0.456 | 4.750 |
| 0.189 | 0.464 | 4.750 |
| 0.240 | 0.471 | 4.750 |
| 0.291 | 0.477 | 4.750 |
| 0.343 | 0.483 | 4.750 |
| 0.394 | 0.488 | 4.750 |
| 0.445 | 0.493 | 4.750 |
| 0.497 | 0.497 | 4.750 |
| 0.549 | 0.500 | 4.750 |
| 0.600 | 0.503 | 4.750 |
| 0.652 | 0.505 | 4.750 |
| 0.703 | 0.507 | 4.750 |
| 0.755 | 0.508 | 4.750 |
| 0.807 | 0.509 | 4.750 |
| 0.858 | 0.509 | 4.750 |
| 0.910 | 0.509 | 4.750 |
| 0.961 | 0.508 | 4.750 |
| 1.013 | 0.506 | 4.750 |
| 1.065 | 0.505 | 4.750 |
| 1.116 | 0.503 | 4.750 |
| 1.168 | 0.500 | 4.750 |
| 1.219 | 0.497 | 4.750 |
| 1.271 | 0.493 | 4.750 |
| 1.322 | 0.489 | 4.750 |
| 1.374 | 0.485 | 4.750 |
| 1.425 | 0.480 | 4.750 |
| 1.477 | 0.475 | 4.750 |
| 1.528 | 0.470 | 4.750 |
| 1.579 | 0.464 | 4.750 |
| 1.630 | 0.458 | 4.750 |
| 1.682 | 0.451 | 4.750 |
| 1.733 | 0.444 | 4.750 |
| 1.784 | 0.436 | 4.750 |
| 1.835 | 0.429 | 4.750 |
| 1.886 | 0.420 | 4.750 |
| 1.937 | 0.412 | 4.750 |
| 1.988 | 0.403 | 4.750 |
| 2.039 | 0.394 | 4.750 |
| 2.089 | 0.384 | 4.750 |
| 2.140 | 0.374 | 4.750 |
| 2.191 | 0.364 | 4.750 |
| 2.241 | 0.353 | 4.750 |
| 2.291 | 0.342 | 4.750 |
| 2.342 | 0.331 | 4.750 |

TABLE 3-continued

| X | Y | Z |
|---|---|---|
| 2.392 | 0.319 | 4.750 |
| 2.442 | 0.307 | 4.750 |
| 2.492 | 0.294 | 4.750 |
| 2.502 | 0.292 | 4.750 |
| 2.512 | 0.289 | 4.750 |
| 2.522 | 0.287 | 4.750 |
| 2.532 | 0.284 | 4.750 |
| 2.542 | 0.281 | 4.750 |
| 2.552 | 0.279 | 4.750 |
| 2.562 | 0.276 | 4.750 |
| 2.572 | 0.273 | 4.750 |
| 2.582 | 0.271 | 4.750 |
| 2.592 | 0.268 | 4.750 |
| 2.597 | 0.266 | 4.750 |
| 2.601 | 0.264 | 4.750 |
| 2.605 | 0.261 | 4.750 |
| 2.609 | 0.257 | 4.750 |
| 2.612 | 0.253 | 4.750 |
| 2.614 | 0.248 | 4.750 |
| 2.616 | 0.243 | 4.750 |
| 2.616 | 0.238 | 4.750 |
| 2.616 | 0.233 | 4.750 |
| 2.615 | 0.228 | 4.750 |
| 2.614 | 0.223 | 4.750 |
| 2.612 | 0.219 | 4.750 |
| 2.609 | 0.214 | 4.750 |
| 2.606 | 0.211 | 4.750 |
| 2.602 | 0.207 | 4.750 |
| 2.597 | 0.205 | 4.750 |
| 2.593 | 0.203 | 4.750 |
| 2.588 | 0.201 | 4.750 |
| 2.583 | 0.201 | 4.750 |
| 2.573 | 0.200 | 4.750 |
| 2.564 | 0.199 | 4.750 |
| 2.555 | 0.199 | 4.750 |
| 2.546 | 0.198 | 4.750 |
| 2.536 | 0.198 | 4.750 |
| 2.527 | 0.197 | 4.750 |
| 2.518 | 0.197 | 4.750 |
| 2.509 | 0.196 | 4.750 |
| 2.499 | 0.196 | 4.750 |
| 2.490 | 0.195 | 4.750 |
| 2.444 | 0.192 | 4.750 |
| 2.398 | 0.188 | 4.750 |
| 2.352 | 0.184 | 4.750 |
| 2.306 | 0.180 | 4.750 |
| 2.259 | 0.176 | 4.750 |
| 2.213 | 0.171 | 4.750 |
| 2.167 | 0.165 | 4.750 |
| 2.121 | 0.160 | 4.750 |
| 2.075 | 0.154 | 4.750 |
| 2.029 | 0.148 | 4.750 |
| 1.984 | 0.141 | 4.750 |
| 1.938 | 0.134 | 4.750 |
| 1.892 | 0.127 | 4.750 |
| 1.846 | 0.120 | 4.750 |
| 1.801 | 0.112 | 4.750 |
| 1.755 | 0.104 | 4.750 |
| 1.709 | 0.095 | 4.750 |
| 1.664 | 0.087 | 4.750 |
| 1.619 | 0.078 | 4.750 |
| 1.573 | 0.068 | 4.750 |
| 1.528 | 0.058 | 4.750 |
| 1.483 | 0.049 | 4.750 |
| 1.437 | 0.038 | 4.750 |
| 1.392 | 0.028 | 4.750 |
| 1.347 | 0.017 | 4.750 |
| 1.302 | 0.006 | 4.750 |
| 1.257 | −0.005 | 4.750 |
| 1.212 | −0.017 | 4.750 |
| 1.168 | −0.029 | 4.750 |
| 1.123 | −0.041 | 4.750 |
| 1.078 | −0.053 | 4.750 |
| 1.034 | −0.065 | 4.750 |
| 0.989 | −0.078 | 4.750 |
| 0.945 | −0.091 | 4.750 |
| 0.900 | −0.104 | 4.750 |

TABLE 3-continued

| | X | Y | Z |
|---|---|---|---|
| | 0.856 | −0.117 | 4.750 |
| | 0.811 | −0.130 | 4.750 |
| | 0.767 | −0.144 | 4.750 |
| | 0.723 | −0.157 | 4.750 |
| | 0.678 | −0.171 | 4.750 |
| | 0.634 | −0.185 | 4.750 |
| | 0.590 | −0.199 | 4.750 |
| | 0.546 | −0.213 | 4.750 |
| | 0.502 | −0.227 | 4.750 |
| | 0.458 | −0.241 | 4.750 |
| | 0.413 | −0.255 | 4.750 |
| | 0.369 | −0.269 | 4.750 |
| | 0.325 | −0.284 | 4.750 |
| | 0.281 | −0.298 | 4.750 |
| | 0.237 | −0.312 | 4.750 |
| | 0.193 | −0.326 | 4.750 |
| | 0.149 | −0.340 | 4.750 |
| | 0.105 | −0.355 | 4.750 |
| | 0.061 | −0.369 | 4.750 |
| | 0.016 | −0.382 | 4.750 |
| | −0.028 | −0.396 | 4.750 |
| | −0.072 | −0.410 | 4.750 |
| | −0.116 | −0.424 | 4.750 |
| | −0.161 | −0.437 | 4.750 |
| | −0.205 | −0.450 | 4.750 |
| | −0.249 | −0.463 | 4.750 |
| | −0.294 | −0.476 | 4.750 |
| | −0.339 | −0.489 | 4.750 |
| | −0.383 | −0.501 | 4.750 |
| | −0.428 | −0.514 | 4.750 |
| | −0.473 | −0.526 | 4.750 |
| | −0.517 | −0.537 | 4.750 |
| | −0.562 | −0.549 | 4.750 |
| | −0.607 | −0.560 | 4.750 |
| | −0.652 | −0.571 | 4.750 |
| | −0.697 | −0.581 | 4.750 |
| | −0.743 | −0.591 | 4.750 |
| | −0.788 | −0.601 | 4.750 |
| | −0.833 | −0.610 | 4.750 |
| | −0.879 | −0.619 | 4.750 |
| | −0.924 | −0.628 | 4.750 |
| | −0.970 | −0.636 | 4.750 |
| | −1.016 | −0.643 | 4.750 |
| | −1.061 | −0.651 | 4.750 |
| | −1.071 | −0.652 | 4.750 |
| | −1.080 | −0.653 | 4.750 |
| | −1.089 | −0.655 | 4.750 |
| | −1.098 | −0.656 | 4.750 |
| | −1.107 | −0.657 | 4.750 |
| | −1.116 | −0.659 | 4.750 |
| | −1.126 | −0.660 | 4.750 |
| | −1.135 | −0.661 | 4.750 |
| | −1.144 | −0.663 | 4.750 |
| | −1.153 | −0.664 | 4.750 |
| | −1.182 | −0.667 | 4.750 |
| | −1.212 | −0.667 | 4.750 |
| | −1.241 | −0.666 | 4.750 |
| | −1.270 | −0.663 | 4.750 |
| | −1.299 | −0.657 | 4.750 |
| | −1.327 | −0.650 | 4.750 |
| | −1.355 | −0.640 | 4.750 |
| | −1.381 | −0.627 | 4.750 |
| | −1.406 | −0.611 | 4.750 |
| | −1.428 | −0.592 | 4.750 |
| | −1.448 | −0.571 | 4.750 |
| | −1.463 | −0.546 | 4.750 |
| | −1.474 | −0.518 | 4.750 |
| | −1.479 | −0.490 | 4.750 |
| | −1.479 | −0.460 | 4.750 |
| | −1.473 | −0.432 | 4.750 |
| | −1.463 | −0.404 | 4.750 |
| | −1.449 | −0.378 | 4.750 |
| SECTION 4 | −1.313 | −0.240 | 5.250 |
| | −1.306 | −0.232 | 5.250 |
| | −1.299 | −0.225 | 5.250 |
| | −1.292 | −0.217 | 5.250 |
| | −1.285 | −0.210 | 5.250 |

TABLE 3-continued

| X | Y | Z |
|---|---|---|
| −1.278 | −0.203 | 5.250 |
| −1.271 | −0.195 | 5.250 |
| −1.264 | −0.188 | 5.250 |
| −1.257 | −0.181 | 5.250 |
| −1.250 | −0.173 | 5.250 |
| −1.243 | −0.166 | 5.250 |
| −1.206 | −0.131 | 5.250 |
| −1.168 | −0.096 | 5.250 |
| −1.130 | −0.063 | 5.250 |
| −1.090 | −0.031 | 5.250 |
| −1.049 | −0.001 | 5.250 |
| −1.008 | 0.029 | 5.250 |
| −0.966 | 0.058 | 5.250 |
| −0.923 | 0.085 | 5.250 |
| −0.880 | 0.112 | 5.250 |
| −0.835 | 0.137 | 5.250 |
| −0.790 | 0.161 | 5.250 |
| −0.745 | 0.184 | 5.250 |
| −0.699 | 0.206 | 5.250 |
| −0.653 | 0.227 | 5.250 |
| −0.606 | 0.247 | 5.250 |
| −0.558 | 0.266 | 5.250 |
| −0.511 | 0.284 | 5.250 |
| −0.463 | 0.301 | 5.250 |
| −0.414 | 0.317 | 5.250 |
| −0.366 | 0.332 | 5.250 |
| −0.317 | 0.346 | 5.250 |
| −0.267 | 0.359 | 5.250 |
| −0.218 | 0.372 | 5.250 |
| −0.168 | 0.383 | 5.250 |
| −0.119 | 0.394 | 5.250 |
| −0.069 | 0.403 | 5.250 |
| −0.018 | 0.412 | 5.250 |
| 0.032 | 0.421 | 5.250 |
| 0.082 | 0.428 | 5.250 |
| 0.133 | 0.434 | 5.250 |
| 0.183 | 0.440 | 5.250 |
| 0.234 | 0.446 | 5.250 |
| 0.285 | 0.450 | 5.250 |
| 0.336 | 0.454 | 5.250 |
| 0.387 | 0.457 | 5.250 |
| 0.437 | 0.460 | 5.250 |
| 0.488 | 0.462 | 5.250 |
| 0.539 | 0.463 | 5.250 |
| 0.590 | 0.464 | 5.250 |
| 0.641 | 0.464 | 5.250 |
| 0.692 | 0.464 | 5.250 |
| 0.743 | 0.463 | 5.250 |
| 0.794 | 0.462 | 5.250 |
| 0.845 | 0.460 | 5.250 |
| 0.896 | 0.458 | 5.250 |
| 0.947 | 0.455 | 5.250 |
| 0.998 | 0.452 | 5.250 |
| 1.048 | 0.449 | 5.250 |
| 1.099 | 0.445 | 5.250 |
| 1.150 | 0.440 | 5.250 |
| 1.201 | 0.436 | 5.250 |
| 1.251 | 0.431 | 5.250 |
| 1.302 | 0.425 | 5.250 |
| 1.353 | 0.420 | 5.250 |
| 1.403 | 0.413 | 5.250 |
| 1.454 | 0.407 | 5.250 |
| 1.504 | 0.400 | 5.250 |
| 1.555 | 0.393 | 5.250 |
| 1.605 | 0.386 | 5.250 |
| 1.656 | 0.378 | 5.250 |
| 1.706 | 0.370 | 5.250 |
| 1.756 | 0.362 | 5.250 |
| 1.807 | 0.354 | 5.250 |
| 1.857 | 0.345 | 5.250 |
| 1.907 | 0.336 | 5.250 |
| 1.957 | 0.327 | 5.250 |
| 2.007 | 0.317 | 5.250 |
| 2.057 | 0.307 | 5.250 |
| 2.107 | 0.297 | 5.250 |
| 2.157 | 0.287 | 5.250 |
| 2.207 | 0.276 | 5.250 |

TABLE 3-continued

| X | Y | Z |
|---|---|---|
| 2.257 | 0.266 | 5.250 |
| 2.306 | 0.255 | 5.250 |
| 2.356 | 0.243 | 5.250 |
| 2.406 | 0.232 | 5.250 |
| 2.455 | 0.220 | 5.250 |
| 2.505 | 0.208 | 5.250 |
| 2.554 | 0.196 | 5.250 |
| 2.604 | 0.184 | 5.250 |
| 2.614 | 0.181 | 5.250 |
| 2.623 | 0.179 | 5.250 |
| 2.633 | 0.176 | 5.250 |
| 2.643 | 0.174 | 5.250 |
| 2.653 | 0.171 | 5.250 |
| 2.663 | 0.168 | 5.250 |
| 2.673 | 0.166 | 5.250 |
| 2.683 | 0.163 | 5.250 |
| 2.692 | 0.161 | 5.250 |
| 2.702 | 0.158 | 5.250 |
| 2.707 | 0.156 | 5.250 |
| 2.712 | 0.154 | 5.250 |
| 2.716 | 0.151 | 5.250 |
| 2.719 | 0.147 | 5.250 |
| 2.722 | 0.143 | 5.250 |
| 2.724 | 0.139 | 5.250 |
| 2.726 | 0.134 | 5.250 |
| 2.727 | 0.129 | 5.250 |
| 2.727 | 0.124 | 5.250 |
| 2.726 | 0.119 | 5.250 |
| 2.725 | 0.114 | 5.250 |
| 2.723 | 0.109 | 5.250 |
| 2.720 | 0.105 | 5.250 |
| 2.717 | 0.101 | 5.250 |
| 2.713 | 0.098 | 5.250 |
| 2.709 | 0.095 | 5.250 |
| 2.704 | 0.093 | 5.250 |
| 2.700 | 0.091 | 5.250 |
| 2.695 | 0.091 | 5.250 |
| 2.685 | 0.090 | 5.250 |
| 2.676 | 0.089 | 5.250 |
| 2.667 | 0.088 | 5.250 |
| 2.658 | 0.088 | 5.250 |
| 2.649 | 0.087 | 5.250 |
| 2.640 | 0.086 | 5.250 |
| 2.631 | 0.085 | 5.250 |
| 2.621 | 0.085 | 5.250 |
| 2.612 | 0.084 | 5.250 |
| 2.603 | 0.083 | 5.250 |
| 2.557 | 0.079 | 5.250 |
| 2.512 | 0.075 | 5.250 |
| 2.466 | 0.071 | 5.250 |
| 2.420 | 0.066 | 5.250 |
| 2.375 | 0.061 | 5.250 |
| 2.329 | 0.056 | 5.250 |
| 2.283 | 0.051 | 5.250 |
| 2.238 | 0.046 | 5.250 |
| 2.192 | 0.041 | 5.250 |
| 2.147 | 0.035 | 5.250 |
| 2.101 | 0.029 | 5.250 |
| 2.056 | 0.023 | 5.250 |
| 2.010 | 0.017 | 5.250 |
| 1.965 | 0.010 | 5.250 |
| 1.919 | 0.003 | 5.250 |
| 1.874 | −0.003 | 5.250 |
| 1.828 | −0.011 | 5.250 |
| 1.783 | −0.018 | 5.250 |
| 1.738 | −0.025 | 5.250 |
| 1.693 | −0.033 | 5.250 |
| 1.647 | −0.041 | 5.250 |
| 1.602 | −0.049 | 5.250 |
| 1.557 | −0.057 | 5.250 |
| 1.512 | −0.065 | 5.250 |
| 1.467 | −0.074 | 5.250 |
| 1.422 | −0.082 | 5.250 |
| 1.377 | −0.091 | 5.250 |
| 1.332 | −0.100 | 5.250 |
| 1.287 | −0.109 | 5.250 |
| 1.242 | −0.118 | 5.250 |

TABLE 3-continued

| | X | Y | Z |
|---|---|---|---|
| | 1.197 | −0.128 | 5.250 |
| | 1.152 | −0.137 | 5.250 |
| | 1.107 | −0.147 | 5.250 |
| | 1.062 | −0.157 | 5.250 |
| | 1.017 | −0.166 | 5.250 |
| | 0.972 | −0.176 | 5.250 |
| | 0.928 | −0.186 | 5.250 |
| | 0.883 | −0.197 | 5.250 |
| | 0.838 | −0.207 | 5.250 |
| | 0.793 | −0.217 | 5.250 |
| | 0.749 | −0.227 | 5.250 |
| | 0.704 | −0.238 | 5.250 |
| | 0.659 | −0.248 | 5.250 |
| | 0.614 | −0.259 | 5.250 |
| | 0.570 | −0.269 | 5.250 |
| | 0.525 | −0.280 | 5.250 |
| | 0.480 | −0.290 | 5.250 |
| | 0.436 | −0.301 | 5.250 |
| | 0.391 | −0.311 | 5.250 |
| | 0.346 | −0.321 | 5.250 |
| | 0.302 | −0.332 | 5.250 |
| | 0.257 | −0.342 | 5.250 |
| | 0.212 | −0.352 | 5.250 |
| | 0.167 | −0.363 | 5.250 |
| | 0.123 | −0.373 | 5.250 |
| | 0.078 | −0.383 | 5.250 |
| | 0.033 | −0.393 | 5.250 |
| | −0.012 | −0.402 | 5.250 |
| | −0.057 | −0.412 | 5.250 |
| | −0.102 | −0.421 | 5.250 |
| | −0.147 | −0.431 | 5.250 |
| | −0.192 | −0.440 | 5.250 |
| | −0.237 | −0.449 | 5.250 |
| | −0.282 | −0.458 | 5.250 |
| | −0.327 | −0.466 | 5.250 |
| | −0.372 | −0.475 | 5.250 |
| | −0.417 | −0.483 | 5.250 |
| | −0.462 | −0.491 | 5.250 |
| | −0.508 | −0.498 | 5.250 |
| | −0.553 | −0.506 | 5.250 |
| | −0.598 | −0.513 | 5.250 |
| | −0.644 | −0.520 | 5.250 |
| | −0.689 | −0.526 | 5.250 |
| | −0.735 | −0.532 | 5.250 |
| | −0.780 | −0.538 | 5.250 |
| | −0.826 | −0.544 | 5.250 |
| | −0.871 | −0.549 | 5.250 |
| | −0.917 | −0.553 | 5.250 |
| | −0.963 | −0.558 | 5.250 |
| | −0.972 | −0.559 | 5.250 |
| | −0.981 | −0.559 | 5.250 |
| | −0.990 | −0.560 | 5.250 |
| | −0.999 | −0.561 | 5.250 |
| | −1.008 | −0.562 | 5.250 |
| | −1.018 | −0.562 | 5.250 |
| | −1.027 | −0.563 | 5.250 |
| | −1.036 | −0.564 | 5.250 |
| | −1.045 | −0.565 | 5.250 |
| | −1.054 | −0.565 | 5.250 |
| | −1.083 | −0.566 | 5.250 |
| | −1.113 | −0.565 | 5.250 |
| | −1.142 | −0.562 | 5.250 |
| | −1.170 | −0.558 | 5.250 |
| | −1.199 | −0.551 | 5.250 |
| | −1.226 | −0.541 | 5.250 |
| | −1.253 | −0.530 | 5.250 |
| | −1.279 | −0.515 | 5.250 |
| | −1.302 | −0.498 | 5.250 |
| | −1.323 | −0.478 | 5.250 |
| | −1.341 | −0.455 | 5.250 |
| | −1.355 | −0.429 | 5.250 |
| | −1.363 | −0.401 | 5.250 |
| | −1.367 | −0.372 | 5.250 |
| | −1.365 | −0.343 | 5.250 |
| | −1.357 | −0.315 | 5.250 |
| | −1.346 | −0.288 | 5.250 |
| | −1.331 | −0.263 | 5.250 |

TABLE 3-continued

| | X | Y | Z |
|---|---|---|---|
| SECTION 5 | −1.184 | −0.141 | 5.750 |
| | −1.177 | −0.134 | 5.750 |
| | −1.170 | −0.127 | 5.750 |
| | −1.163 | −0.120 | 5.750 |
| | −1.155 | −0.113 | 5.750 |
| | −1.148 | −0.106 | 5.750 |
| | −1.141 | −0.099 | 5.750 |
| | −1.133 | −0.092 | 5.750 |
| | −1.126 | −0.085 | 5.750 |
| | −1.119 | −0.078 | 5.750 |
| | −1.111 | −0.072 | 5.750 |
| | −1.073 | −0.039 | 5.750 |
| | −1.034 | −0.007 | 5.750 |
| | −0.994 | 0.023 | 5.750 |
| | −0.953 | 0.053 | 5.750 |
| | −0.911 | 0.081 | 5.750 |
| | −0.868 | 0.108 | 5.750 |
| | −0.825 | 0.133 | 5.750 |
| | −0.781 | 0.158 | 5.750 |
| | −0.737 | 0.181 | 5.750 |
| | −0.691 | 0.204 | 5.750 |
| | −0.646 | 0.225 | 5.750 |
| | −0.599 | 0.245 | 5.750 |
| | −0.553 | 0.264 | 5.750 |
| | −0.506 | 0.281 | 5.750 |
| | −0.458 | 0.298 | 5.750 |
| | −0.410 | 0.314 | 5.750 |
| | −0.362 | 0.328 | 5.750 |
| | −0.314 | 0.342 | 5.750 |
| | −0.265 | 0.355 | 5.750 |
| | −0.216 | 0.366 | 5.750 |
| | −0.167 | 0.377 | 5.750 |
| | −0.117 | 0.387 | 5.750 |
| | −0.068 | 0.396 | 5.750 |
| | −0.018 | 0.404 | 5.750 |
| | 0.032 | 0.411 | 5.750 |
| | 0.082 | 0.418 | 5.750 |
| | 0.132 | 0.423 | 5.750 |
| | 0.182 | 0.428 | 5.750 |
| | 0.232 | 0.433 | 5.750 |
| | 0.283 | 0.436 | 5.750 |
| | 0.333 | 0.439 | 5.750 |
| | 0.383 | 0.441 | 5.750 |
| | 0.433 | 0.442 | 5.750 |
| | 0.484 | 0.443 | 5.750 |
| | 0.534 | 0.443 | 5.750 |
| | 0.585 | 0.443 | 5.750 |
| | 0.635 | 0.442 | 5.750 |
| | 0.685 | 0.440 | 5.750 |
| | 0.736 | 0.438 | 5.750 |
| | 0.786 | 0.436 | 5.750 |
| | 0.836 | 0.433 | 5.750 |
| | 0.886 | 0.429 | 5.750 |
| | 0.937 | 0.425 | 5.750 |
| | 0.987 | 0.421 | 5.750 |
| | 1.037 | 0.416 | 5.750 |
| | 1.087 | 0.411 | 5.750 |
| | 1.137 | 0.406 | 5.750 |
| | 1.187 | 0.400 | 5.750 |
| | 1.237 | 0.394 | 5.750 |
| | 1.287 | 0.387 | 5.750 |
| | 1.337 | 0.380 | 5.750 |
| | 1.387 | 0.373 | 5.750 |
| | 1.437 | 0.366 | 5.750 |
| | 1.486 | 0.358 | 5.750 |
| | 1.536 | 0.350 | 5.750 |
| | 1.586 | 0.342 | 5.750 |
| | 1.635 | 0.333 | 5.750 |
| | 1.685 | 0.324 | 5.750 |
| | 1.735 | 0.315 | 5.750 |
| | 1.784 | 0.306 | 5.750 |
| | 1.834 | 0.297 | 5.750 |
| | 1.883 | 0.287 | 5.750 |
| | 1.932 | 0.278 | 5.750 |
| | 1.982 | 0.268 | 5.750 |
| | 2.031 | 0.258 | 5.750 |
| | 2.081 | 0.247 | 5.750 |

TABLE 3-continued

| X | Y | Z |
|---|---|---|
| 2.130 | 0.237 | 5.750 |
| 2.179 | 0.226 | 5.750 |
| 2.228 | 0.216 | 5.750 |
| 2.277 | 0.205 | 5.750 |
| 2.327 | 0.194 | 5.750 |
| 2.376 | 0.183 | 5.750 |
| 2.425 | 0.171 | 5.750 |
| 2.474 | 0.160 | 5.750 |
| 2.523 | 0.148 | 5.750 |
| 2.572 | 0.136 | 5.750 |
| 2.621 | 0.125 | 5.750 |
| 2.670 | 0.113 | 5.750 |
| 2.719 | 0.101 | 5.750 |
| 2.728 | 0.098 | 5.750 |
| 2.738 | 0.096 | 5.750 |
| 2.748 | 0.093 | 5.750 |
| 2.758 | 0.091 | 5.750 |
| 2.767 | 0.088 | 5.750 |
| 2.777 | 0.086 | 5.750 |
| 2.787 | 0.083 | 5.750 |
| 2.797 | 0.081 | 5.750 |
| 2.806 | 0.078 | 5.750 |
| 2.816 | 0.076 | 5.750 |
| 2.821 | 0.074 | 5.750 |
| 2.826 | 0.072 | 5.750 |
| 2.830 | 0.069 | 5.750 |
| 2.833 | 0.065 | 5.750 |
| 2.836 | 0.061 | 5.750 |
| 2.839 | 0.057 | 5.750 |
| 2.840 | 0.052 | 5.750 |
| 2.841 | 0.047 | 5.750 |
| 2.841 | 0.042 | 5.750 |
| 2.841 | 0.037 | 5.750 |
| 2.840 | 0.032 | 5.750 |
| 2.838 | 0.027 | 5.750 |
| 2.835 | 0.023 | 5.750 |
| 2.832 | 0.019 | 5.750 |
| 2.829 | 0.016 | 5.750 |
| 2.825 | 0.013 | 5.750 |
| 2.820 | 0.010 | 5.750 |
| 2.815 | 0.009 | 5.750 |
| 2.810 | 0.008 | 5.750 |
| 2.801 | 0.007 | 5.750 |
| 2.792 | 0.006 | 5.750 |
| 2.783 | 0.005 | 5.750 |
| 2.774 | 0.004 | 5.750 |
| 2.765 | 0.003 | 5.750 |
| 2.756 | 0.002 | 5.750 |
| 2.747 | 0.001 | 5.750 |
| 2.737 | 0.001 | 5.750 |
| 2.728 | 0.000 | 5.750 |
| 2.719 | −0.001 | 5.750 |
| 2.674 | −0.006 | 5.750 |
| 2.628 | −0.011 | 5.750 |
| 2.583 | −0.016 | 5.750 |
| 2.537 | −0.021 | 5.750 |
| 2.492 | −0.025 | 5.750 |
| 2.446 | −0.031 | 5.750 |
| 2.401 | −0.036 | 5.750 |
| 2.355 | −0.041 | 5.750 |
| 2.310 | −0.046 | 5.750 |
| 2.264 | −0.052 | 5.750 |
| 2.219 | −0.057 | 5.750 |
| 2.173 | −0.063 | 5.750 |
| 2.128 | −0.069 | 5.750 |
| 2.082 | −0.074 | 5.750 |
| 2.037 | −0.080 | 5.750 |
| 1.992 | −0.086 | 5.750 |
| 1.946 | −0.092 | 5.750 |
| 1.901 | −0.099 | 5.750 |
| 1.856 | −0.105 | 5.750 |
| 1.810 | −0.111 | 5.750 |
| 1.765 | −0.118 | 5.750 |
| 1.720 | −0.124 | 5.750 |
| 1.674 | −0.131 | 5.750 |
| 1.629 | −0.138 | 5.750 |
| 1.584 | −0.145 | 5.750 |

TABLE 3-continued

| X | Y | Z |
|---|---|---|
| 1.538 | −0.151 | 5.750 |
| 1.493 | −0.158 | 5.750 |
| 1.448 | −0.166 | 5.750 |
| 1.403 | −0.173 | 5.750 |
| 1.358 | −0.180 | 5.750 |
| 1.312 | −0.187 | 5.750 |
| 1.267 | −0.195 | 5.750 |
| 1.222 | −0.202 | 5.750 |
| 1.177 | −0.209 | 5.750 |
| 1.132 | −0.217 | 5.750 |
| 1.086 | −0.224 | 5.750 |
| 1.041 | −0.232 | 5.750 |
| 0.996 | −0.240 | 5.750 |
| 0.951 | −0.247 | 5.750 |
| 0.906 | −0.255 | 5.750 |
| 0.861 | −0.263 | 5.750 |
| 0.816 | −0.270 | 5.750 |
| 0.771 | −0.278 | 5.750 |
| 0.725 | −0.286 | 5.750 |
| 0.680 | −0.293 | 5.750 |
| 0.635 | −0.301 | 5.750 |
| 0.590 | −0.309 | 5.750 |
| 0.545 | −0.316 | 5.750 |
| 0.500 | −0.324 | 5.750 |
| 0.454 | −0.331 | 5.750 |
| 0.409 | −0.339 | 5.750 |
| 0.364 | −0.346 | 5.750 |
| 0.319 | −0.353 | 5.750 |
| 0.274 | −0.361 | 5.750 |
| 0.228 | −0.368 | 5.750 |
| 0.183 | −0.375 | 5.750 |
| 0.138 | −0.381 | 5.750 |
| 0.093 | −0.388 | 5.750 |
| 0.047 | −0.395 | 5.750 |
| 0.002 | −0.401 | 5.750 |
| −0.043 | −0.407 | 5.750 |
| −0.089 | −0.413 | 5.750 |
| −0.134 | −0.419 | 5.750 |
| −0.180 | −0.425 | 5.750 |
| −0.225 | −0.431 | 5.750 |
| −0.271 | −0.436 | 5.750 |
| −0.316 | −0.441 | 5.750 |
| −0.362 | −0.446 | 5.750 |
| −0.407 | −0.450 | 5.750 |
| −0.453 | −0.455 | 5.750 |
| −0.498 | −0.459 | 5.750 |
| −0.544 | −0.463 | 5.750 |
| −0.590 | −0.466 | 5.750 |
| −0.635 | −0.469 | 5.750 |
| −0.681 | −0.472 | 5.750 |
| −0.727 | −0.474 | 5.750 |
| −0.772 | −0.476 | 5.750 |
| −0.818 | −0.478 | 5.750 |
| −0.864 | −0.479 | 5.750 |
| −0.873 | −0.479 | 5.750 |
| −0.882 | −0.480 | 5.750 |
| −0.891 | −0.480 | 5.750 |
| −0.901 | −0.480 | 5.750 |
| −0.910 | −0.480 | 5.750 |
| −0.919 | −0.480 | 5.750 |
| −0.928 | −0.480 | 5.750 |
| −0.937 | −0.480 | 5.750 |
| −0.946 | −0.480 | 5.750 |
| −0.956 | −0.480 | 5.750 |
| −0.984 | −0.480 | 5.750 |
| −1.013 | −0.477 | 5.750 |
| −1.042 | −0.472 | 5.750 |
| −1.070 | −0.466 | 5.750 |
| −1.098 | −0.457 | 5.750 |
| −1.124 | −0.446 | 5.750 |
| −1.150 | −0.432 | 5.750 |
| −1.174 | −0.416 | 5.750 |
| −1.196 | −0.397 | 5.750 |
| −1.215 | −0.376 | 5.750 |
| −1.231 | −0.351 | 5.750 |
| −1.242 | −0.325 | 5.750 |
| −1.248 | −0.296 | 5.750 |

TABLE 3-continued

| | X | Y | Z |
|---|---|---|---|
| | −1.248 | −0.267 | 5.750 |
| | −1.243 | −0.239 | 5.750 |
| | −1.234 | −0.212 | 5.750 |
| | −1.220 | −0.186 | 5.750 |
| | −1.204 | −0.162 | 5.750 |
| SECTION 6 | −1.045 | −0.059 | 6.250 |
| | −1.038 | −0.053 | 6.250 |
| | −1.030 | −0.046 | 6.250 |
| | −1.022 | −0.040 | 6.250 |
| | −1.015 | −0.033 | 6.250 |
| | −1.007 | −0.027 | 6.250 |
| | −1.000 | −0.020 | 6.250 |
| | −0.992 | −0.014 | 6.250 |
| | −0.984 | −0.008 | 6.250 |
| | −0.976 | −0.002 | 6.250 |
| | −0.968 | 0.004 | 6.250 |
| | −0.929 | 0.034 | 6.250 |
| | −0.888 | 0.063 | 6.250 |
| | −0.847 | 0.091 | 6.250 |
| | −0.805 | 0.117 | 6.250 |
| | −0.762 | 0.143 | 6.250 |
| | −0.718 | 0.167 | 6.250 |
| | −0.674 | 0.190 | 6.250 |
| | −0.629 | 0.211 | 6.250 |
| | −0.584 | 0.232 | 6.250 |
| | −0.538 | 0.251 | 6.250 |
| | −0.492 | 0.269 | 6.250 |
| | −0.445 | 0.287 | 6.250 |
| | −0.398 | 0.303 | 6.250 |
| | −0.350 | 0.318 | 6.250 |
| | −0.303 | 0.332 | 6.250 |
| | −0.255 | 0.345 | 6.250 |
| | −0.206 | 0.357 | 6.250 |
| | −0.158 | 0.367 | 6.250 |
| | −0.109 | 0.377 | 6.250 |
| | −0.060 | 0.387 | 6.250 |
| | −0.011 | 0.395 | 6.250 |
| | 0.038 | 0.402 | 6.250 |
| | 0.088 | 0.409 | 6.250 |
| | 0.137 | 0.414 | 6.250 |
| | 0.187 | 0.419 | 6.250 |
| | 0.236 | 0.423 | 6.250 |
| | 0.286 | 0.426 | 6.250 |
| | 0.336 | 0.429 | 6.250 |
| | 0.385 | 0.431 | 6.250 |
| | 0.435 | 0.432 | 6.250 |
| | 0.485 | 0.433 | 6.250 |
| | 0.535 | 0.433 | 6.250 |
| | 0.584 | 0.432 | 6.250 |
| | 0.634 | 0.431 | 6.250 |
| | 0.684 | 0.429 | 6.250 |
| | 0.734 | 0.427 | 6.250 |
| | 0.783 | 0.424 | 6.250 |
| | 0.833 | 0.421 | 6.250 |
| | 0.883 | 0.417 | 6.250 |
| | 0.932 | 0.412 | 6.250 |
| | 0.982 | 0.408 | 6.250 |
| | 1.031 | 0.403 | 6.250 |
| | 1.081 | 0.397 | 6.250 |
| | 1.130 | 0.391 | 6.250 |
| | 1.180 | 0.385 | 6.250 |
| | 1.229 | 0.378 | 6.250 |
| | 1.278 | 0.371 | 6.250 |
| | 1.327 | 0.364 | 6.250 |
| | 1.377 | 0.357 | 6.250 |
| | 1.426 | 0.349 | 6.250 |
| | 1.475 | 0.341 | 6.250 |
| | 1.524 | 0.333 | 6.250 |
| | 1.573 | 0.324 | 6.250 |
| | 1.622 | 0.315 | 6.250 |
| | 1.671 | 0.306 | 6.250 |
| | 1.720 | 0.297 | 6.250 |
| | 1.769 | 0.288 | 6.250 |
| | 1.818 | 0.278 | 6.250 |
| | 1.866 | 0.268 | 6.250 |
| | 1.915 | 0.259 | 6.250 |
| | 1.964 | 0.249 | 6.250 |

TABLE 3-continued

| X | Y | Z |
|---|---|---|
| 2.013 | 0.238 | 6.250 |
| 2.061 | 0.228 | 6.250 |
| 2.110 | 0.218 | 6.250 |
| 2.159 | 0.207 | 6.250 |
| 2.207 | 0.197 | 6.250 |
| 2.256 | 0.186 | 6.250 |
| 2.305 | 0.175 | 6.250 |
| 2.353 | 0.165 | 6.250 |
| 2.402 | 0.154 | 6.250 |
| 2.450 | 0.143 | 6.250 |
| 2.499 | 0.132 | 6.250 |
| 2.547 | 0.121 | 6.250 |
| 2.596 | 0.110 | 6.250 |
| 2.644 | 0.098 | 6.250 |
| 2.693 | 0.087 | 6.250 |
| 2.741 | 0.076 | 6.250 |
| 2.790 | 0.064 | 6.250 |
| 2.838 | 0.053 | 6.250 |
| 2.848 | 0.051 | 6.250 |
| 2.858 | 0.049 | 6.250 |
| 2.867 | 0.046 | 6.250 |
| 2.877 | 0.044 | 6.250 |
| 2.887 | 0.042 | 6.250 |
| 2.897 | 0.039 | 6.250 |
| 2.906 | 0.037 | 6.250 |
| 2.916 | 0.035 | 6.250 |
| 2.926 | 0.033 | 6.250 |
| 2.935 | 0.030 | 6.250 |
| 2.940 | 0.029 | 6.250 |
| 2.945 | 0.026 | 6.250 |
| 2.949 | 0.023 | 6.250 |
| 2.953 | 0.020 | 6.250 |
| 2.956 | 0.016 | 6.250 |
| 2.958 | 0.011 | 6.250 |
| 2.960 | 0.007 | 6.250 |
| 2.961 | 0.002 | 6.250 |
| 2.962 | −0.004 | 6.250 |
| 2.961 | −0.009 | 6.250 |
| 2.960 | −0.014 | 6.250 |
| 2.959 | −0.019 | 6.250 |
| 2.956 | −0.023 | 6.250 |
| 2.953 | −0.027 | 6.250 |
| 2.950 | −0.031 | 6.250 |
| 2.946 | −0.034 | 6.250 |
| 2.941 | −0.036 | 6.250 |
| 2.936 | −0.038 | 6.250 |
| 2.931 | −0.039 | 6.250 |
| 2.922 | −0.040 | 6.250 |
| 2.913 | −0.041 | 6.250 |
| 2.904 | −0.042 | 6.250 |
| 2.895 | −0.044 | 6.250 |
| 2.886 | −0.045 | 6.250 |
| 2.877 | −0.046 | 6.250 |
| 2.867 | −0.047 | 6.250 |
| 2.858 | −0.048 | 6.250 |
| 2.849 | −0.049 | 6.250 |
| 2.840 | −0.050 | 6.250 |
| 2.794 | −0.055 | 6.250 |
| 2.749 | −0.061 | 6.250 |
| 2.703 | −0.066 | 6.250 |
| 2.658 | −0.072 | 6.250 |
| 2.612 | −0.077 | 6.250 |
| 2.566 | −0.082 | 6.250 |
| 2.521 | −0.088 | 6.250 |
| 2.475 | −0.093 | 6.250 |
| 2.430 | −0.099 | 6.250 |
| 2.384 | −0.104 | 6.250 |
| 2.338 | −0.110 | 6.250 |
| 2.293 | −0.115 | 6.250 |
| 2.247 | −0.121 | 6.250 |
| 2.202 | −0.127 | 6.250 |
| 2.156 | −0.132 | 6.250 |
| 2.111 | −0.138 | 6.250 |
| 2.065 | −0.144 | 6.250 |
| 2.019 | −0.149 | 6.250 |
| 1.974 | −0.155 | 6.250 |
| 1.928 | −0.161 | 6.250 |

TABLE 3-continued

| | X | Y | Z |
|---|---|---|---|
| | 1.883 | −0.167 | 6.250 |
| | 1.837 | −0.173 | 6.250 |
| | 1.792 | −0.179 | 6.250 |
| | 1.746 | −0.185 | 6.250 |
| | 1.701 | −0.191 | 6.250 |
| | 1.655 | −0.197 | 6.250 |
| | 1.610 | −0.203 | 6.250 |
| | 1.564 | −0.209 | 6.250 |
| | 1.519 | −0.215 | 6.250 |
| | 1.473 | −0.221 | 6.250 |
| | 1.428 | −0.227 | 6.250 |
| | 1.382 | −0.234 | 6.250 |
| | 1.337 | −0.240 | 6.250 |
| | 1.291 | −0.246 | 6.250 |
| | 1.245 | −0.252 | 6.250 |
| | 1.200 | −0.258 | 6.250 |
| | 1.154 | −0.265 | 6.250 |
| | 1.109 | −0.271 | 6.250 |
| | 1.063 | −0.277 | 6.250 |
| | 1.018 | −0.283 | 6.250 |
| | 0.972 | −0.289 | 6.250 |
| | 0.927 | −0.295 | 6.250 |
| | 0.881 | −0.302 | 6.250 |
| | 0.836 | −0.308 | 6.250 |
| | 0.790 | −0.314 | 6.250 |
| | 0.745 | −0.320 | 6.250 |
| | 0.699 | −0.325 | 6.250 |
| | 0.654 | −0.331 | 6.250 |
| | 0.608 | −0.337 | 6.250 |
| | 0.563 | −0.343 | 6.250 |
| | 0.517 | −0.348 | 6.250 |
| | 0.471 | −0.354 | 6.250 |
| | 0.426 | −0.359 | 6.250 |
| | 0.380 | −0.364 | 6.250 |
| | 0.335 | −0.369 | 6.250 |
| | 0.289 | −0.374 | 6.250 |
| | 0.243 | −0.379 | 6.250 |
| | 0.197 | −0.383 | 6.250 |
| | 0.152 | −0.388 | 6.250 |
| | 0.106 | −0.392 | 6.250 |
| | 0.060 | −0.396 | 6.250 |
| | 0.014 | −0.400 | 6.250 |
| | −0.031 | −0.403 | 6.250 |
| | −0.077 | −0.406 | 6.250 |
| | −0.123 | −0.410 | 6.250 |
| | −0.169 | −0.412 | 6.250 |
| | −0.215 | −0.415 | 6.250 |
| | −0.260 | −0.417 | 6.250 |
| | −0.306 | −0.419 | 6.250 |
| | −0.352 | −0.421 | 6.250 |
| | −0.398 | −0.422 | 6.250 |
| | −0.444 | −0.423 | 6.250 |
| | −0.490 | −0.423 | 6.250 |
| | −0.536 | −0.423 | 6.250 |
| | −0.582 | −0.423 | 6.250 |
| | −0.628 | −0.422 | 6.250 |
| | −0.674 | −0.421 | 6.250 |
| | −0.720 | −0.419 | 6.250 |
| | −0.765 | −0.417 | 6.250 |
| | −0.775 | −0.416 | 6.250 |
| | −0.784 | −0.416 | 6.250 |
| | −0.793 | −0.415 | 6.250 |
| | −0.802 | −0.415 | 6.250 |
| | −0.811 | −0.414 | 6.250 |
| | −0.820 | −0.414 | 6.250 |
| | −0.830 | −0.413 | 6.250 |
| | −0.839 | −0.412 | 6.250 |
| | −0.848 | −0.412 | 6.250 |
| | −0.857 | −0.411 | 6.250 |
| | −0.886 | −0.408 | 6.250 |
| | −0.914 | −0.404 | 6.250 |
| | −0.942 | −0.397 | 6.250 |
| | −0.969 | −0.389 | 6.250 |
| | −0.995 | −0.378 | 6.250 |
| | −1.021 | −0.365 | 6.250 |
| | −1.045 | −0.350 | 6.250 |
| | −1.067 | −0.331 | 6.250 |

TABLE 3-continued

| | X | Y | Z |
|---|---|---|---|
| | −1.086 | −0.311 | 6.250 |
| | −1.102 | −0.287 | 6.250 |
| | −1.115 | −0.262 | 6.250 |
| | −1.122 | −0.234 | 6.250 |
| | −1.124 | −0.206 | 6.250 |
| | −1.121 | −0.177 | 6.250 |
| | −1.112 | −0.150 | 6.250 |
| | −1.100 | −0.124 | 6.250 |
| | −1.084 | −0.101 | 6.250 |
| | −1.066 | −0.079 | 6.250 |
| SECTION 7 | −0.896 | 0.007 | 6.750 |
| | −0.888 | 0.012 | 6.750 |
| | −0.880 | 0.018 | 6.750 |
| | −0.873 | 0.024 | 6.750 |
| | −0.865 | 0.030 | 6.750 |
| | −0.857 | 0.036 | 6.750 |
| | −0.849 | 0.041 | 6.750 |
| | −0.841 | 0.047 | 6.750 |
| | −0.832 | 0.052 | 6.750 |
| | −0.824 | 0.058 | 6.750 |
| | −0.816 | 0.063 | 6.750 |
| | −0.775 | 0.090 | 6.750 |
| | −0.733 | 0.116 | 6.750 |
| | −0.690 | 0.140 | 6.750 |
| | −0.647 | 0.164 | 6.750 |
| | −0.603 | 0.186 | 6.750 |
| | −0.559 | 0.207 | 6.750 |
| | −0.514 | 0.227 | 6.750 |
| | −0.469 | 0.246 | 6.750 |
| | −0.423 | 0.264 | 6.750 |
| | −0.377 | 0.280 | 6.750 |
| | −0.330 | 0.296 | 6.750 |
| | −0.283 | 0.311 | 6.750 |
| | −0.236 | 0.324 | 6.750 |
| | −0.189 | 0.337 | 6.750 |
| | −0.141 | 0.349 | 6.750 |
| | −0.093 | 0.359 | 6.750 |
| | −0.045 | 0.369 | 6.750 |
| | 0.003 | 0.378 | 6.750 |
| | 0.052 | 0.386 | 6.750 |
| | 0.101 | 0.393 | 6.750 |
| | 0.149 | 0.400 | 6.750 |
| | 0.198 | 0.405 | 6.750 |
| | 0.247 | 0.410 | 6.750 |
| | 0.296 | 0.414 | 6.750 |
| | 0.345 | 0.417 | 6.750 |
| | 0.394 | 0.420 | 6.750 |
| | 0.443 | 0.422 | 6.750 |
| | 0.492 | 0.423 | 6.750 |
| | 0.541 | 0.423 | 6.750 |
| | 0.591 | 0.423 | 6.750 |
| | 0.640 | 0.423 | 6.750 |
| | 0.689 | 0.422 | 6.750 |
| | 0.738 | 0.420 | 6.750 |
| | 0.787 | 0.418 | 6.750 |
| | 0.836 | 0.415 | 6.750 |
| | 0.885 | 0.412 | 6.750 |
| | 0.934 | 0.408 | 6.750 |
| | 0.983 | 0.404 | 6.750 |
| | 1.032 | 0.399 | 6.750 |
| | 1.081 | 0.394 | 6.750 |
| | 1.130 | 0.389 | 6.750 |
| | 1.178 | 0.383 | 6.750 |
| | 1.227 | 0.377 | 6.750 |
| | 1.276 | 0.370 | 6.750 |
| | 1.324 | 0.363 | 6.750 |
| | 1.373 | 0.356 | 6.750 |
| | 1.422 | 0.349 | 6.750 |
| | 1.470 | 0.341 | 6.750 |
| | 1.519 | 0.334 | 6.750 |
| | 1.567 | 0.325 | 6.750 |
| | 1.616 | 0.317 | 6.750 |
| | 1.664 | 0.308 | 6.750 |
| | 1.712 | 0.300 | 6.750 |
| | 1.761 | 0.291 | 6.750 |
| | 1.809 | 0.282 | 6.750 |
| | 1.857 | 0.272 | 6.750 |

TABLE 3-continued

| X | Y | Z |
|---|---|---|
| 1.905 | 0.263 | 6.750 |
| 1.954 | 0.254 | 6.750 |
| 2.002 | 0.244 | 6.750 |
| 2.050 | 0.234 | 6.750 |
| 2.098 | 0.224 | 6.750 |
| 2.146 | 0.214 | 6.750 |
| 2.194 | 0.204 | 6.750 |
| 2.242 | 0.194 | 6.750 |
| 2.290 | 0.184 | 6.750 |
| 2.338 | 0.174 | 6.750 |
| 2.387 | 0.164 | 6.750 |
| 2.435 | 0.154 | 6.750 |
| 2.483 | 0.143 | 6.750 |
| 2.531 | 0.133 | 6.750 |
| 2.579 | 0.123 | 6.750 |
| 2.627 | 0.112 | 6.750 |
| 2.675 | 0.102 | 6.750 |
| 2.723 | 0.092 | 6.750 |
| 2.771 | 0.081 | 6.750 |
| 2.819 | 0.071 | 6.750 |
| 2.867 | 0.061 | 6.750 |
| 2.915 | 0.051 | 6.750 |
| 2.963 | 0.041 | 6.750 |
| 2.973 | 0.038 | 6.750 |
| 2.982 | 0.036 | 6.750 |
| 2.992 | 0.034 | 6.750 |
| 3.002 | 0.032 | 6.750 |
| 3.011 | 0.030 | 6.750 |
| 3.021 | 0.028 | 6.750 |
| 3.030 | 0.026 | 6.750 |
| 3.040 | 0.024 | 6.750 |
| 3.050 | 0.022 | 6.750 |
| 3.059 | 0.020 | 6.750 |
| 3.064 | 0.019 | 6.750 |
| 3.069 | 0.016 | 6.750 |
| 3.073 | 0.014 | 6.750 |
| 3.077 | 0.010 | 6.750 |
| 3.081 | 0.006 | 6.750 |
| 3.083 | 0.001 | 6.750 |
| 3.086 | −0.003 | 6.750 |
| 3.087 | −0.009 | 6.750 |
| 3.088 | −0.014 | 6.750 |
| 3.087 | −0.019 | 6.750 |
| 3.087 | −0.024 | 6.750 |
| 3.085 | −0.029 | 6.750 |
| 3.083 | −0.034 | 6.750 |
| 3.080 | −0.038 | 6.750 |
| 3.076 | −0.042 | 6.750 |
| 3.072 | −0.046 | 6.750 |
| 3.067 | −0.048 | 6.750 |
| 3.062 | −0.050 | 6.750 |
| 3.057 | −0.051 | 6.750 |
| 3.048 | −0.052 | 6.750 |
| 3.039 | −0.054 | 6.750 |
| 3.030 | −0.055 | 6.750 |
| 3.021 | −0.056 | 6.750 |
| 3.011 | −0.057 | 6.750 |
| 3.002 | −0.059 | 6.750 |
| 2.993 | −0.060 | 6.750 |
| 2.984 | −0.061 | 6.750 |
| 2.975 | −0.062 | 6.750 |
| 2.966 | −0.064 | 6.750 |
| 2.920 | −0.070 | 6.750 |
| 2.874 | −0.076 | 6.750 |
| 2.828 | −0.082 | 6.750 |
| 2.782 | −0.088 | 6.750 |
| 2.736 | −0.094 | 6.750 |
| 2.690 | −0.100 | 6.750 |
| 2.645 | −0.106 | 6.750 |
| 2.599 | −0.112 | 6.750 |
| 2.553 | −0.118 | 6.750 |
| 2.507 | −0.124 | 6.750 |
| 2.461 | −0.130 | 6.750 |
| 2.415 | −0.136 | 6.750 |
| 2.369 | −0.142 | 6.750 |
| 2.323 | −0.147 | 6.750 |
| 2.277 | −0.153 | 6.750 |

TABLE 3-continued

| X | Y | Z |
|---|---|---|
| 2.232 | −0.159 | 6.750 |
| 2.186 | −0.165 | 6.750 |
| 2.140 | −0.171 | 6.750 |
| 2.094 | −0.177 | 6.750 |
| 2.048 | −0.183 | 6.750 |
| 2.002 | −0.189 | 6.750 |
| 1.956 | −0.195 | 6.750 |
| 1.910 | −0.201 | 6.750 |
| 1.865 | −0.207 | 6.750 |
| 1.819 | −0.213 | 6.750 |
| 1.773 | −0.219 | 6.750 |
| 1.727 | −0.225 | 6.750 |
| 1.681 | −0.231 | 6.750 |
| 1.635 | −0.237 | 6.750 |
| 1.589 | −0.243 | 6.750 |
| 1.543 | −0.249 | 6.750 |
| 1.498 | −0.255 | 6.750 |
| 1.452 | −0.261 | 6.750 |
| 1.406 | −0.267 | 6.750 |
| 1.360 | −0.273 | 6.750 |
| 1.314 | −0.279 | 6.750 |
| 1.268 | −0.285 | 6.750 |
| 1.222 | −0.291 | 6.750 |
| 1.176 | −0.297 | 6.750 |
| 1.130 | −0.303 | 6.750 |
| 1.085 | −0.308 | 6.750 |
| 1.039 | −0.314 | 6.750 |
| 0.993 | −0.319 | 6.750 |
| 0.947 | −0.325 | 6.750 |
| 0.901 | −0.330 | 6.750 |
| 0.855 | −0.336 | 6.750 |
| 0.809 | −0.341 | 6.750 |
| 0.763 | −0.346 | 6.750 |
| 0.717 | −0.351 | 6.750 |
| 0.671 | −0.356 | 6.750 |
| 0.625 | −0.360 | 6.750 |
| 0.579 | −0.365 | 6.750 |
| 0.533 | −0.369 | 6.750 |
| 0.487 | −0.373 | 6.750 |
| 0.441 | −0.377 | 6.750 |
| 0.394 | −0.381 | 6.750 |
| 0.348 | −0.384 | 6.750 |
| 0.302 | −0.387 | 6.750 |
| 0.256 | −0.390 | 6.750 |
| 0.210 | −0.393 | 6.750 |
| 0.164 | −0.396 | 6.750 |
| 0.117 | −0.398 | 6.750 |
| 0.071 | −0.399 | 6.750 |
| 0.025 | −0.401 | 6.750 |
| −0.021 | −0.402 | 6.750 |
| −0.068 | −0.403 | 6.750 |
| −0.114 | −0.403 | 6.750 |
| −0.160 | −0.403 | 6.750 |
| −0.206 | −0.403 | 6.750 |
| −0.253 | −0.402 | 6.750 |
| −0.299 | −0.401 | 6.750 |
| −0.345 | −0.399 | 6.750 |
| −0.391 | −0.396 | 6.750 |
| −0.437 | −0.393 | 6.750 |
| −0.484 | −0.390 | 6.750 |
| −0.530 | −0.386 | 6.750 |
| −0.576 | −0.381 | 6.750 |
| −0.622 | −0.376 | 6.750 |
| −0.668 | −0.370 | 6.750 |
| −0.677 | −0.368 | 6.750 |
| −0.686 | −0.367 | 6.750 |
| −0.695 | −0.366 | 6.750 |
| −0.704 | −0.364 | 6.750 |
| −0.713 | −0.363 | 6.750 |
| −0.722 | −0.362 | 6.750 |
| −0.732 | −0.360 | 6.750 |
| −0.741 | −0.359 | 6.750 |
| −0.750 | −0.357 | 6.750 |
| −0.759 | −0.356 | 6.750 |
| −0.787 | −0.350 | 6.750 |
| −0.814 | −0.344 | 6.750 |
| −0.840 | −0.335 | 6.750 |

TABLE 3-continued

| | X | Y | Z |
|---|---|---|---|
| | −0.866 | −0.325 | 6.750 |
| | −0.891 | −0.311 | 6.750 |
| | −0.914 | −0.296 | 6.750 |
| | −0.936 | −0.278 | 6.750 |
| | −0.955 | −0.258 | 6.750 |
| | −0.971 | −0.235 | 6.750 |
| | −0.984 | −0.210 | 6.750 |
| | −0.992 | −0.183 | 6.750 |
| | −0.994 | −0.155 | 6.750 |
| | −0.991 | −0.127 | 6.750 |
| | −0.983 | −0.100 | 6.750 |
| | −0.972 | −0.075 | 6.750 |
| | −0.957 | −0.051 | 6.750 |
| | −0.939 | −0.030 | 6.750 |
| | −0.918 | −0.011 | 6.750 |
| SECTION 8 | −0.740 | 0.060 | 7.250 |
| | −0.732 | 0.065 | 7.250 |
| | −0.724 | 0.070 | 7.250 |
| | −0.715 | 0.075 | 7.250 |
| | −0.707 | 0.080 | 7.250 |
| | −0.699 | 0.085 | 7.250 |
| | −0.690 | 0.090 | 7.250 |
| | −0.682 | 0.095 | 7.250 |
| | −0.673 | 0.100 | 7.250 |
| | −0.665 | 0.104 | 7.250 |
| | −0.657 | 0.109 | 7.250 |
| | −0.614 | 0.132 | 7.250 |
| | −0.571 | 0.154 | 7.250 |
| | −0.527 | 0.175 | 7.250 |
| | −0.483 | 0.195 | 7.250 |
| | −0.439 | 0.214 | 7.250 |
| | −0.394 | 0.233 | 7.250 |
| | −0.348 | 0.250 | 7.250 |
| | −0.303 | 0.266 | 7.250 |
| | −0.257 | 0.281 | 7.250 |
| | −0.210 | 0.295 | 7.250 |
| | −0.164 | 0.308 | 7.250 |
| | −0.117 | 0.321 | 7.250 |
| | −0.070 | 0.332 | 7.250 |
| | −0.023 | 0.343 | 7.250 |
| | 0.025 | 0.352 | 7.250 |
| | 0.072 | 0.361 | 7.250 |
| | 0.120 | 0.369 | 7.250 |
| | 0.168 | 0.377 | 7.250 |
| | 0.216 | 0.383 | 7.250 |
| | 0.264 | 0.389 | 7.250 |
| | 0.312 | 0.394 | 7.250 |
| | 0.361 | 0.399 | 7.250 |
| | 0.409 | 0.402 | 7.250 |
| | 0.457 | 0.405 | 7.250 |
| | 0.506 | 0.408 | 7.250 |
| | 0.554 | 0.409 | 7.250 |
| | 0.602 | 0.411 | 7.250 |
| | 0.651 | 0.411 | 7.250 |
| | 0.699 | 0.411 | 7.250 |
| | 0.748 | 0.411 | 7.250 |
| | 0.796 | 0.410 | 7.250 |
| | 0.845 | 0.408 | 7.250 |
| | 0.893 | 0.406 | 7.250 |
| | 0.941 | 0.404 | 7.250 |
| | 0.990 | 0.401 | 7.250 |
| | 1.038 | 0.397 | 7.250 |
| | 1.086 | 0.393 | 7.250 |
| | 1.135 | 0.389 | 7.250 |
| | 1.183 | 0.385 | 7.250 |
| | 1.231 | 0.380 | 7.250 |
| | 1.279 | 0.374 | 7.250 |
| | 1.327 | 0.369 | 7.250 |
| | 1.375 | 0.363 | 7.250 |
| | 1.423 | 0.357 | 7.250 |
| | 1.471 | 0.350 | 7.250 |
| | 1.519 | 0.343 | 7.250 |
| | 1.567 | 0.336 | 7.250 |
| | 1.615 | 0.329 | 7.250 |
| | 1.663 | 0.321 | 7.250 |
| | 1.711 | 0.314 | 7.250 |
| | 1.759 | 0.306 | 7.250 |

TABLE 3-continued

| | X | Y | Z |
|---|---|---|---|
| | 1.806 | 0.298 | 7.250 |
| | 1.854 | 0.290 | 7.250 |
| | 1.902 | 0.281 | 7.250 |
| | 1.950 | 0.273 | 7.250 |
| | 1.997 | 0.264 | 7.250 |
| | 2.045 | 0.255 | 7.250 |
| | 2.093 | 0.247 | 7.250 |
| | 2.140 | 0.238 | 7.250 |
| | 2.188 | 0.229 | 7.250 |
| | 2.235 | 0.220 | 7.250 |
| | 2.283 | 0.211 | 7.250 |
| | 2.331 | 0.202 | 7.250 |
| | 2.378 | 0.192 | 7.250 |
| | 2.426 | 0.183 | 7.250 |
| | 2.473 | 0.174 | 7.250 |
| | 2.521 | 0.165 | 7.250 |
| | 2.568 | 0.156 | 7.250 |
| | 2.616 | 0.147 | 7.250 |
| | 2.664 | 0.138 | 7.250 |
| | 2.711 | 0.128 | 7.250 |
| | 2.759 | 0.119 | 7.250 |
| | 2.806 | 0.110 | 7.250 |
| | 2.854 | 0.101 | 7.250 |
| | 2.901 | 0.093 | 7.250 |
| | 2.949 | 0.084 | 7.250 |
| | 2.997 | 0.075 | 7.250 |
| | 3.044 | 0.066 | 7.250 |
| | 3.092 | 0.058 | 7.250 |
| | 3.102 | 0.056 | 7.250 |
| | 3.111 | 0.054 | 7.250 |
| | 3.121 | 0.052 | 7.250 |
| | 3.130 | 0.051 | 7.250 |
| | 3.140 | 0.049 | 7.250 |
| | 3.149 | 0.047 | 7.250 |
| | 3.159 | 0.046 | 7.250 |
| | 3.168 | 0.044 | 7.250 |
| | 3.178 | 0.042 | 7.250 |
| | 3.187 | 0.041 | 7.250 |
| | 3.193 | 0.039 | 7.250 |
| | 3.198 | 0.037 | 7.250 |
| | 3.202 | 0.034 | 7.250 |
| | 3.207 | 0.031 | 7.250 |
| | 3.210 | 0.026 | 7.250 |
| | 3.213 | 0.022 | 7.250 |
| | 3.216 | 0.017 | 7.250 |
| | 3.217 | 0.012 | 7.250 |
| | 3.218 | 0.006 | 7.250 |
| | 3.218 | 0.001 | 7.250 |
| | 3.217 | −0.005 | 7.250 |
| | 3.216 | −0.010 | 7.250 |
| | 3.213 | −0.015 | 7.250 |
| | 3.210 | −0.020 | 7.250 |
| | 3.207 | −0.024 | 7.250 |
| | 3.203 | −0.027 | 7.250 |
| | 3.198 | −0.030 | 7.250 |
| | 3.193 | −0.032 | 7.250 |
| | 3.188 | −0.033 | 7.250 |
| | 3.178 | −0.035 | 7.250 |
| | 3.169 | −0.036 | 7.250 |
| | 3.160 | −0.038 | 7.250 |
| | 3.151 | −0.039 | 7.250 |
| | 3.141 | −0.040 | 7.250 |
| | 3.132 | −0.042 | 7.250 |
| | 3.123 | −0.043 | 7.250 |
| | 3.114 | −0.045 | 7.250 |
| | 3.104 | −0.046 | 7.250 |
| | 3.095 | −0.047 | 7.250 |
| | 3.049 | −0.054 | 7.250 |
| | 3.003 | −0.061 | 7.250 |
| | 2.956 | −0.068 | 7.250 |
| | 2.910 | −0.075 | 7.250 |
| | 2.864 | −0.082 | 7.250 |
| | 2.818 | −0.089 | 7.250 |
| | 2.771 | −0.095 | 7.250 |
| | 2.725 | −0.102 | 7.250 |
| | 2.679 | −0.109 | 7.250 |
| | 2.632 | −0.116 | 7.250 |

TABLE 3-continued

| X | Y | Z |
|---|---|---|
| 2.586 | −0.122 | 7.250 |
| 2.540 | −0.129 | 7.250 |
| 2.494 | −0.136 | 7.250 |
| 2.447 | −0.142 | 7.250 |
| 2.401 | −0.149 | 7.250 |
| 2.355 | −0.156 | 7.250 |
| 2.308 | −0.162 | 7.250 |
| 2.262 | −0.169 | 7.250 |
| 2.216 | −0.176 | 7.250 |
| 2.170 | −0.183 | 7.250 |
| 2.123 | −0.189 | 7.250 |
| 2.077 | −0.196 | 7.250 |
| 2.031 | −0.203 | 7.250 |
| 1.985 | −0.210 | 7.250 |
| 1.938 | −0.216 | 7.250 |
| 1.892 | −0.223 | 7.250 |
| 1.846 | −0.230 | 7.250 |
| 1.799 | −0.237 | 7.250 |
| 1.753 | −0.243 | 7.250 |
| 1.707 | −0.250 | 7.250 |
| 1.661 | −0.257 | 7.250 |
| 1.614 | −0.263 | 7.250 |
| 1.568 | −0.270 | 7.250 |
| 1.522 | −0.277 | 7.250 |
| 1.475 | −0.283 | 7.250 |
| 1.429 | −0.290 | 7.250 |
| 1.383 | −0.296 | 7.250 |
| 1.336 | −0.302 | 7.250 |
| 1.290 | −0.309 | 7.250 |
| 1.244 | −0.315 | 7.250 |
| 1.197 | −0.321 | 7.250 |
| 1.151 | −0.327 | 7.250 |
| 1.105 | −0.333 | 7.250 |
| 1.058 | −0.339 | 7.250 |
| 1.012 | −0.344 | 7.250 |
| 0.965 | −0.350 | 7.250 |
| 0.919 | −0.355 | 7.250 |
| 0.872 | −0.360 | 7.250 |
| 0.826 | −0.365 | 7.250 |
| 0.779 | −0.370 | 7.250 |
| 0.733 | −0.375 | 7.250 |
| 0.686 | −0.379 | 7.250 |
| 0.640 | −0.383 | 7.250 |
| 0.593 | −0.387 | 7.250 |
| 0.546 | −0.390 | 7.250 |
| 0.500 | −0.393 | 7.250 |
| 0.453 | −0.396 | 7.250 |
| 0.406 | −0.399 | 7.250 |
| 0.360 | −0.401 | 7.250 |
| 0.313 | −0.403 | 7.250 |
| 0.266 | −0.404 | 7.250 |
| 0.219 | −0.405 | 7.250 |
| 0.173 | −0.406 | 7.250 |
| 0.126 | −0.406 | 7.250 |
| 0.079 | −0.405 | 7.250 |
| 0.032 | −0.404 | 7.250 |
| −0.014 | −0.403 | 7.250 |
| −0.061 | −0.401 | 7.250 |
| −0.108 | −0.398 | 7.250 |
| −0.154 | −0.395 | 7.250 |
| −0.201 | −0.391 | 7.250 |
| −0.248 | −0.387 | 7.250 |
| −0.294 | −0.381 | 7.250 |
| −0.340 | −0.375 | 7.250 |
| −0.387 | −0.369 | 7.250 |
| −0.433 | −0.361 | 7.250 |
| −0.479 | −0.353 | 7.250 |
| −0.525 | −0.344 | 7.250 |
| −0.570 | −0.334 | 7.250 |
| −0.579 | −0.332 | 7.250 |
| −0.589 | −0.329 | 7.250 |
| −0.598 | −0.327 | 7.250 |
| −0.607 | −0.325 | 7.250 |
| −0.616 | −0.323 | 7.250 |
| −0.625 | −0.320 | 7.250 |
| −0.634 | −0.318 | 7.250 |
| −0.643 | −0.316 | 7.250 |

TABLE 3-continued

| | X | Y | Z |
|---|---|---|---|
| | −0.652 | −0.313 | 7.250 |
| | −0.661 | −0.311 | 7.250 |
| | −0.687 | −0.303 | 7.250 |
| | −0.713 | −0.294 | 7.250 |
| | −0.738 | −0.283 | 7.250 |
| | −0.762 | −0.269 | 7.250 |
| | −0.784 | −0.253 | 7.250 |
| | −0.805 | −0.235 | 7.250 |
| | −0.823 | −0.215 | 7.250 |
| | −0.839 | −0.192 | 7.250 |
| | −0.850 | −0.167 | 7.250 |
| | −0.857 | −0.141 | 7.250 |
| | −0.859 | −0.113 | 7.250 |
| | −0.856 | −0.086 | 7.250 |
| | −0.849 | −0.060 | 7.250 |
| | −0.837 | −0.035 | 7.250 |
| | −0.822 | −0.012 | 7.250 |
| | −0.805 | 0.009 | 7.250 |
| | −0.785 | 0.028 | 7.250 |
| | −0.763 | 0.045 | 7.250 |
| SECTION 9 | −0.578 | 0.104 | 7.750 |
| | −0.570 | 0.109 | 7.750 |
| | −0.561 | 0.113 | 7.750 |
| | −0.553 | 0.117 | 7.750 |
| | −0.544 | 0.121 | 7.750 |
| | −0.535 | 0.125 | 7.750 |
| | −0.527 | 0.129 | 7.750 |
| | −0.518 | 0.133 | 7.750 |
| | −0.509 | 0.137 | 7.750 |
| | −0.501 | 0.141 | 7.750 |
| | −0.492 | 0.145 | 7.750 |
| | −0.448 | 0.164 | 7.750 |
| | −0.404 | 0.182 | 7.750 |
| | −0.360 | 0.200 | 7.750 |
| | −0.315 | 0.216 | 7.750 |
| | −0.270 | 0.232 | 7.750 |
| | −0.225 | 0.247 | 7.750 |
| | −0.179 | 0.261 | 7.750 |
| | −0.133 | 0.274 | 7.750 |
| | −0.087 | 0.287 | 7.750 |
| | −0.041 | 0.299 | 7.750 |
| | 0.006 | 0.310 | 7.750 |
| | 0.052 | 0.320 | 7.750 |
| | 0.099 | 0.329 | 7.750 |
| | 0.146 | 0.338 | 7.750 |
| | 0.193 | 0.346 | 7.750 |
| | 0.240 | 0.354 | 7.750 |
| | 0.287 | 0.360 | 7.750 |
| | 0.335 | 0.366 | 7.750 |
| | 0.382 | 0.372 | 7.750 |
| | 0.430 | 0.377 | 7.750 |
| | 0.477 | 0.381 | 7.750 |
| | 0.525 | 0.385 | 7.750 |
| | 0.572 | 0.388 | 7.750 |
| | 0.620 | 0.390 | 7.750 |
| | 0.668 | 0.392 | 7.750 |
| | 0.716 | 0.394 | 7.750 |
| | 0.763 | 0.395 | 7.750 |
| | 0.811 | 0.395 | 7.750 |
| | 0.859 | 0.395 | 7.750 |
| | 0.906 | 0.395 | 7.750 |
| | 0.954 | 0.394 | 7.750 |
| | 1.002 | 0.393 | 7.750 |
| | 1.050 | 0.391 | 7.750 |
| | 1.097 | 0.389 | 7.750 |
| | 1.145 | 0.386 | 7.750 |
| | 1.193 | 0.383 | 7.750 |
| | 1.240 | 0.380 | 7.750 |
| | 1.288 | 0.377 | 7.750 |
| | 1.335 | 0.373 | 7.750 |
| | 1.383 | 0.368 | 7.750 |
| | 1.430 | 0.364 | 7.750 |
| | 1.478 | 0.359 | 7.750 |
| | 1.525 | 0.354 | 7.750 |
| | 1.573 | 0.348 | 7.750 |
| | 1.620 | 0.343 | 7.750 |
| | 1.668 | 0.337 | 7.750 |

TABLE 3-continued

| X | Y | Z |
|---|---|---|
| 1.715 | 0.331 | 7.750 |
| 1.762 | 0.325 | 7.750 |
| 1.810 | 0.318 | 7.750 |
| 1.857 | 0.312 | 7.750 |
| 1.904 | 0.305 | 7.750 |
| 1.951 | 0.298 | 7.750 |
| 1.998 | 0.291 | 7.750 |
| 2.046 | 0.284 | 7.750 |
| 2.093 | 0.277 | 7.750 |
| 2.140 | 0.269 | 7.750 |
| 2.187 | 0.262 | 7.750 |
| 2.234 | 0.254 | 7.750 |
| 2.281 | 0.247 | 7.750 |
| 2.329 | 0.239 | 7.750 |
| 2.376 | 0.232 | 7.750 |
| 2.423 | 0.224 | 7.750 |
| 2.470 | 0.216 | 7.750 |
| 2.517 | 0.209 | 7.750 |
| 2.564 | 0.201 | 7.750 |
| 2.611 | 0.193 | 7.750 |
| 2.658 | 0.186 | 7.750 |
| 2.706 | 0.178 | 7.750 |
| 2.753 | 0.171 | 7.750 |
| 2.800 | 0.163 | 7.750 |
| 2.847 | 0.156 | 7.750 |
| 2.894 | 0.148 | 7.750 |
| 2.941 | 0.141 | 7.750 |
| 2.988 | 0.134 | 7.750 |
| 3.036 | 0.127 | 7.750 |
| 3.083 | 0.120 | 7.750 |
| 3.130 | 0.113 | 7.750 |
| 3.177 | 0.106 | 7.750 |
| 3.225 | 0.099 | 7.750 |
| 3.234 | 0.098 | 7.750 |
| 3.244 | 0.097 | 7.750 |
| 3.253 | 0.096 | 7.750 |
| 3.262 | 0.094 | 7.750 |
| 3.272 | 0.093 | 7.750 |
| 3.281 | 0.092 | 7.750 |
| 3.291 | 0.090 | 7.750 |
| 3.300 | 0.089 | 7.750 |
| 3.310 | 0.088 | 7.750 |
| 3.319 | 0.087 | 7.750 |
| 3.325 | 0.085 | 7.750 |
| 3.330 | 0.083 | 7.750 |
| 3.335 | 0.080 | 7.750 |
| 3.340 | 0.077 | 7.750 |
| 3.344 | 0.073 | 7.750 |
| 3.347 | 0.068 | 7.750 |
| 3.349 | 0.063 | 7.750 |
| 3.351 | 0.057 | 7.750 |
| 3.352 | 0.052 | 7.750 |
| 3.352 | 0.046 | 7.750 |
| 3.352 | 0.040 | 7.750 |
| 3.350 | 0.035 | 7.750 |
| 3.348 | 0.030 | 7.750 |
| 3.345 | 0.025 | 7.750 |
| 3.341 | 0.020 | 7.750 |
| 3.337 | 0.016 | 7.750 |
| 3.332 | 0.013 | 7.750 |
| 3.327 | 0.011 | 7.750 |
| 3.321 | 0.010 | 7.750 |
| 3.312 | 0.008 | 7.750 |
| 3.303 | 0.006 | 7.750 |
| 3.293 | 0.005 | 7.750 |
| 3.284 | 0.003 | 7.750 |
| 3.275 | 0.002 | 7.750 |
| 3.265 | 0.000 | 7.750 |
| 3.256 | −0.001 | 7.750 |
| 3.247 | −0.003 | 7.750 |
| 3.237 | −0.005 | 7.750 |
| 3.228 | −0.006 | 7.750 |
| 3.181 | −0.014 | 7.750 |
| 3.134 | −0.022 | 7.750 |
| 3.088 | −0.030 | 7.750 |
| 3.041 | −0.038 | 7.750 |
| 2.994 | −0.045 | 7.750 |

TABLE 3-continued

| X | Y | Z |
|---|---|---|
| 2.947 | −0.053 | 7.750 |
| 2.901 | −0.061 | 7.750 |
| 2.854 | −0.069 | 7.750 |
| 2.807 | −0.077 | 7.750 |
| 2.760 | −0.085 | 7.750 |
| 2.714 | −0.092 | 7.750 |
| 2.667 | −0.100 | 7.750 |
| 2.620 | −0.108 | 7.750 |
| 2.573 | −0.116 | 7.750 |
| 2.527 | −0.124 | 7.750 |
| 2.480 | −0.132 | 7.750 |
| 2.433 | −0.140 | 7.750 |
| 2.386 | −0.148 | 7.750 |
| 2.340 | −0.156 | 7.750 |
| 2.293 | −0.164 | 7.750 |
| 2.246 | −0.172 | 7.750 |
| 2.199 | −0.180 | 7.750 |
| 2.153 | −0.188 | 7.750 |
| 2.106 | −0.196 | 7.750 |
| 2.059 | −0.204 | 7.750 |
| 2.013 | −0.212 | 7.750 |
| 1.966 | −0.220 | 7.750 |
| 1.919 | −0.228 | 7.750 |
| 1.872 | −0.236 | 7.750 |
| 1.826 | −0.244 | 7.750 |
| 1.779 | −0.252 | 7.750 |
| 1.732 | −0.260 | 7.750 |
| 1.685 | −0.268 | 7.750 |
| 1.639 | −0.276 | 7.750 |
| 1.592 | −0.284 | 7.750 |
| 1.545 | −0.292 | 7.750 |
| 1.498 | −0.299 | 7.750 |
| 1.452 | −0.307 | 7.750 |
| 1.405 | −0.315 | 7.750 |
| 1.358 | −0.322 | 7.750 |
| 1.311 | −0.329 | 7.750 |
| 1.264 | −0.336 | 7.750 |
| 1.217 | −0.343 | 7.750 |
| 1.170 | −0.350 | 7.750 |
| 1.123 | −0.357 | 7.750 |
| 1.076 | −0.363 | 7.750 |
| 1.029 | −0.369 | 7.750 |
| 0.982 | −0.375 | 7.750 |
| 0.935 | −0.381 | 7.750 |
| 0.888 | −0.386 | 7.750 |
| 0.841 | −0.391 | 7.750 |
| 0.794 | −0.396 | 7.750 |
| 0.747 | −0.400 | 7.750 |
| 0.699 | −0.404 | 7.750 |
| 0.652 | −0.408 | 7.750 |
| 0.605 | −0.411 | 7.750 |
| 0.558 | −0.414 | 7.750 |
| 0.510 | −0.416 | 7.750 |
| 0.463 | −0.418 | 7.750 |
| 0.415 | −0.419 | 7.750 |
| 0.368 | −0.420 | 7.750 |
| 0.321 | −0.420 | 7.750 |
| 0.273 | −0.419 | 7.750 |
| 0.226 | −0.418 | 7.750 |
| 0.178 | −0.417 | 7.750 |
| 0.131 | −0.414 | 7.750 |
| 0.084 | −0.411 | 7.750 |
| 0.036 | −0.407 | 7.750 |
| −0.011 | −0.403 | 7.750 |
| −0.058 | −0.397 | 7.750 |
| −0.105 | −0.391 | 7.750 |
| −0.152 | −0.383 | 7.750 |
| −0.198 | −0.375 | 7.750 |
| −0.245 | −0.366 | 7.750 |
| −0.291 | −0.356 | 7.750 |
| −0.337 | −0.345 | 7.750 |
| −0.383 | −0.333 | 7.750 |
| −0.429 | −0.320 | 7.750 |
| −0.474 | −0.306 | 7.750 |
| −0.483 | −0.303 | 7.750 |
| −0.492 | −0.300 | 7.750 |
| −0.501 | −0.297 | 7.750 |

TABLE 3-continued

| X | Y | Z |
|---|---|---|
| −0.510 | −0.293 | 7.750 |
| −0.519 | −0.290 | 7.750 |
| −0.528 | −0.287 | 7.750 |
| −0.537 | −0.284 | 7.750 |
| −0.546 | −0.280 | 7.750 |
| −0.554 | −0.277 | 7.750 |
| −0.563 | −0.274 | 7.750 |
| −0.588 | −0.263 | 7.750 |
| −0.612 | −0.250 | 7.750 |
| −0.634 | −0.236 | 7.750 |
| −0.655 | −0.219 | 7.750 |
| −0.674 | −0.200 | 7.750 |
| −0.691 | −0.179 | 7.750 |
| −0.705 | −0.156 | 7.750 |
| −0.714 | −0.131 | 7.750 |
| −0.720 | −0.104 | 7.750 |
| −0.721 | −0.078 | 7.750 |
| −0.717 | −0.051 | 7.750 |
| −0.709 | −0.025 | 7.750 |
| −0.698 | −0.001 | 7.750 |
| −0.683 | 0.021 | 7.750 |
| −0.665 | 0.042 | 7.750 |
| −0.646 | 0.060 | 7.750 |
| −0.625 | 0.077 | 7.750 |
| −0.602 | 0.092 | 7.750 |

It should be understood that the finished struts 26*a* and 26*b* do not necessarily include all the sections defined in Tables 2 and 3. The portion of the airfoil 54*a,b* proximal to the inner and outer portions 22, 24 may not be defined by a profile section 56*a,b*. It should be considered that the strut airfoil profile proximal to the inner and outer portions 22, 24 may vary due to several imposed constraints. However the struts 26*a,b* have an intermediate airfoil portion 54*a,b* defined between the inner and outer portions 22, 24 thereof and which has a profile defined on the basis of at least the intermediate Sections of the various strut profile sections 56*a,b* defined in Table 2 and Table 3.

Figure 5A:
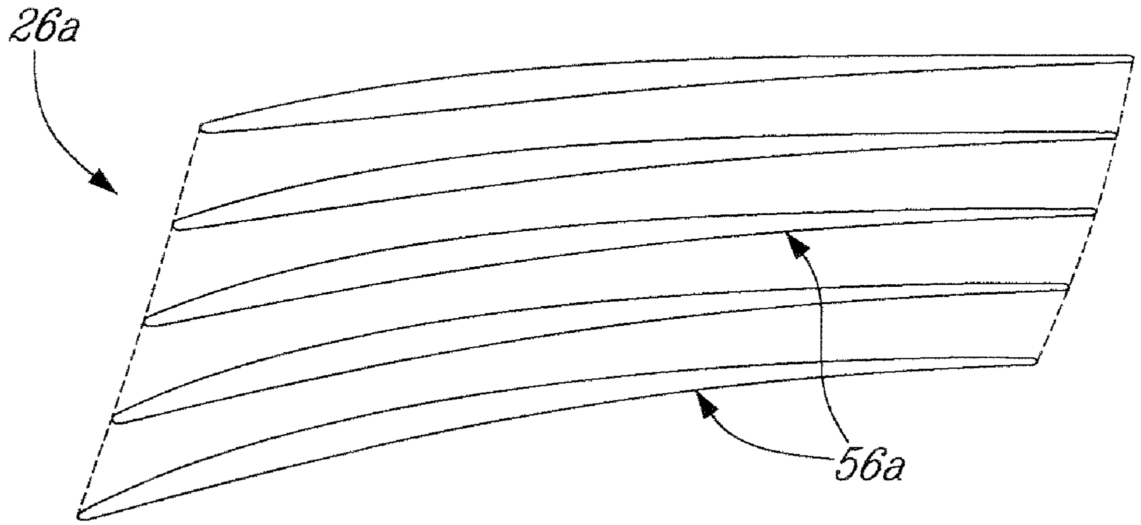
FIGS. 5*a* and 5*b* are respectively perspective views of the thin and thick exhaust struts with the sections of the struts contained in the gaspath joined with dotted lines.
Figure 5B:
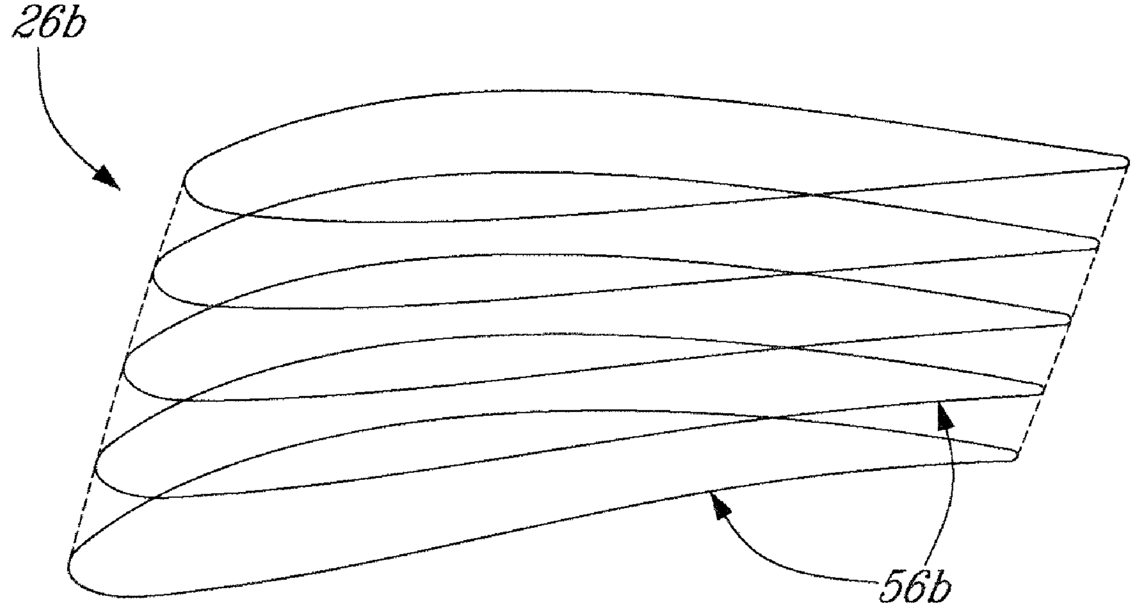

It should be appreciated that the airfoil portion 54*a,b* of the struts 26*a,b* is defined between the inner and outer gaspath walls 28 and 30 which are partially defined by the inner and outer portions 22 and 24 of the turbine exhaust duct 20. More specifically, the Z values defining the gaspath in the region of the stacking line 52 fall within the range of Z=3.933 and Z=7.181, which are the z values of the inner and outer walls 28 and 30 of the gaspath near the stacking line 53 (see Table 1). Therefore, the airfoil profile physically appearing on the thin and thick struts includes Sections 3 to 7 of Table 2 and Table 3, respectively. FIGS. 5*a* and 5*b* respectively show sections 3 to 7 of the thin and thick struts 26*a*, 26*b*, which are contained in the gaspath defined by the exhaust duct 20. Sections 2 and 8 are partially in the gaspath. Sections 1 and 9 are located completely outside of the boundaries set by the inner and annular outer gaspath walls 28 and 30 at the strut stacking lines 52 and 53, and are provided, in part, to fully define the airfoil surface and, in part, to improve curve-fitting of the airfoil at is radially distal portions. The skilled reader will appreciate that a suitable fillet radius is to be applied between the portions 22 and 24 and the airfoil portion 54*a,b* of the strut 56*a,b*.

The above description is meant to be exemplary only, and one skilled in the art will recognize that changes may be made to the embodiments described without department from the scope of the invention disclosed. For example, the airfoil and/or gaspath definitions of Tables 1, 2 and 3 may be scaled geometrically, while maintaining the same proportional relationship and airfoil shape, for application to gas turbine engine of other sizes. Still other modifications which fall within the scope of the present invention will be apparent to those skilled in the art, in light of a review of this disclosure, and such modifications are intended to fall within the appended claims.

The invention claimed is:

1. A strut extending across a gaspath defined by an exhaust duct of a gas turbine engine, comprising an airfoil having at least a portion contained within the gaspath and defined by a nominal profile substantially in accordance with Cartesian coordinate values of X, Y, and Z of Sections 3 to 7 set forth in one of Table 2 and Table 3, wherein the point of origin of the orthogonally related axes X, Y and Z is located at an intersection of a centerline of the gas turbine engine and a stacking line of the strut in the exhaust duct, the Z values are radial distances measured along the stacking line, the X and Y are coordinate values defining the profile at each distance Z.

2. The strut as defined in claim 1, wherein the airfoil is made of sheet metal.

3. The strut as defined in claim 1, wherein the X and Y values are scalable as a function of the same constant or number while maintaining the same proportional relationship and airfoil shape.

4. The strut as defined in claim 1, wherein the X and Y coordinate values have a manufacturing tolerance of ±0.010 inch.

5. The strut as defined in claim 4, wherein the nominal profile defining the airfoil portion is for an uncoated airfoil.

6. The strut as defined in claim 1, wherein X and Y values define a set of points for each Z value which when connected by smooth continuing arcs define an airfoil profile section, the profile sections at the Z distances being joined smoothly with one another o form an airfoil shape of the portion.

7. A strut extending across a gaspath of an exhaust duct of a gas turbine engine comprising an uncoated airfoil having at least one portion contained within the gaspath and defined by a nominal profile substantially in accordance with Cartesian coordinate values of X, Y, and Z of Sections 3 to 7 set forth in one of Table 2 and Table 3, wherein the point of origin of the orthogonally related axes X, Y and Z is located at an intersection of a centerline of the gas turbine engine and a stacking line of the strut in the exhaust duct, the Z values are radial distances measured along the stacking line of the airfoil, the X and Y are coordinate values defining the profile at each distance Z, and wherein the X and Y values are scalable as a function of the same constant or number while maintaining the same proportional relationship and airfoil shape.

8. The strut as defined in claim 7, wherein the airfoil is made of sheet metal.

9. The strut as defined in claim 7, wherein the X and Y coordinate values have a manufacturing tolerance of ±0.010 inch.

10. The strut as defined in claim 7, wherein X and Y values define a set of points for each Z value which when connected by smooth continuing arcs define an airfoil profile section, the profile sections at the Z distances being joined smoothly with one another to form an airfoil shape of the portion.

11. An exhaust duct for a gas turbine engine comprising a gaspath and a plurality of thin struts extending across the gaspath, each thin strut including an airfoil having at least one portion contained within the gaspath and defined by a nominal profile substantially in accordance with Cartesian coordinate values of X, Y, and Z of Sections 3 to 7 set forth in Table 2, wherein the point of origin of the orthogonally related axes X, Y and Z is located at an intersection of a centerline of the gas turbine engine and a stacking line of the struts, the Z values are radial distances measured along the stacking line, the X and Y are coordinate values defining the profile at each distance Z.

12. The exhaust duct as defined in claim 11. wherein the exhaust duct defines a gaspath profile in accordance with Cartesian coordinate values of X and Z set forth in Table 1.

13. An exhaust strut comprising at least one airfoil having a surface lying substantially on the points of Table 2, the airfoil extending between inner and outer end portions defined generally by Table 1, and wherein the values of Table 2 are subject to relevant tolerance.

* * * * *